(12) United States Patent
Kim et al.

(10) Patent No.: US 10,911,586 B2
(45) Date of Patent: Feb. 2, 2021

(54) MOBILE TERMINAL AND FLEXIBLE DISPLAY DEVICE

(71) Applicant: LG ELECTRONICS INC., Seoul (KR)

(72) Inventors: Youngjun Kim, Seoul (KR); Eunjeong Ryu, Seoul (KR); Wonjoo Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 109 days.

(21) Appl. No.: 16/073,510

(22) PCT Filed: Mar. 16, 2016

(86) PCT No.: PCT/KR2016/002663
§ 371 (c)(1),
(2) Date: Jul. 27, 2018

(87) PCT Pub. No.: WO2017/131283
PCT Pub. Date: Aug. 3, 2017

(65) Prior Publication Data
US 2020/0076940 A1 Mar. 5, 2020

(30) Foreign Application Priority Data

Jan. 28, 2016 (KR) .................. 10-2016-0010970

(51) Int. Cl.
| | |
|---|---|
| *H04M 1/02* | (2006.01) |
| *G06F 1/16* | (2006.01) |
| *G06F 3/0354* | (2013.01) |
| *H04M 1/60* | (2006.01) |
| *H04M 1/725* | (2006.01) |

(52) U.S. Cl.
CPC ........ *H04M 1/0268* (2013.01); *G06F 1/1656* (2013.01); *G06F 3/03545* (2013.01); *H04M 1/6016* (2013.01); *H04M 1/72563* (2013.01)

(58) Field of Classification Search
CPC .................. G06F 3/03545; H04M 1/0268
See application file for complete search history.

(56) References Cited

U.S. PATENT DOCUMENTS

| | | | | |
|---|---|---|---|---|
| 5,049,862 | A * | 9/1991 | Dao ............... | G06F 1/1626 345/179 |
| 2008/0005423 | A1* | 1/2008 | Jacobs ............ | A61B 5/0002 710/62 |
| 2011/0012849 | A1 | 1/2011 | Cho et al. | |

FOREIGN PATENT DOCUMENTS

| | | |
|---|---|---|
| KR | 10-2007-0016330 A | 2/2007 |
| KR | 10-2007-0019333 A | 2/2007 |
| KR | 10-2010-0079100 A | 7/2010 |

(Continued)

*Primary Examiner* — Hsinchun Liao
(74) *Attorney, Agent, or Firm* — Birch, Stewart, Kolasch & Birch, LLP

(57) ABSTRACT

A mobile terminal is disclosed. The mobile terminal according to an embodiment of the present invention can comprise: a display unit for displaying an image; a pen mountable on or detachable from the mobile terminal, and making contact with a screen of the display unit so as to provide an input to the mobile terminal; a sensing unit for sensing the mounting or the detachment of the pen; and a control unit for controlling the display unit such that an execution image of a memo application to be controlled according to the mounting or the detachment of the pen is displayed.

6 Claims, 121 Drawing Sheets

(56) References Cited

FOREIGN PATENT DOCUMENTS

KR   10-2014-0125218 A   10/2014
KR   10-2014-0128207 A   11/2014

\* cited by examiner

FIG. 3C
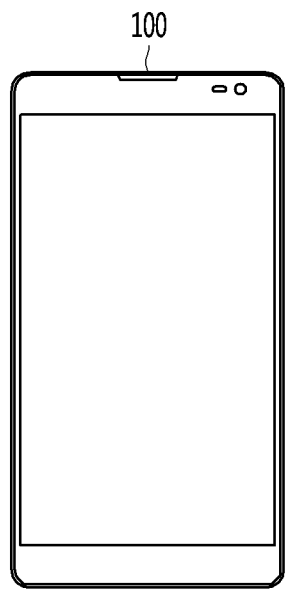
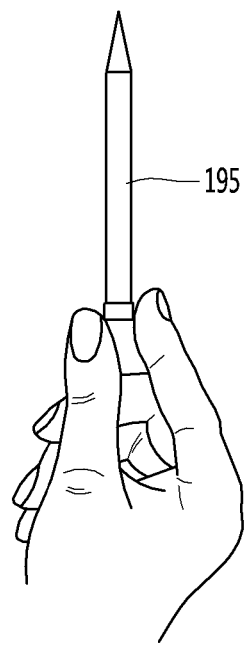

FIG. 19
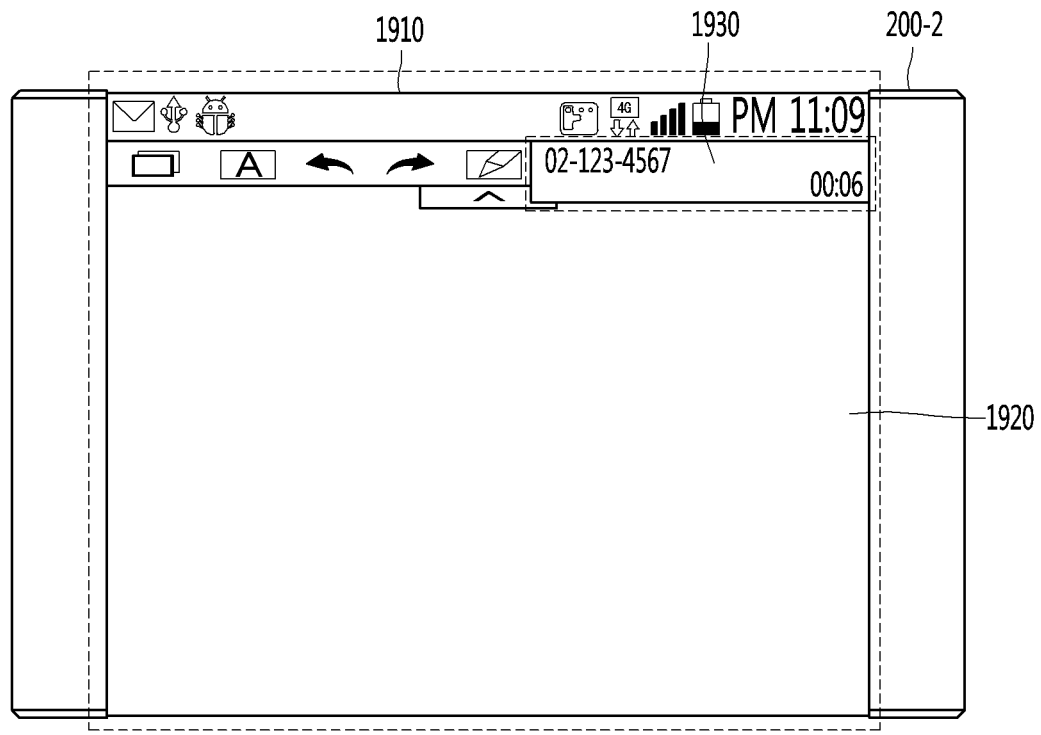
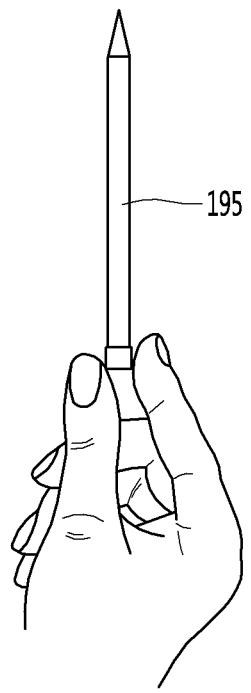

FIG. 26
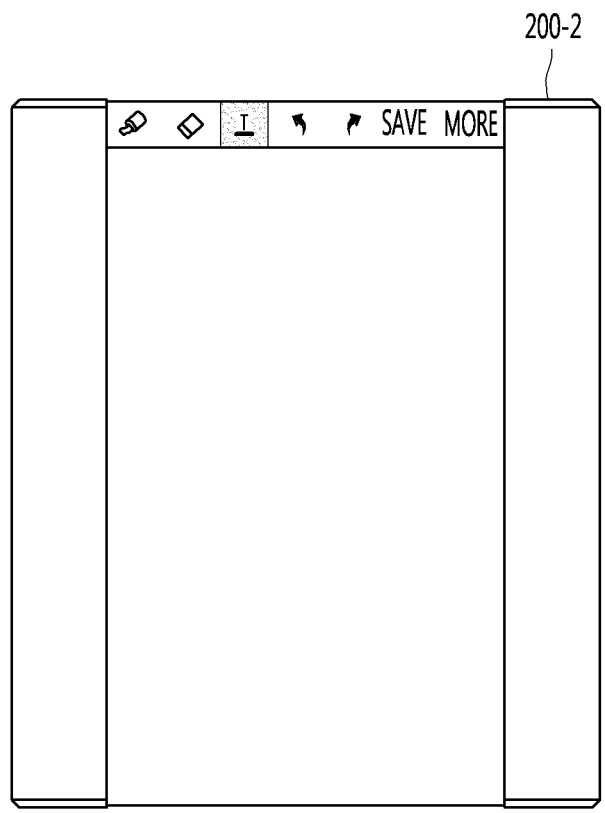
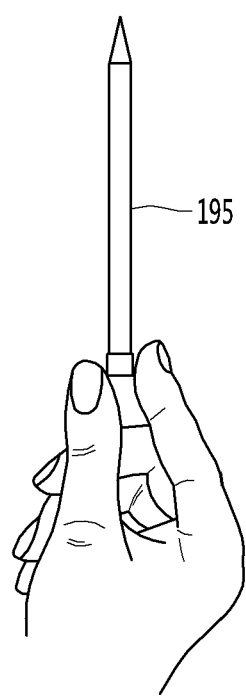

FIG. 27
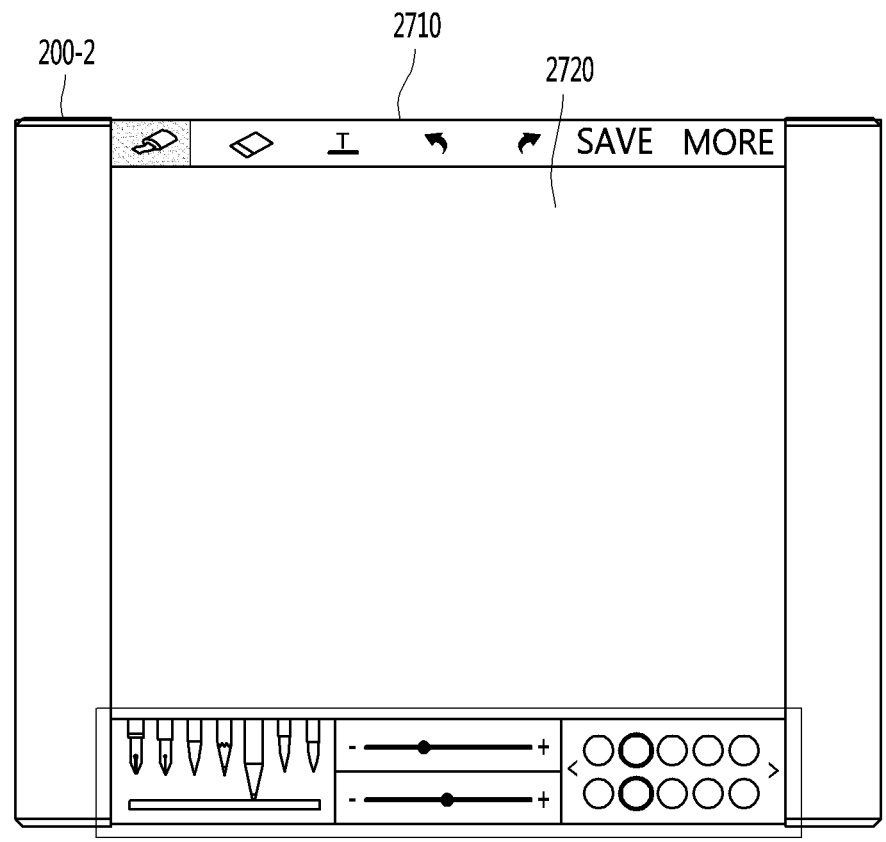
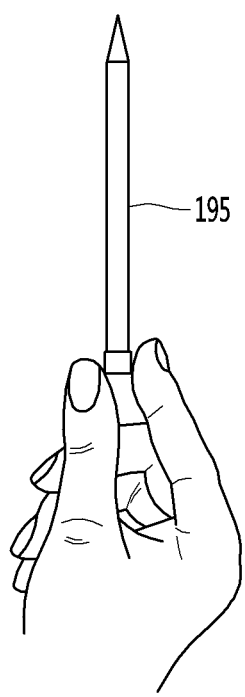

FIG. 52B
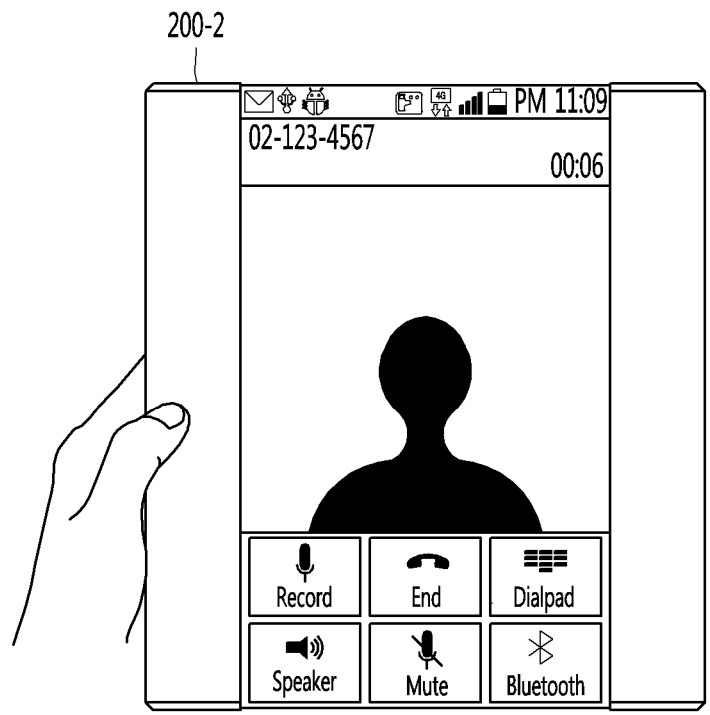
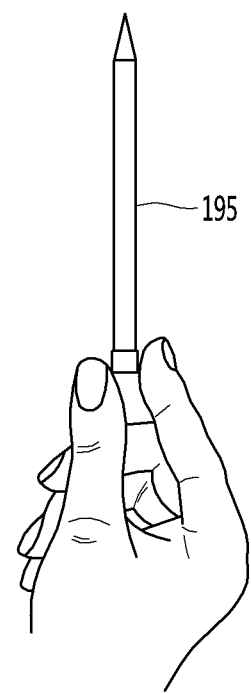

FIG. 53B
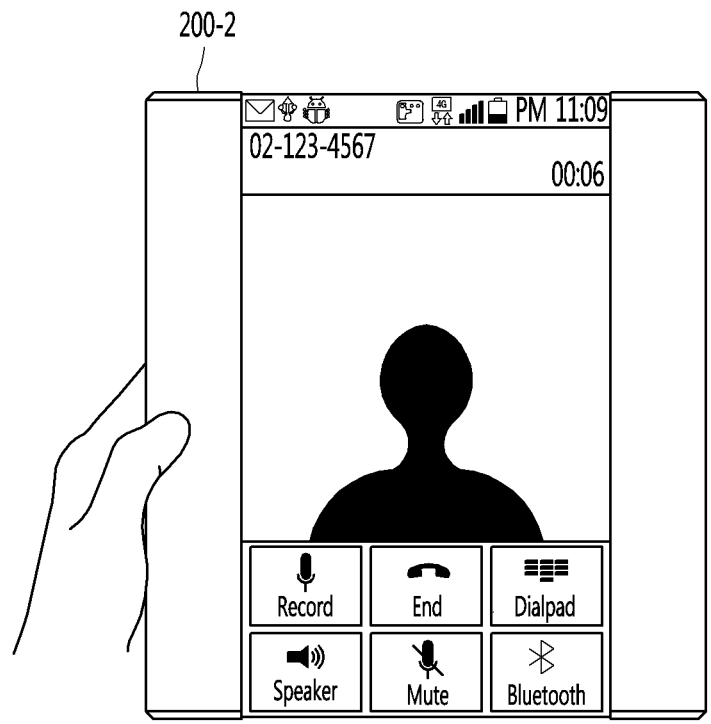
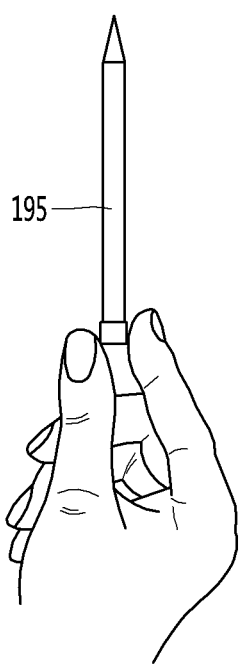

US 10,911,586 B2

MOBILE TERMINAL AND FLEXIBLE DISPLAY DEVICE

CROSS REFERENCE TO RELATED APPLICATIONS

This application is the National Phase of PCT International Application No. PCT/KR2016/002663, filed on Mar. 16, 2016, which claims priority under 35 U.S.C. 119(a) to Patent Application No. 10-2016-0010970, filed in the Republic of Korea on Jan. 28, 2016, all of which are hereby expressly incorporated by reference into the present application.

TECHNICAL FIELD

The present invention relates to a mobile terminal and a flexible display device, which are controlled depending on whether a pen is detached or attached.

BACKGROUND ART

Terminals may be generally classified as mobile/portable terminals or stationary terminals according to their mobility. Mobile terminals may also be classified as handheld terminals or vehicle mounted terminals according to whether or not a user may directly carry the terminal.

The functions of mobile terminals are diversified. In particular, recently, mobile terminals have been increasingly performed information storage functions, and a variety of memo functions have been provided such that a user directly inputs information.

Meanwhile, recently, a pen utilized in taking notes on mobile terminals has appeared. However, such a pen is limited in that it is only used for a user to hold a pen and to make a touch the pen to a screen. Accordingly, the necessity to find various ways of utilizing the pen has been come to be the fore.

Researches and developments have been carried on devices flexible in the use stage such that the devices are folded, rolled, or expanded in at least one direction. Since these displays may be modified to be various forms, the display may satisfy the demand for the enlargement in the use stage and the demand for the smaller size for portability.

Meanwhile, the flexible display device may be modified to be not only a preset shape, but also various shapes according to conditions in which the display is used. Accordingly, there needs to found the manner for controlling the flexible display device using a pen, in relation to the characteristic of the flexible display device allowing the enlargement and the reduction of the screen.

TECHNICAL PROBLEM

The present invention relates to a mobile terminal and a flexible display device which are controlled depending on whether a pen is detached or attached.

TECHNICAL SOLUTION

According to an embodiment of the present invention, a mobile terminal includes a display unit to display an image, a pen attached to or detached from the mobile terminal and making contact with a screen of the display unit to provide an input to the mobile terminal, a sensing unit to sense that the pen is attached or detached, and a control unit to control the display unit to display an execution image of a memo application which is executed as the pen is detached during a telephone call or is changed in an execution mode of the memo application as the pen is attached or detached.

Meanwhile, according to another embodiment of the present invention, a flexible display device includes a display unit to display information on a screen configured to be expanded or reduced, a pen attached to the flexible display device and making contact with the screen to provide an input to the flexible display device, a sensing unit to sense that the pen is detached, and a control unit to control the display unit such that the screen is expanded as the pen is detached.

Meanwhile, according to another embodiment of the present invention, a mobile terminal includes a storage unit to store data, a display unit to display an image, an input unit to receive an input from a user, and a control unit to store, in a storage unit, a memo corresponding to the input received through the input unit during a telephone call with a mobile terminal of a specific person, and to display a telephone number of the specific person and a telephone number list including an icon representing that the memo is stored during the telephone call with the mobile terminal of the specific person.

DESCRIPTION OF DRAWINGS

FIG. 3A to 3C are views illustrating a pen to be mounted on a mobile terminal according to an embodiment of the present invention.

FIGS. 17 to 19 are views illustrating a rollable display device which is additionally expanded as a pen is detached in the state that the screen is expanded, according to an embodiment of the present invention.

FIGS. 25 to 28 are views illustrating a rollable display device in which an execution mode of a memo application is changed according to an embodiment of the present invention.

BEST MODE

Mode for Invention

Figure 1:
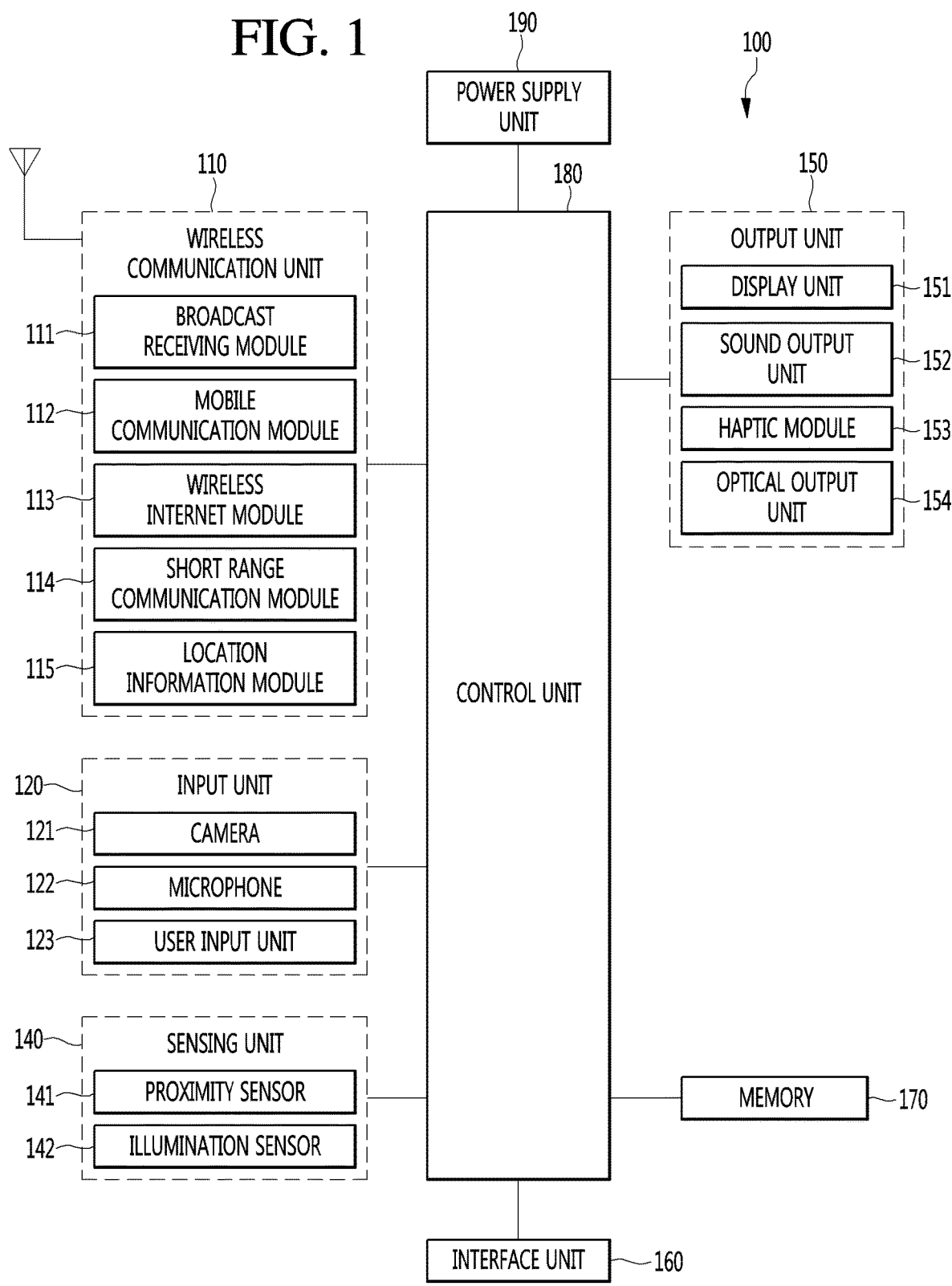
FIG. 1 is a block view illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to expand to any alterations, equivalents and substitutes in addition to those which are particularly set out in the accompanying drawings.

FIG. 1A is a block diagram of a mobile terminal in accordance with the present disclosure.

The mobile terminal 100 is illustrated having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is illustrated having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is illustrated having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The input unit 120 may further include the sensing unit 140 sensing a user's input to the touch screen in addition to the camera 121, the microphone 122, and the user input unit 123 described above.

The output unit 150 is typically configured to output various types of information, such as audio, video, tactile output, and the like. The output unit 150 is illustrated having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

Meanwhile, the memory 170 may be interchangeable with the term "storage unit 170".

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with each other to implement a method of operating, controlling, a mobile terminal or controlling the operation of the mobile terminal according to various embodiments described below. In addition, a method of operating, controlling, or controlling the operation of the mobile terminal may be implemented on the mobile terminal by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is used for short-range communication, and may support the short-range communication by using at least one of technologies such as a Bluetooth™, a Radio Frequency Identification (RFID), an Infrared Data Association (IrDA), an Ultra Wideband (UWB), a ZigBee, NFC (Near field communication), Wi-Fi (Wireless-Fidelity), Wi-Fi Direct, Wireless USB (Wireless Universal Serial Bus), and Magnetic Security Transmission (MST).

Here, the MST system is a system that converts internal information of the mobile terminal 100 into a magnetic field and transmits the magnetic field. For example, when the mobile terminal 100 is tagged to a POS terminal, the payment information of the mobile terminal 100 may be converted into a magnetic field to be transmitted to the POS terminal.

The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The short-range communication module 114 may detect (or recognize) another mobile terminal that is capable of communicating with the mobile terminal 100 around the mobile terminal 100. Further, the control unit 180 may transmit at least a part of data processed in the mobile terminal 100 to the short-range communication module 114 when the another mobile terminal is an authorized device to communicate with the mobile terminal 100 according to the present invention. Accordingly, the user of another mobile terminal may use data processed by the mobile terminal 100 through another mobile terminal. For example, according to an embodiment, when a call is received in the mobile terminal 100, the user makes communicate with through another mobile terminal, or when a message is received to the mobile terminal 100, it is possible to confirm the received message.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described 1 more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 may control the mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

The sensing unit 140 may include various sensing units such as a gravity sensor, a geomagnetic sensor, a gyro sensor, an acceleration sensor, an inclination sensor, an altitude sensor, a depth sensor, a gyroscope sensor, an angular velocity sensor, and a GPS sensor.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various piece of information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or. User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs may be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information may be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment within which the mobile terminal 100 is positioned.

Meanwhile, in the following description, various embodiments may be realized in a recording medium readable by a computer or a device similar to the computer by using, for example, software, hardware, or a combination thereof.

In addition, the mobile terminal 100 may be a wearable device, and may be a watch-type mobile terminal among wearable devices.

Meanwhile, the input unit 120 may further include the sensing unit 140 sensing a user's input to the touch screen in addition to the camera 121, the microphone 122, and the user input unit 123 described above.

Meanwhile, the input unit 120 may include all the configurations of the sensing unit 140 in addition to all the configurations of the input unit, thereby performing all the functions performed by the sensing unit 140.

Meanwhile, the term 'memory 170' is interchangeable with the term 'storage unit 170'.

Figure 2:
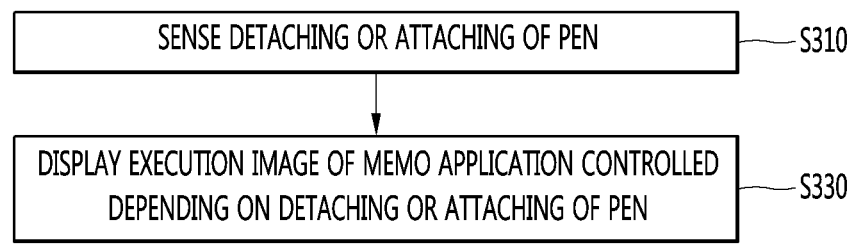
FIG. 2 is a view illustrating a method of operating of a mobile terminal according to an embodiment of the present invention.

FIG. 2 is a view illustrating a method of operating of the mobile terminal according to an embodiment of the present invention.

The method of operating of the mobile terminal according to an embodiment of the present invention includes a step of detecting the detaching or attaching of the pen (S310), and a step of displaying the execution image of a memo application controlled by the detaching or attaching of the pen (S330).

Among them, the step of detecting the detaching or attaching of the pen will be described in detail with reference to FIG. 3.

Figure 3A:
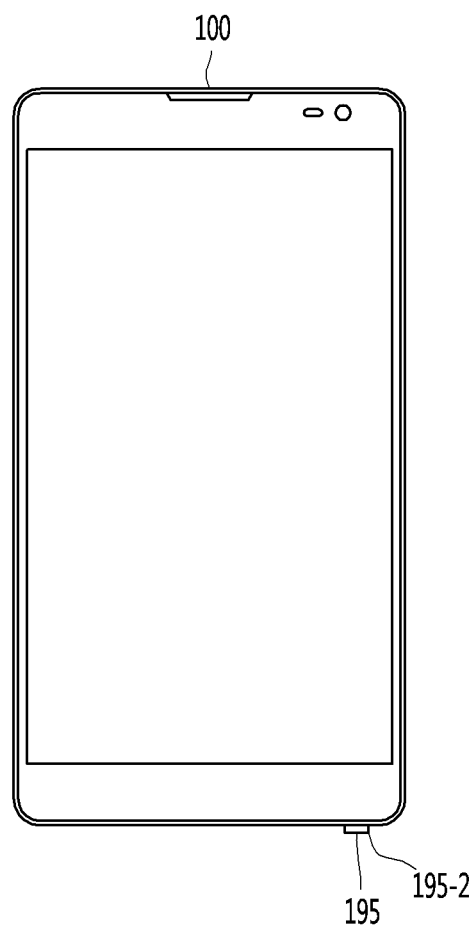
Figure 3B:
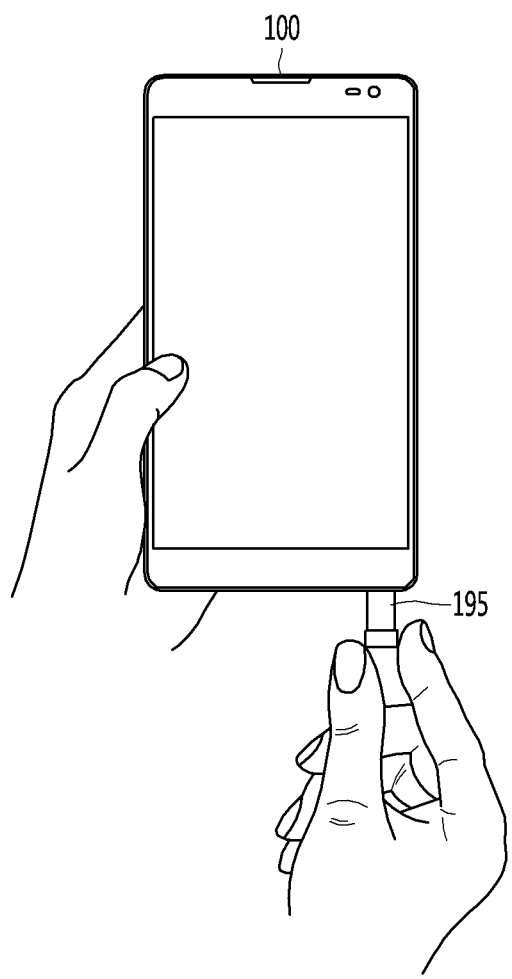

FIGS. 3A to 3C are views illustrating a pen to be mounted on a mobile terminal according to an embodiment of the present invention.

The mobile terminal 100 may include a pen 195 that is attachable to or detachable from the mobile terminal 100 and in contact of the screen of the display unit 151 to provide input to the mobile terminal 100. Herein, the pen 195 may be a stylus pen.

FIG. 3A is a view illustrating the state that the pen 195 is attached to the mobile terminal 100. The pen 195 is fixed to the mobile terminal 100 when there is no user operation for detaching the pen after the pen is mounted on the mobile terminal 100.

Meanwhile, if there is a user operation of pushing the pen 195, a head portion 195-2 of the pen 195 is projected, and a user may pull the head portion 195-2 of the pen 195.

Meanwhile, when the user pulls the head portion 195-2 of the protruding pen 195, a part of the pen 195 is detached as illustrated in FIG. 3B. In addition, the sensing unit 140 may sense the movement of the pen 195, and the control unit 180 may determine that a part of the pen 195 is detached based on the sensing result of the sensing unit 140. If it is determined that a part of the pen 195 is detached, based on the sensing result in the sensing unit 140, the control unit 180 may control the operation of the mobile terminal 100. The related details will be described later.

The sensing unit 140 senses the rotation of the pen 195 and the control unit 180 may acquire information on at least one of the rotation of the pen 195, the rotation direction, and the rotation angle of the pen based on the sensing result of the sensing unit 140. In addition, the control unit 180 may control the operation of the mobile terminal 100 based on at least one of the rotation, the rotation direction, and the rotation angle of the pen 195. The related details will be described later.

Meanwhile, when the user further pulls the pen 195 in a state that a part of the pen 195 is detached, the entire portion of the pen 195 is detached as illustrated in FIG. 3C. Meanwhile, when it is determined that the entire portion of the pen 195 is detached based on the sensing result of the sensing unit 140, the control unit 180 may control the operation of the mobile terminal 100. The related details will be described later.

Meanwhile, when the pen 195 is completely removed, the user may make a memo on the screen of the display unit 151 using the pen 195.

Specifically, when the user touches the screen of the display unit 151 with the pen 195, the sensing unit 140 may sense the touch of the pen 195 and perform an operation corresponding to the touch of the pen 195. For example, when the user makes a memo using the pen 195, the control unit 180 may display a UI corresponding to the movement path of the touched pen 195.

That is to say, the pen 195 may contact the screen of the display unit 151 and provide input to the mobile terminal 100.

Referring back to FIG. 2, the method of operating the mobile terminal according to an embodiment of the present invention may include the step (S230) of displaying an execution image of the memo application controlled according to the attaching or mounting of the pen.

This will be described in detail with reference to FIGS. 4A to 8.

Figure 4A:
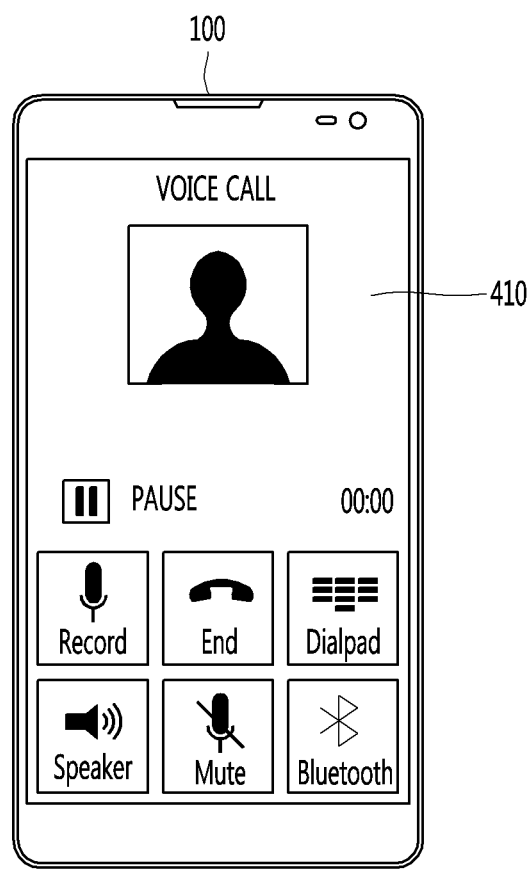
FIGS. 4A and 4B are views illustrating a method of operating a mobile terminal when a pen is detached during a call.
Figure 4B:
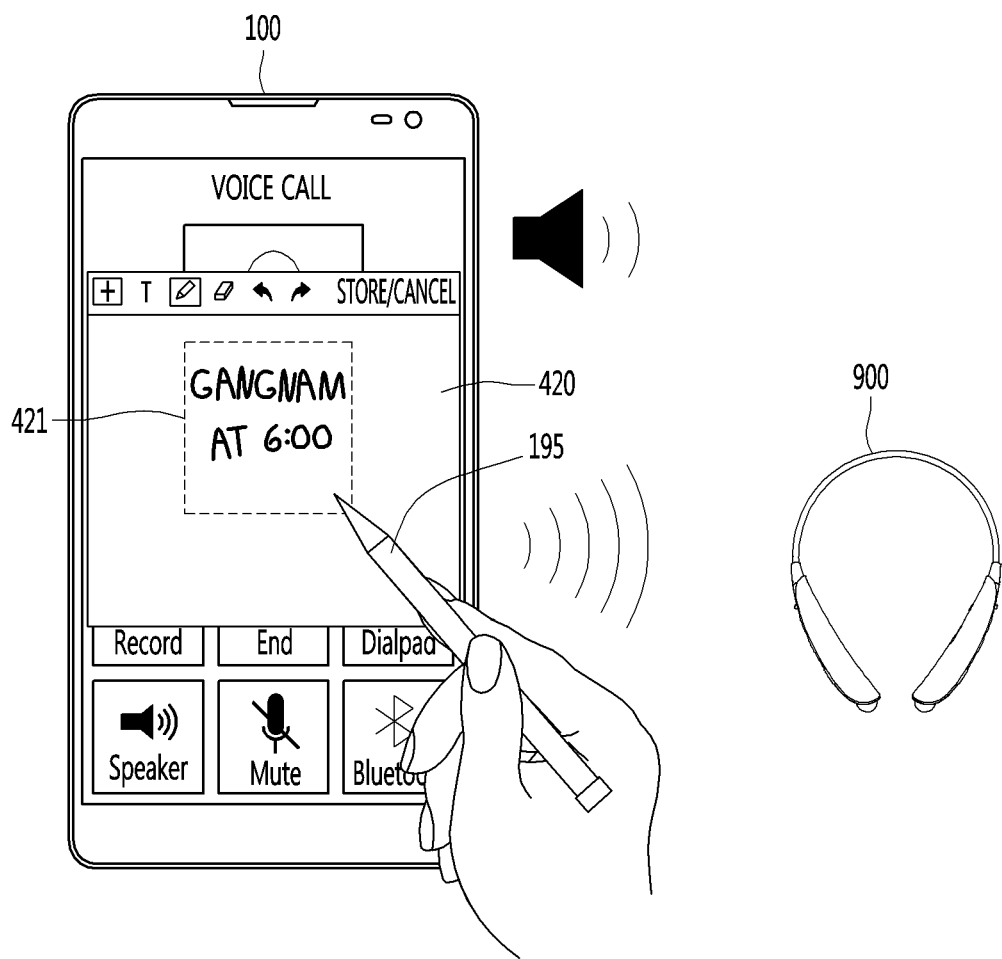

FIGS. 4A and 4B are views illustrating a method of operating the mobile terminal when a pen is detached during a call.

When the mobile terminal 100 is connected with another mobile terminal, as illustrated in FIG. 4A, the control unit 180 may be execute the telephone call application and display an execution image 410 of the telephone call application.

Meanwhile, if the pen 195 is detached during a telephone call, that is, while the telephone call application is being executed, the control unit 180 may execute the memo application and control the display unit 151 to display the execution image of the memo application have.

Meanwhile, as illustrated in FIG. 4B, an execution image 420 of the memo application may include a notepad UI 420. Here, the notepad UI 420 may be a UI displaying text or an image corresponding to an input received from the user.

Meanwhile, if the pen 195 is detached while the telephone call application is being executed, the control unit 180 may display an icon for displaying the notepad UI 420. In this case, as the input for selecting an icon for displaying the notepad UI 420 is received, the control unit 180 may display the notepad UI 420.

When the pen 195 is detached while the telephone call application is being executed, the control unit 180 executes the memo application and immediately displays the notepad UI 420 (without displaying an icon for displaying the notepad UI 420, but the present invention is not limited thereto. As described above, according to the present invention, the notepad UI 420 is displayed immediately after the pen 195 is detached, thereby providing an environment in which a user who is in a telephone call may quickly take notes.

Meanwhile, the control unit 180 receives an input from the user to make a memo on the notepad UI 420, and displays a text corresponding to the received input or a UI corresponding to the received input.

For example, as illustrated in FIG. 4B, the control unit 180 may receive a touch input using the pen 195, and may display a UI 421 corresponding to the movement trajectory of the pen 195.

For another example, the control unit 180 may receive the input through a text input window and display the text corresponding to the received input.

Meanwhile, although the present embodiment has been described in that the notepad UI 420 is displayed on a part of the screen of the display unit 151 and overlapped with the execution image 410 of the telephone call application, but the present invention is not limited thereto. For example, when the telephone 195 is executed while the telephone call application is being executed and the execution image 410 of the telephone call application is being displayed, the control unit 180 executes the memo application, and the execution image of the memo application may be displayed on the full region.

Meanwhile, when the memo application is executed as the pen 195 is detached while the telephone call application is being executed, the control unit 180 may control the output of audio from the mobile terminal 100.

Specifically, based on whether or not an external device capable of outputting audio is connected, the control unit 180 outputs the audio to be output in a speaker mode from the mobile terminal 100, or outputs the audio signal corresponding to the audio to be output to the external device connected with the mobile terminal 100. Here, the external device connected with the mobile terminal 100 is an external device capable of communicating with the mobile terminal 100 and capable of outputting audio, and includes not only an external device connected by wire but also an external device wirelessly connected thereto.

When an external device capable of outputting audio is an earphone connected with the mobile terminal 100 via the interface unit 160 or a Bluetooth earphone 900 connected with the mobile terminal 100 through the wireless communication unit 110, the control unit 180 may obtain information on whether the earphone or the Bluetooth earphone 900 is connected.

When the earphone or the Bluetooth earphone 900 is connected with the mobile terminal 100, the control unit 180 may transmit the audio signal corresponding to the audio to be outputted from the mobile terminal 100 to the earphone or the Bluetooth earphone 900. In this case, the earphone or the Bluetooth earphone 900 may output audio corresponding to the received audio signal.

The mobile terminal 100 may include a communication unit (not illustrated). The communication unit (not illustrated) may include an interface unit 160 that is connected with an external device by wire to communicate with the external device, and a wireless communication unit 100 wirelessly connected with the external device to communicate with the external device.

Meanwhile, when the earphone or the Bluetooth earphone 900 is not connected with the mobile terminal 100, the control unit 180 may control the audio output module 152 to output audio in the speaker mode.

In order to make a memo on the notepad UI, a user needs to move the mobile terminal 100 away from the ear, so that the mobile terminal 100 cannot hear the audio output in a normal mode. Accordingly, according to the present invention, when the pen 195 is detached and the memo application is executed, the audio to be output may be output in the speaker mode or may be output through an external device capable of outputting audio, and thus an environment in which a user may hear the audio output through the mobile terminal 100 while making the note.

In addition, since audio is output in a speaker mode or an audio signal is transmitted to an external device depending on whether the external device is connected, the present invention is advantageous in that audio may be delivered to the user in a manner optimized for a user's situation.

Meanwhile, based on the size of the external sound received from the mobile terminal 100, the control unit 180 may change the volume of the audio output in the speaker mode.

Specifically, the microphone 122 included in the mobile terminal 100 may receive external sound from the outside. The control unit 180 may determine the size of the external sound received from the outside.

In addition, as the size of the external sound received from the outside increases, the control unit 180 may control the audio output module 152 to volume up the audio output in the speaker mode. As another example, as the size of the external sound received from the outside is received, the control unit 180 controls the audio output module 152 to more volume down the audio output in the speaker mode.

When the audio is output in the speaker mode, the audio output in the speaker mode may not be sufficiently transmitted to the user due to noise. In addition, when there is no external noise, in the state that the audio excessively volume up, the audio may be delivered to the user.

Therefore, the present invention is advantageous in that audio have a volume optimized for the user's situation may be delivered to the user by changing the volume of the audio output according to the external sound collected by the mobile terminal 100.

Meanwhile, although the present embodiment has been described in that the pen 195 is detached and the memo application is executed while the telephone call application is being executed, the present invention is not limited thereto. When the pen 195 may be detached, the control unit 180 may execute the memo application and display the execution screen of the memo application.

Figure 5:
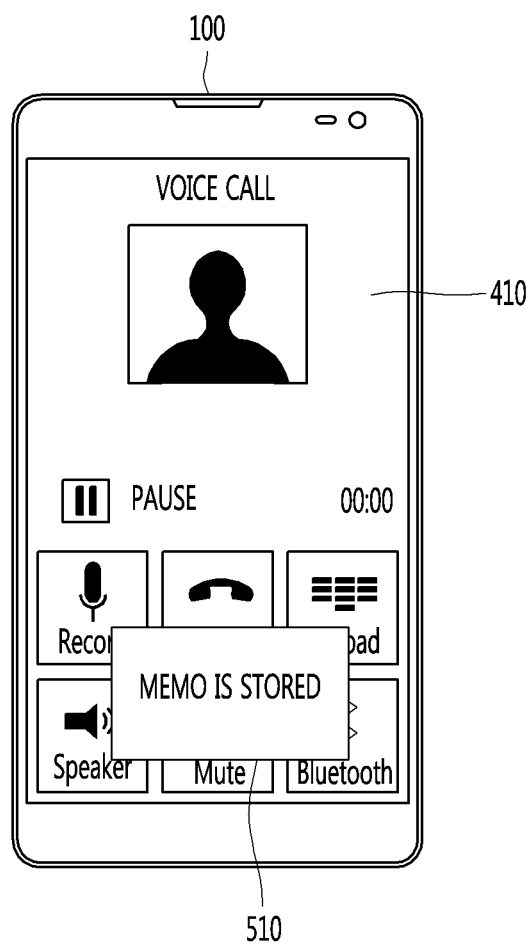
FIG. 5 is a view illustrating a method of operating a mobile terminal in the case that the detached pen 195 is mounted on the mobile terminal again according to an embodiment of the present invention.

FIG. 5 is a view illustrating a method of operating the mobile terminal in the case that the detached pen 195 is mounted on the mobile terminal again according to an embodiment of the present invention.

When the pen 195 is mounted again, that is, when the detached pen 195 is mounted on the mobile terminal, the control unit 180 may store the memo input by the user and terminate the execution of the memo application.

In detail, as illustrated in FIG. 4B, when the detached pen 195 is mounted on the mobile terminal 100 in a state that the UI 421 corresponding to the input received from the user is displayed, the control unit 180 may store the UI 421, which corresponds to the input received from the user in the storage unit 170, and may terminate the execution of the memo application.

As another example, when the detached pen 195 is mounted on the mobile terminal 100 is displayed in the state that the text corresponding to the input received from the user is displayed, the control unit 180 may display a text corresponding to the input received from the user, may terminate the execution of the memo application, and may terminate the display of the execution video of the memo application.

In this case, the control unit 180 may display a UI 510 indicating that the memo is stored.

Thus, the present invention may control the execution and termination of the memo application as the pen is detached and mounted. In particular, according to the present invention, a notepad UI is automatically displayed when a user detach a pen to make a note, and when the user finishes the memo and mount the pen again, the memo contents are automatically stored and the memo application is terminated. It is possible to provide an environment in which the user may easily perform operations for making and finishing a note.

Figure 6:
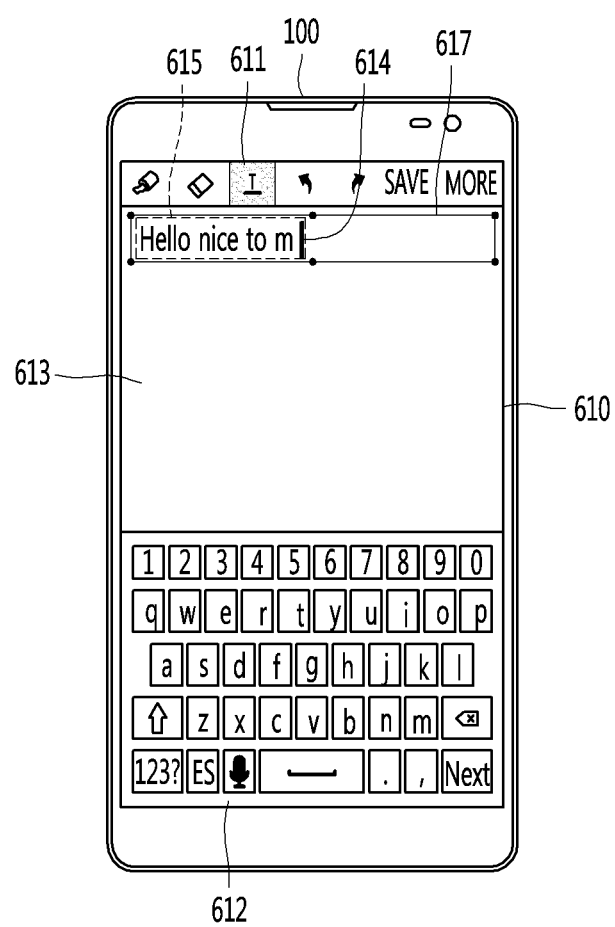
FIGS. 6 to 8 are views illustrating a method of controlling a memo application according to detachment or attachment of a pen, according to another embodiment of the present invention.
Figure 7:
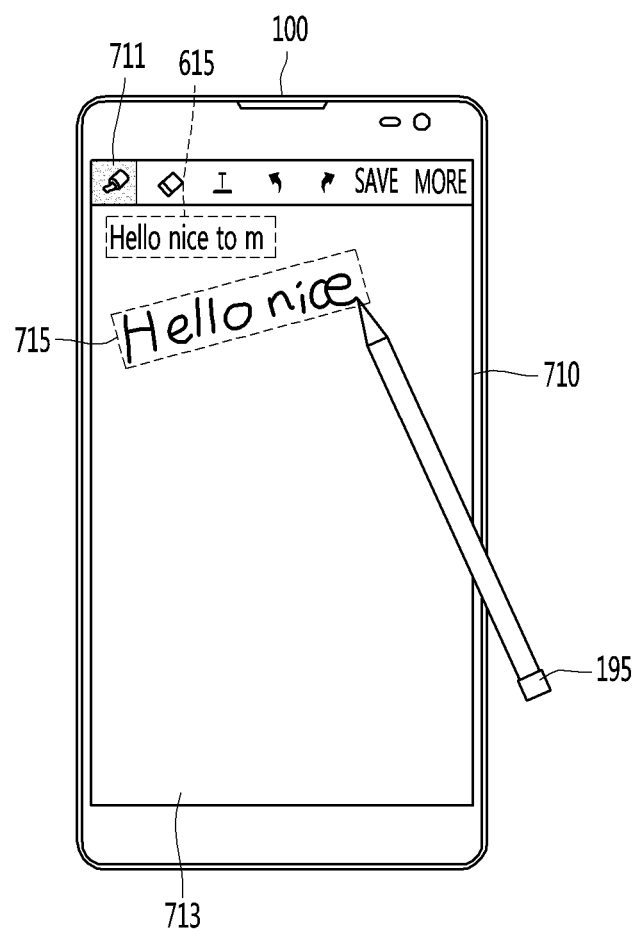
Figure 8:
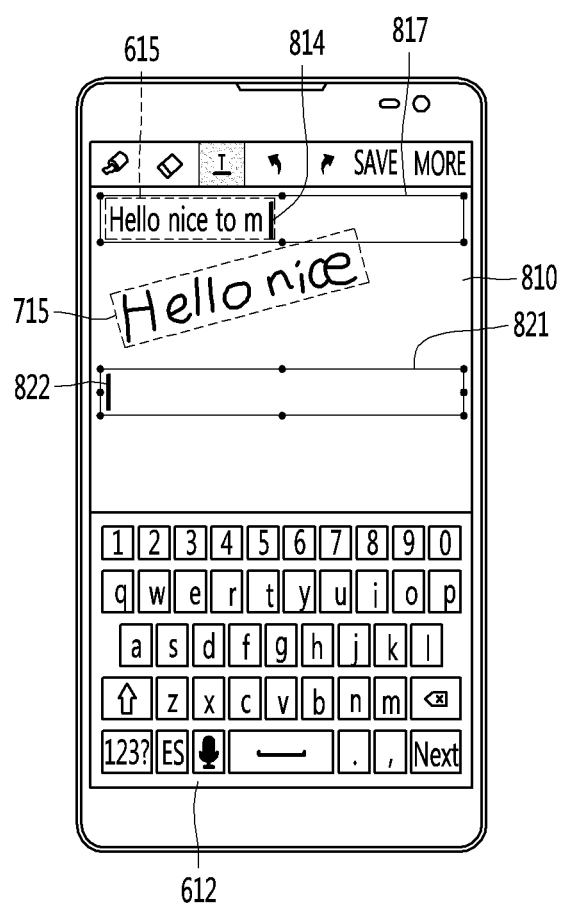

FIGS. 6 to 8 are views illustrating a method of controlling a memo application according to attachment or detachment of a pen, according to another embodiment of the present invention.

FIG. 6 is a view showing a mobile terminal on which a memo application displays an execution video.

A memo application may be executed not only by the detachment of the pen 195 but also by another method. For example, when an input for executing the memo application is received from the user, the control unit 180 may execute the memo application and display the execution image 610 of the memo application.

Meanwhile, in the state in which the memo application is executed, the execution mode of the memo application may include a pen mode and a text mode.

In this case, the pen mode may be a mode of displaying a UI corresponding to a movement trajectory of the pen 195 that is in contact with (or proximity to) the screen. The text mode may be a mode of displaying a text corresponding to input through a text input window.

Meanwhile, when an input for executing the memo application is received from the user while the pen 195 is mounted, the control unit 180 executes the memo application in the text mode and displays the execution image 610 of the memo application.

Meanwhile, the execution image 610 of the memo application in the text mode may include a UI 611 indicating that the mode of the current memo application is the text mode. In addition, the execution image 610 of the memo application in the text mode may include a text input window 612 capable of receiving the user's touch input. In addition, the execution image 610 of the memo application in the text mode may include a notepad UI 613.

Meanwhile, the control unit 180 may receive an input from the user through the text input window 612 and may display a text 615 corresponding to the input through the text input window on the notepad UI 613.

Meanwhile, in the state that the execution mode of the memo application is the text mode, when the pen 195 is detached, the control unit 180 may change the execution mode of the memo application to the pen mode as illustrated in FIG. 7. When the execution mode of the memo application is changed to the pen mode, the control unit 180 may display the execution image 710 of the memo application in the pen mode.

Meanwhile, the execution image 710 of the memo application in the pen mode may include a UI 711 indicating that the execution mode of the current memo application is the pen mode.

In addition, the execution image 710 of the memo application in the pen mode may include a notepad UI 713.

Meanwhile, the control unit 180 may receive an input that moves after touching the pen 195 to the screen. In this case, the control unit 180 may display a UI 715 corresponding to the movement trajectory of the movement of the pen 195 on the notepad UI 713.

Meanwhile, the notepad UI 613 included in the execution image 610 of the memo application in the text mode may be the same as a notepad UI 713 included in the execution image 710 of the memo application in the pen mode.

Specifically, the notepad UI 713 included in the execution image 710 of the memo application in the pen mode may include the text 615 corresponding to the input received in the text mode.

That is to say, when the execution mode of the memo application is changed to the pen mode, the control unit 180 may display the notepad UI 713 including the text 615 displayed in the text mode according to the input received in the text mode. Then, when an input that moves after the pen 195 is touched to the screen is received, the control unit 180 displays, on the notepad UI 173, the UI 715 corresponding to the trajectory of movement of the pen 195 together with the text 615, which are displayed in the text mode.

Meanwhile, when the pen 195 is mounted again in the state that the execution mode of the memo application is the pen mode, that is, when the removed pen 195 is mounted again, the control unit 180 may change the execution mode of the memo application to the text mode as illustrated in FIG. 8. When the execution mode of the memo application is changed to the text mode, the control unit 180 may display the execution image 810 of the memo application in the text mode.

As described above, according to the present invention, when the pen 195 is detached, a new notepad for making a memo using the pen 195 is not newly provided, but only changes the notepad in the text mode to the pen mode. Accordingly, it is possible to provide an environment in which a memo may be input to the same notepad by selectively using the text mode or the pen mode.

Further, according to the present invention, user convenience may be improved by automatically changing the execution mode of the memo application as the pen 195 is detached and remounted without any other special input. In other words, since the attaching of the pen 195 by the user indicates that the user intends to make a memo using the pen 195. According to the present invention, the execution mode of the memo application is changed to the pen mode using the pen only by detaching the pen 195. Since the remounting the pen 195 by the user indicates that the user makes a memo without the pen 195. According to the present invention, the execution mode of the memo application may be changed to the text mode without employing the pen only by mounting the pen 195.

Meanwhile, referring to FIG. 6, the notepad UI 613 included in the execution image 610 of the memo application in the text mode includes a cursor 614 indicating the position where the text corresponding to the user input is displayed. For example, when the input corresponding to "e" is received from the user while the text "Hello nice to m" is displayed and the cursor 614 is displayed, the control unit 180 may display the text of "Hello nice to me" by displaying the text of "e" at the cursor position.

Meanwhile, the notepad UI 613 included in the execution image 610 of the memo application in the text mode may include a UI 617 indicating a line on which the text is displayed.

Meanwhile, when the execution mode of the memo application is changed from the text mode to the pen mode, as illustrated in FIG. 7, the control unit 180 displays the notepad UI included in the execution image 710 of the memo application in the pen mode. Meanwhile, since the mode is changed from the text mode to the pen mode, the control unit 180 may stop the display of the cursor 614 indicating the position where the text corresponding to the user input is displayed, and may stop the display of the line on which the text is displayed.

Meanwhile, if the execution mode of the memo application is changed to the pen mode and then to the text mode again, as illustrated in FIG. 8, the control unit 180 displays the cursor 614 at the same position as the position at which the cursor 614 was displayed.

Specifically, when the execution mode of the memo application is changed from the text mode to the pen mode and then back to the text mode, the control unit 180 displays the cursor 814 in the text mode before the execution mode of the memo application is changed to the pen mode, at the same position as the position at which the cursor 614 was displayed.

In detail, if the execution mode of the memo application is changed from the text mode to the pen mode and then changed from the pen mode to the text mode, the control unit 180 displays the UI 817 representing a line on which a text is displayed on the same position as the display position of the UI 617 representing the line in which the text in the text mode before the execution mode of the memo application is changed to the pen mode is displayed.

Then, when an input is received from the user, the control unit 180 may display the text corresponding to the input received from the user at the position of the cursor 814.

For example, when the text 615 "Hello nice to m" has been displayed in the text mode, the cursor 614 has been displayed to the right of the text 615 of "Hello nice to m", and the UI 715 corresponding to the movement trajectory of the pen 195 is displayed in the pen mode. In this case, when change to the text mode is made, the control unit 180 may display the cursor 814 on the right side of the text 615 of "Hello nice to m". When the input corresponding to "e" is received from the user while the cursor 814 is being displayed, the control unit 180 displays the text "e" at the cursor position to display the text of "Hello nice to me".

As described above, according to the present invention, the text mode and the pen mode may be easily changed as the pen 195 is detached and mounted, and the position where the new text is input is the same as the position where the new text is input in the previous text mode, thereby eliminating inconvenience of re-designating the position where the new text is displayed and simplifying the user's operation.

Meanwhile, although the present invention has been described in that the cursor 814 is displayed at the same position as that of the cursor 614 displayed in the previous text mode, but the present invention is not limited thereto.

For example, as illustrated in FIG. 8, when the execution mode of the memo application is changed from the text mode to the pen mode and then changed back from the pen mode to the text mode, the control unit 180 displays the UI 821 representing a line on which the text is displayed UI 821 at the new location.

Here, the new position at which the UI 821 representing the line on which the text is displayed is displayed may be the lower line of the UI 715 corresponding to the movement trajectory of the pen 195 in the pen mode.

When the execution mode of the memo application is changed from the text mode to the pen mode and then changed from the pen mode to the text mode again, the control unit 180 displays, at the new position, the cursor 822 indicating the position where the text corresponding to the user input is displayed.

In this case, the new position for displaying the cursor 822 representing the position at which the text is displayed may be a point in the lower line of the UI 715 corresponding to the movement trajectory of the pen 195 in the pen mode.

Changing the execution mode of the application from the pen mode to the text mode may be regarded as the intention of the user to complete the memo in the pen mode and to make a new memo in the text mode. Thus, according to the present invention, the user is allowed to make a new memo under the UI 715 corresponding to the movement trajectory of the pen 195 when the execution mode of the application is changed from the pen mode to the text mode again, thereby improving the convenience of the user.

All embodiments described with reference to FIGS. 2 to 8 may be implemented in a mobile terminal implemented with a flexible display device. In addition, all embodiments described above may be implemented in the flexible display devices described later.

The structure of the flexible display device will be described in detail with reference to FIGS. 9A to 9C.

Figure 9A:
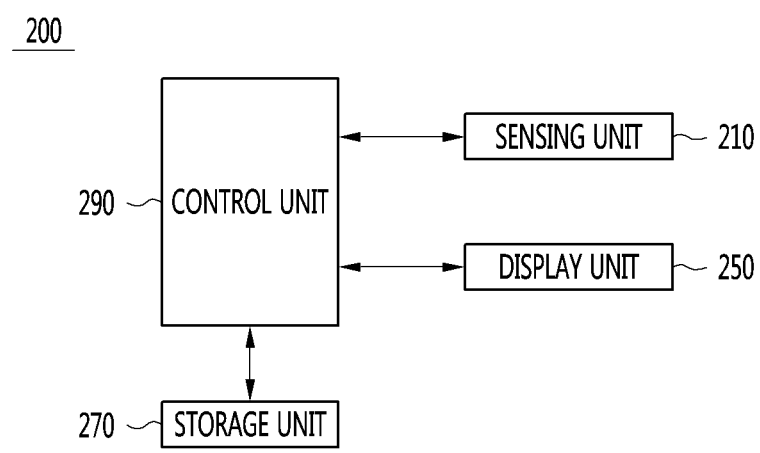
FIGS. 9A to 9C are views illustrating a configuration of a flexible display device according to an embodiment of the present invention.
Figure 9B:
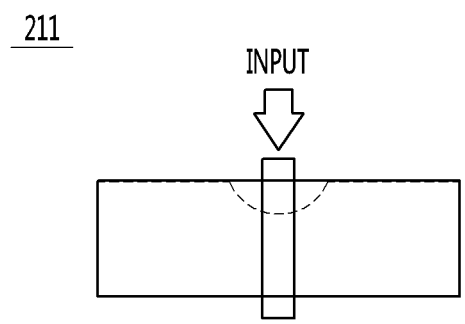
Figure 9C:
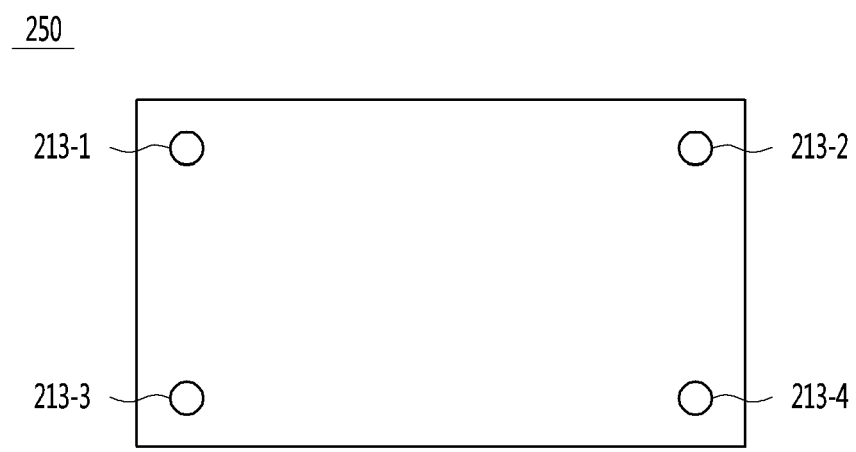

FIGS. 9A to 9C are views illustrating a configuration of a flexible display device according to an embodiment of the present invention.

FIG. 9A is a block diagram illustrating a configuration of a flexible display device 200 according to an embodiment of the present invention. FIG. 9B is a view illustrating a pressure sensor 211 constituting a sensing unit 210, and FIG. 9C is a view illustrating a configuration of the display unit 250 in which the sensing unit 210 includes a plurality of acceleration sensors 213-1 to 213-4.

The flexible display device (deformable display device 200) according to an embodiment of the present invention may a next generation display device which may be not only bent but also may be stretchable, unlike the conventional display device which is implemented only with a rigid material such as glass or silicon, and may be implemented under a new environment.

In one embodiment, the flexible display device 200 may be a stretchable display device that is stretched when pulled, and may be reduced back to its original state when released. The stretchable display device may be stretched when pulled, and may be fixed in a stretched state after a certain period of time in the stretched state. In addition, the stretchable display device may be reduced to its original state when a force for reducing it is applied.

In another embodiment, the flexible display device 200 may be a rollable display device that may be rolled or spread like a piece of paper.

The flexible display device 200 to be described below includes all elements of the mobile terminal 100 described above and the all elements included in the flexible display device 200 may perform all functions of the elements of the mobile terminal 100 described above in the same manner.

Therefore, the following description will be made while focusing on specific elements and functions of the flexible display device 200.

Referring to FIG. 9A, the flexible display device 200 may include the sensing unit 210, a display unit 250, a storage unit 270, and a control unit 290.

The sensing unit 210 may sense the intensity of the force applied to a display unit 250 and the direction of the force.

According to one embodiment, the sensing unit 210 may include one or more pressure sensors. The one or more pressure sensors may be disposed in the display unit 250. When the sensing unit 210 includes the one or more pressure sensors, each pressure sensor 211 may detect a change in capacitance or a change in resistance between both ends of a region to which pressure (force) is applied, as illustrated in FIG. 9B. The pressure sensor 211 may transmit, to the control unit 290, at least one of a capacitance change signal indicating the detected change in the capacitance or a resistance change signal indicating the detected change in the resistance. The capacitance change signal or the resistance change signal may include information on at least one of the intensity of the force applied to the pressure sensor 211 or the direction of the force. The control unit 290 may obtain at least one of the direction and the strength of the force applied to the display unit 250 using the capacitance change signal or the resistance change signal received from the pressure sensor 211.

According to another embodiment, the sensing unit 210 may include a plurality of acceleration sensors 213-1 to 213-4, as illustrated in FIG. 9C. Each acceleration sensor may be disposed adjacent to each vertex of a rectangle when the display unit 250 has a rectangular shape. When the display unit 250 includes a flexible substrate and a video display unit to be described later, the acceleration sensors 213-1 to 213-4 are disposed under the flexible substrate, and the video display unit is disposed on the flexible substrate, which are provided by way of example. For example, the acceleration sensors 213-1 to 213-4 may be embedded in the flexible substrate or the image display unit.

The acceleration sensor is a sensor that detects acceleration or impact strength when an object moves. The motion state of the display unit 250 may be detected in detail by the acceleration sensor. The acceleration sensor may sense the acceleration of the display unit 250 in three directions (x-axis, y-axis, and z-axis) perpendicular to each other. The control unit 290 may acquire the moving speed using the accelerations in the three-axis direction measured through the acceleration sensor. The control unit 290 may obtain the expanded distance of the display unit 250 in the three-axis direction using the obtained moving speed. The control unit 290 may acquire the direction and the strength of the force applied to the display unit 250 using the movement speed and the movement distance acquired using the acceleration sensor. The control unit 290 may expand the display unit 250 according to the direction and the strength of the acquired force.

According to another embodiment, the sensing unit 210 may include a plurality of hall sensors. The hall sensors may be disposed inside the display unit 250 or on the display unit 250. When the sensing unit 210 includes a plurality of hall sensors, the control unit 290 may expand or reduce the display unit 250 through a voltage sensed by the hall sensor depending on a force applied to the display unit 250.

The display unit 250 may be stretched in at least one direction. The display unit 250 may include a flexible substrate and an image display unit. The flexible substrate may be formed of a polydimethylsiloxane (PDMS) material with excellent stretchability and may be expanded according to the pulling force. The image display unit is formed on the flexible substrate and may be expanded together as the flexible substrate is expanded. The image display unit may display an image.

The display unit 250 may include an organic light emitting diode (OLED).

The storage unit 270 may match the force applied to the display unit 250 with the degree of expansion or reduction of the display unit 250 corresponding to the intensity of the force and may store the matching result. The degree of expansion of the display unit 250 may indicate the length along which the display unit 250 is expanded and the degree of reduction of the display unit 250 may indicate the length along which the display unit 250 is reduced.

The control unit 290 may expand or reduce the display unit 250 depending on the force sensed through the sensing unit 210. The enlargement of the display unit 250 may indicate that the size of the screen displayed by the display unit 250 is enlarged and the reduction of the display unit 250 may indicate that the size of the screen to be displayed by the display unit 250 is reduced. The control unit 290 may change a graphic or an image displayed on the screen as the screen size of the display unit 250 is enlarged or reduced.

In addition, the control unit 290 may control the whole operation of the flexible display device 200. More detailed operations of the control unit 290 will be described later with reference to accompanying drawings.

Figure 10A:
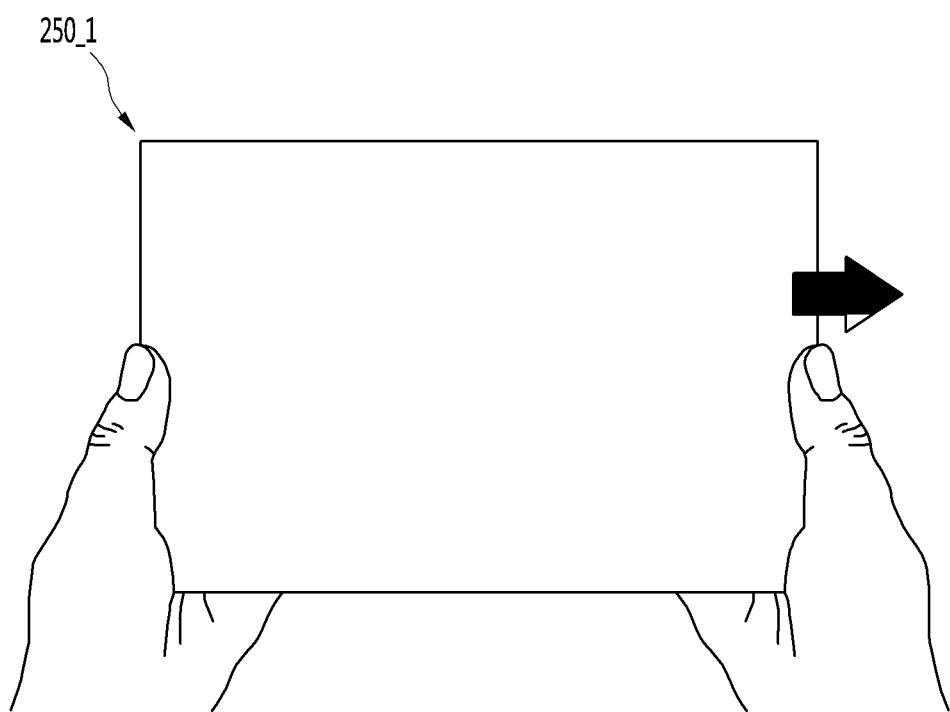
FIGS. 10A and 10B are views illustrating an example of use of a stretchable display device which is an example of a flexible display device.
Figure 10B:
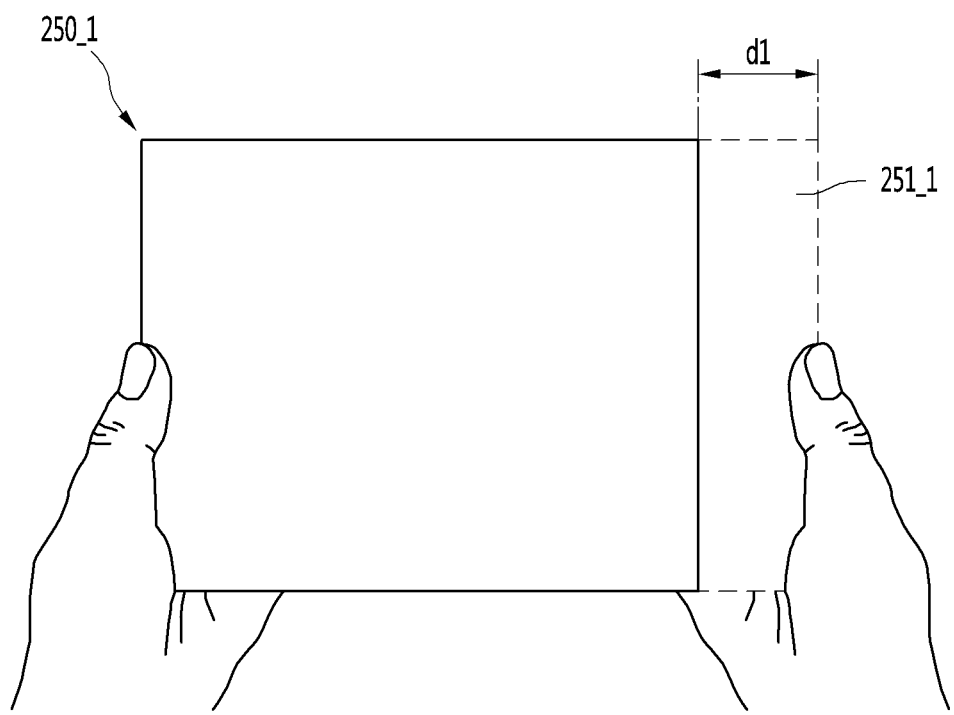

FIGS. 10A and 10B are views illustrating an example of use of a stretchable display device which is an example of a flexible display device.

FIG. 10A illustrates the state of a stretchable display unit 250_1 before the stretchable display unit 200_1 is expanded and contracted. In this state, when force is applied to the display unit 250_1 in a positive x axis direction, the control unit 290 enlarges the display unit 250_1 by an extension distance d1 in the positive x axis direction as illustrated in FIG. 10B. As the display unit 250_1 is expanded, the display unit 250 may be expanded by an expanded area 251_1 corresponding to the expanded distance d1. That is, the screen size of the display unit 250 may be enlarged by the expanded area 251_1. Although the description made with reference to FIG. 10 is made regarding only the force applied in the positive x axis direction by way of example, this is merely an example. In contrast, when a force is applied to the display unit 250_1 in a negative x axis direction, the control unit 290 may return the display unit 250_1 to its original size.

FIGS. 11A to 11F are views illustrating the structure and operation principle of a rollable display device which is an example of a flexible display device according to an embodiment of the present invention.

Figure 11A:
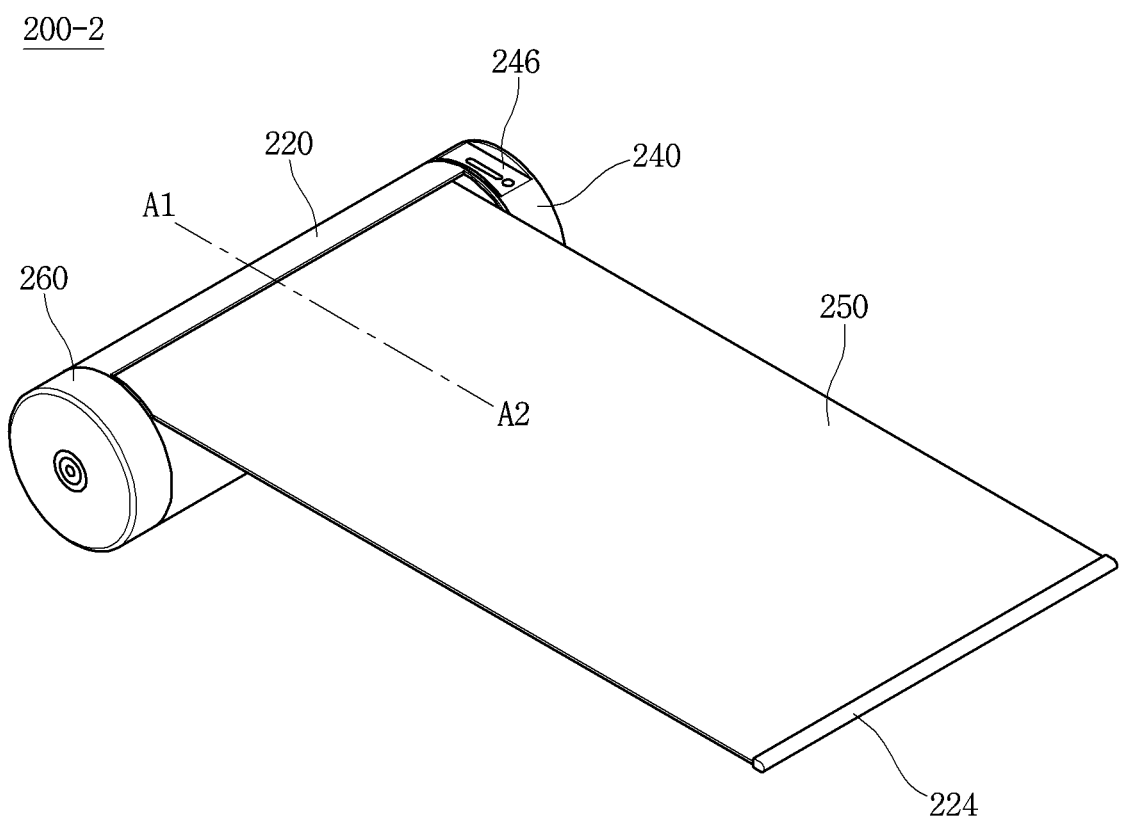
FIGS. 11A to 11I are views illustrating the structure and the operating principle of a rollable display device which is an example of a flexible display device according to an embodiment of the present invention.
Figure 11B:
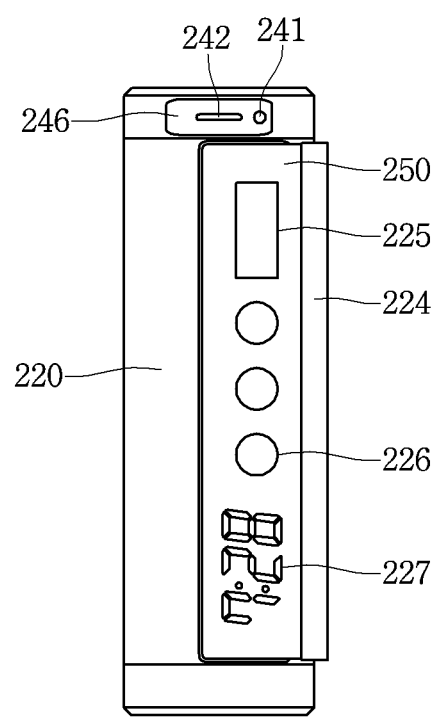
Figure 11C:
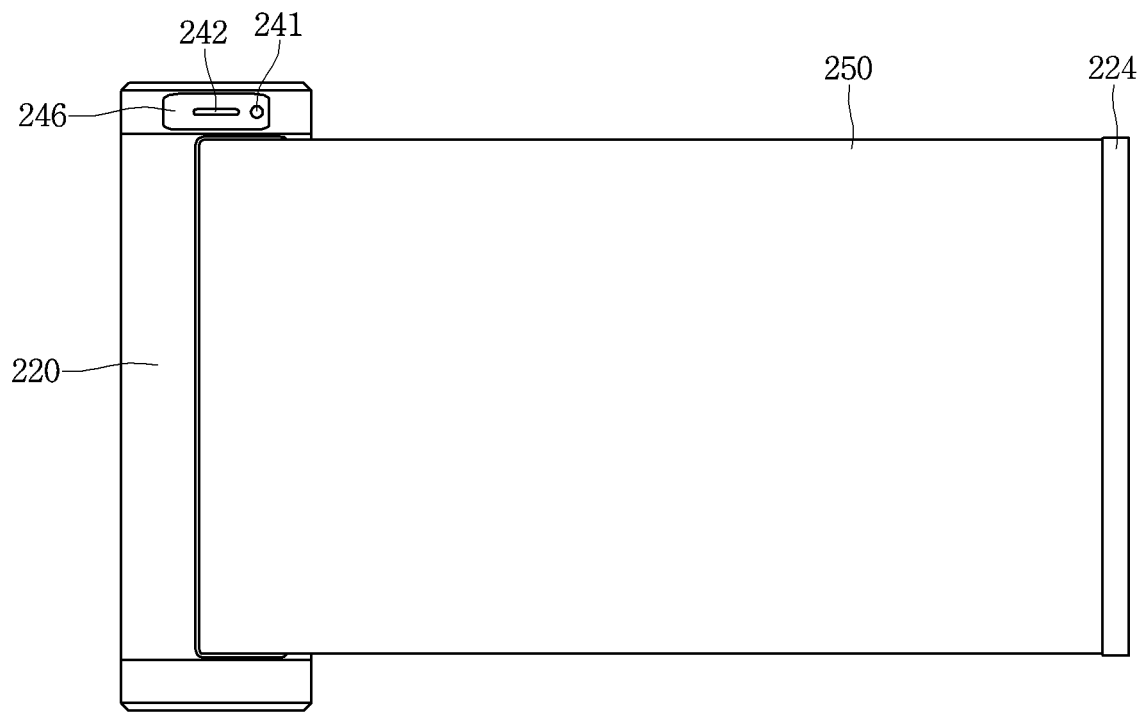
Figure 11D:
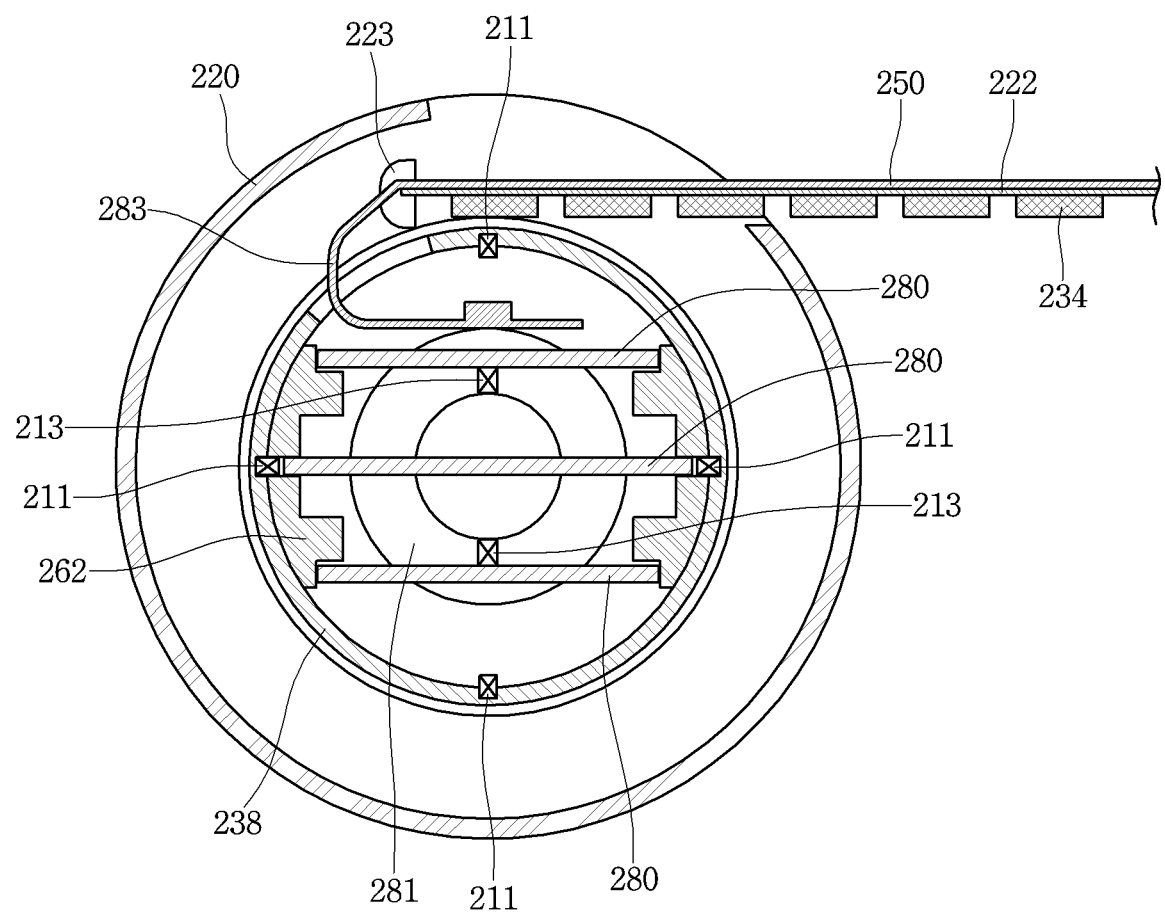
Figure 11E:
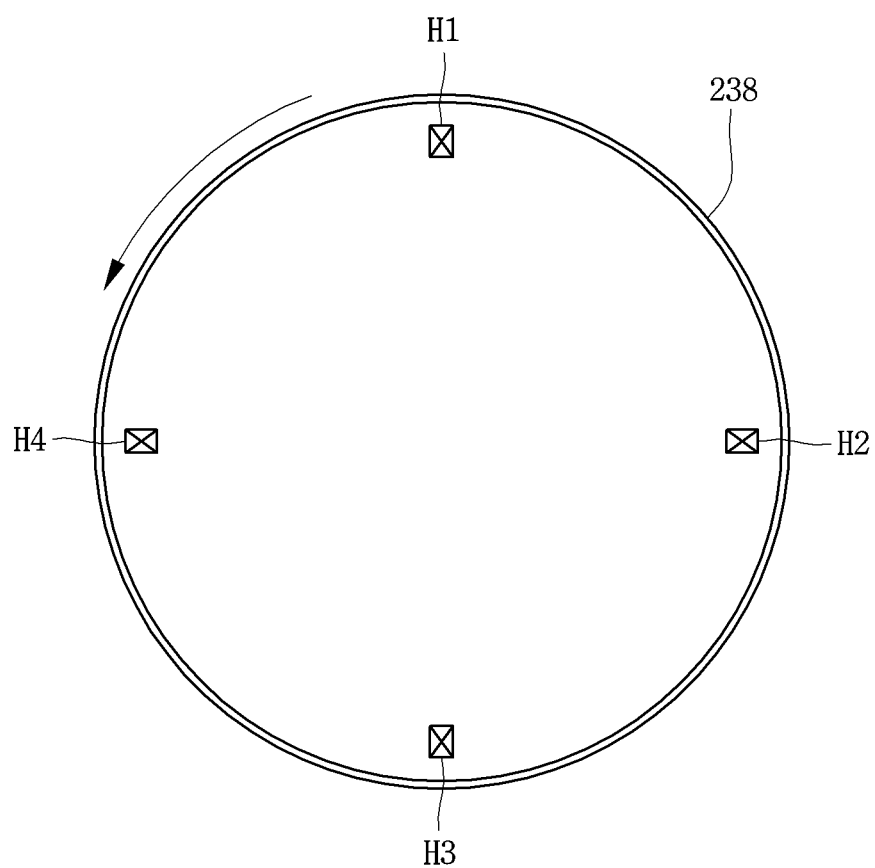
Figure 11F:
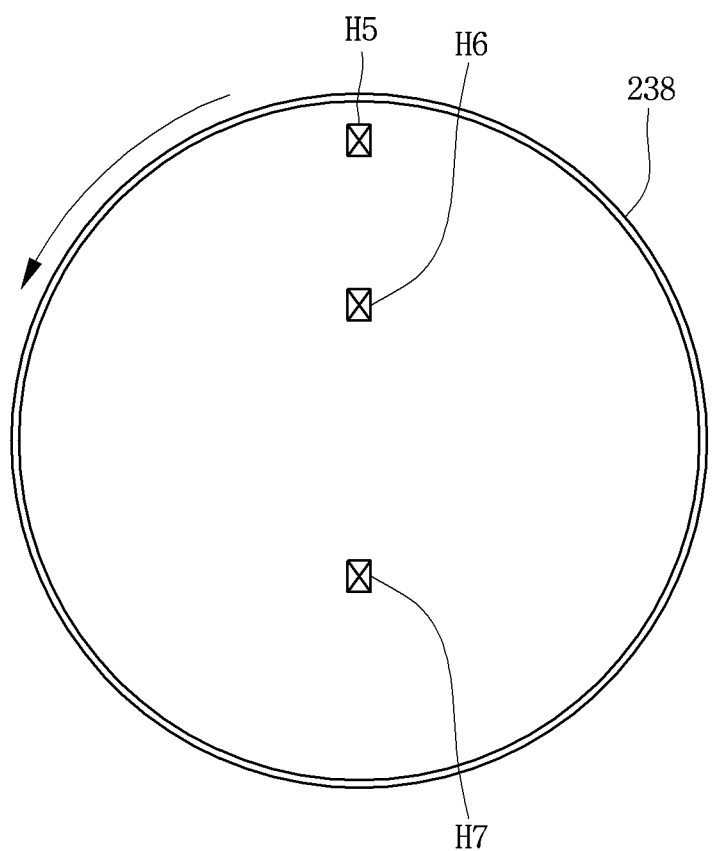

FIG. 11A is a perspective view of a rollable display device according to an embodiment of the present invention, FIG. 11B is a view illustrating a rollable display device in a first operation state according to an embodiment of the present invention, FIG. FIG. 11D is a cross-sectional view of the rollable display device taken along the line A1-A2 in FIG. 311, FIGS. 11E and 11F are cross—FIG. 3 is a view illustrating a process of sensing a length of the spread display unit, the length of the rolled display unit, and a rotation amount of the display unit using a hall sensor according to an embodiment of the present invention.

Referring to FIGS. 11A to 11D, the rollable display device 200-2 includes an upper case 240, an intermediate case 220, a lower case 260, a display unit 250, a first holder 223, and a second holder 223.

The upper case 240, the lower case 260, and the intermediate case 220 form an appearance of the rollable display device 200_2. The intermediate case 220 may have a cylindrical shape, but is not limited thereto, and may have various shapes such as a hexahedron shape. The intermediate case 220 may be partially opened as illustrated in FIG. 11D to expose a part of the display unit 250 to the outside.

The upper case 240 and the lower case 260 may have a structure that covers the intermediate case 220 at upper and lower cases thereof. The upper case 240 and the lower case 260 may not expose various components provided inside the intermediate case 220 to the outside. The upper case 240 may have a recessed part 246 recessed inwardly of the upper case 240 so as to be in the form of a plane. At least one of a camera 241 and an audio output module 242 may be formed in the recess part 246. The first holder 223 (illustrated in FIG. 3D) may be provided at one end of the display unit 250 and the second holder 224 may be provided at an opposite end of the display unit 250. The first holder 223 may prevent the display unit 250 from being detached from the inner side of the intermediate case 220 when the screen of the display unit 250 is maximally expanded. The second holder 224 may prevent the display unit 250 from being rolled toward the inside of the intermediate case 220. The user may expand the screen of the display unit 250 by pulling the second holder 224 in a specific direction.

The display unit 250 may roll in toward the inside of the intermediate case 200 or roll out toward the outside from the intermediate case 220. In other words, the display unit 250 may be unwound, unrolled, or uncoiled toward the inside of the intermediate case 220, or may be unwound, unrolled, or coiled out from the intermediate case 220.

FIG. 11B is a view illustrating that the rollable display device 200-2 is in a first operation state, and FIG. 11C is a view showing being in a second operation state.

In the state that the display unit 250 is not deformed (for example, a state having an infinite radius of curvature; hereinafter referred to as a first operation state), a region displayed by the display unit 250 may be a plane. In the state (e.g., a state having a finite radius of curvature; hereinafter referred to as a second operating state) of the display unit 250 deformed by an external force in the first operating state, a region displayed by the display unit 250 may be a curved surface. As illustrated in the drawings, the information displayed in the second operating state may be visual information output on the curved surface. Such visual information may be realized by independently controlling the light emission of sub-pixels arranged in a matrix form.

The display unit 250 may be placed in a bent state (e.g., the state that the display portion 250 is bent up and down or left and right) instead of a flat state in the first operation state. In this case, if an external force is applied to the display unit 250, the display unit 250 may be deformed into the flat state (or a less bent state) or a more bent state.

Meanwhile, the display unit 250 may be combined with a touch sensor to realize a flexible touch screen. When a touch is made to the flexible touch screen, the control unit 290 may perform control corresponding to the touch input. The flexible touch screen may sense the touch input not only in the first operating state but also in the second operating state.

Meanwhile, the rollable display device 200-2 according to an embodiment of the present invention may include a deformation sensing unit for sensing deformation of the display unit 250. The deformation sensing unit may be included in the sensing unit 210 (see FIG. 9A).

The deformation sensing unit may be provided in the display unit 250 or the intermediate case 220 to sense information related to the deformation of the display unit 250. In this case, the information related to the deformation may be the deformation direction of the display unit 250, the deformation degree of the display unit, the deformed position of the display unit, the deformation time, and the acceleration at which the deformed display unit 250 is restored. In addition, the information may be various pieces of information that may be sensed as the display unit 250 is bent.

The control unit 290 may change the information displayed on the display unit 250 or may generate a control signal to control the function of the rollable display device 200-2, based on the information related to the deformation of the display unit 250.

According to one embodiment of the present invention, the first operation state of the rollable display device 200-2, which is an inactive state, may refer to a state that only a minimum display region is exposed to the outside. The second operation state of the rollable display device 200-2, which is an active state, may refer to the state that the display unit 250 is expanded. The expanded display unit 250 may refer to that the screen displayed by the display unit 250 is expanded. The expansion at this time is gradually made. The display region of the rollable display device 200-2 may be expanded or reduced by rolling the display unit 250. The display region of the rollable display device 200-2 may be expanded or reduced by rolling the display unit 250. In this case, although the expansion or the reduction of the rollable display device 200-2 may be realized one time, the change of the display region may be gradually expanded or reduced. Accordingly, all states except for the first operation state may be named the second operation state. The second operation state may be divided into a plurality of stages according to the expansion degrees.

As illustrated in FIG. 11B, only regions, such as a message window 225, an icon 226, or a time display unit 227, are displayed in the first operation, thereby minimizing the exposure region of the display unit 250. However, the exposed region of the display unit 250 is maximized to display information in a larger screen as illustrated in FIG. 3C in the second operation. If necessary, it is assumed that FIG. 11C illustrates the state that the display unit 250 is maximally expanded.

The control unit 290 (illustrated in FIG. 9A) may sense the unwinding length of the display unit 250 and may turn on or off a part of the display unit 250 based on the unwinding length of the display unit 250. For example, the control unit 290 may acquire the length that the display unit 250 is unwound toward the outside of the open region of the intermediate case 220. The control unit 290 may turn off the display unit 250 disposed inside the intermediate case 220 and may turn on the display unit 250 unwounded from the open region of the intermediate case 220. That the part of the display unit 250 is turned on may refer to that power is applied such that the part of the display unit 250 displays information. That the part of the display unit 250 is turned off may refer that that the power is not applied such that the part of the display unit 250 does not display information. A part of the display unit 250, which is not unwound to the outside of the intermediate case 220, is turned off, so the unnecessary power consumption and heat radiation may be prevented.

When the display unit 250 is separated from the outer circumferential surface of the inner case 238, the control unit 290 may turn on the separated part and turn off the not-separated part. The control unit 290 may detect that the display unit 250 is separated from the outer circumferential surface of the inner case 238 by using the length sensing unit 211 disposed on the inner circumferential surface of the inner case 238. Accordingly, the control unit 290 may turn on the separated part and turn off the non-separated part.

Referring to FIG. 11D, a shaft 281, an inner case 238, a length sensing unit 211, a rotation amount sensing unit 213, a plurality of circuit boards 280, a printed circuit board 283, and a support frame 262 may be formed inside the intermediate case 220.

The shaft 281 may be rotated as the inner case 238 is rotated.

The inner case 238 may be configured in the form of a roller to be rotatable, and may perform a function of winding or unwinding the display unit 250 according to the rotation. The inner case 238 is axially connected with the intermediate case 220 to be is rotatable.

The length sensing unit 211 may sense the winding length of the display unit 250 or the unwinding length of the display unit 250. The length sensing unit 211 may include a magnetic member. The length sensing unit 211 may include at least one hall sensor. The length sensing unit 211 will be described later in detail.

The rotation amount sensing unit 213 may sense the number of times that the display unit 250 is wound on the inner case 238. In other words, the rotation amount sensing unit 213 may sense how many times the display unit 250 is wound as the display unit 250 is wound on the inner case 238. The rotation amount sensing unit 213 may include a magnetic member. The rotation amount sensing unit 213 may include at least one hall sensor. This will be described in detail later.

Each of the plurality of circuit boards 280 may mount a plurality of electronic circuit components for operation of the rollable display device 200-2.

The flexible circuit board 283 may connect the display unit 250 with the electronic circuit components mounted on the inner case 238. The electronic circuit component may include one or more of the sensing unit 210, the storage unit 270, and the control unit 290 illustrated in FIG. 1A.

A support frame 262 supports the circuit board 280 and may be provided inside the inner case 238.

The inner case 238 may be rotated by the magnetic force between the length sensing unit 211 and rolling sensing units 234 spaced apart from each other under the display unit 250. The rolling sensing unit 234 may include a magnetic member and may include one or more hall sensors. The display unit 250 may be rotated together with the inner case 238 while being wound on the inner case 238 by the magnetic force. Specifically, the display unit 250 may be rolled by an attractive force between the rolling sensing unit 234 and the length sensing unit 211. For example, when the length sensing portion 211 includes a magnetic member of an N pole and the rolling sensing unit 234 includes a magnetic member of an S pole, they are attracted to each other by their attractions. The position sensing unit 211 may be fixed in position. The rolling sensing unit 234 is attracted while linearly moving toward the length sensing unit 211 and the rolling sensing units 234, which are subsequently formed while being spaced apart from each other, are continuously introduced into the intermediate case 220. Rolling sensing units 234, which have already been introduced, continuously interact with the length sensing unit 211, so that the rolling sensing units 234 rotate about the length sensing unit 211 while maintaining the balance in the attractive force between the rolling sensing unit 234, which is newly introduced, and the length sensing unit 211, 234. Through such a mechanism, the display unit 250 is rolled while being wounded.

The display unit 250 is provided on the bottom surface thereof with a sheet 222 having the rolling sensing unit 234. The sheet 222 may be included in the display unit 250 and may be provided separately from the display unit 250. The sheet 222 may have a flexible material. For example, the sheet 222 may be silicone or Thermoplastic Poly Urethane (TPU). The sheet 222 may be attached in the form of a sheet frame to the bottom surface of the display unit 250, and sequentially fixes the rolling sensing units 234. The sheet 222 may be formed through bonding, taping, or inserting molding. In addition, the sheet 222 has a thin thickness with a flexible property and may be formed of a material representing excellent elasticity and elongation. This is to allow the rolling sensing units 234 to have the same magnetic polarity so the display units 250 are spread due to the repulsive force to be flat. In other words, the rolling sensing units 234 having the same magnetic polarity generate repulsive force therebetween to push the rolling sensing units 234 adjacent to each other such that the display units 250 are spread to be flat.

The length sensing unit 2111 may sense the magnetic force with the rolling sensing unit 234 to calculate the winding length or the unwinding length of the display unit 250. The rotation amount sensing unit 213 may sense the number of frequencies that the display unit 250 is wound around the outer circumferential surface of the internal case 238. The details thereof will be described with reference to FIGS. 11E and 11F.

Referring to FIG. 11E, the length sensing unit 211 may include four hall sensors H1, H2, H3, and H4. Four hall sensors are spaced apart from each other at regular distances along the inner circumferential surface of the inner case 238 or in a circumferential direction of the inner case 238 in the internal space. In this case, the first to fourth hall sensors H1, H2, H3, H4 sense the variation in the magnetic force of the rolling sensing units 234 in the circumferential direction of the inner case 238.

The arrows in FIGS. 11E and 11F indicate the rotation direction of the inner case 238. Regarding the first to fourth hall sensors H1, H2, H3, and H4, only the first hall sensor H1 senses the rolling sensing unit 234 in the state of the second operation that the display unit 250 is exposed to the maximum extent as the inner case 238 is rotated. Thereafter, when the inner case 238 rotates counterclockwise, the display unit 250 is wound on the inner case 238 and the second hall sensor H2, the third hall sensor H3, and the fourth hall sensor H4 sequentially sense the rolling sensing unit 234. As described above, the first to fourth hall sensors H1, H2, H3, and H4 provide information for measuring the length of the display unit 250 wound along the inner circumferential surface of the inner case 238. The control unit 290 may detect the last sensor sensing the rolling sensing unit 234 when the display unit 250 is wound or unwound. Accordingly, the control unit 290 may calculate the winding length or the unwinding length of the display unit 250. Similarly, the control unit 290 may calculate the winding length or the unwinding length even when the display unit 250 is wound on the inner case 238 several times.

When the display unit 250 is wound on the outer surface of the inner case 238 doubly or more, the variation in magnetic force is made in a radius direction of the inner case 238. Accordingly, when a hall sensor sensing the variation in the magnetic force is provided, the winding length of the display unit 250 may be more exactly measured.

For example, as illustrated in FIG. 11F, if at least two hall sensors are spaced apart from each other at predetermined distances in the radius direction of the inner case 238, the hall sensors may sense the variation in the magnetic force of the rolling sensing unit 234 stacked on each other at least two times. Accordingly, the winding length of the display unit 250 may be more exactly calculated. FIG. 11F illustrates that three sensors of the fifth to seventh hall sensors H5, H6, and H7 are disposed only for the illustrative purpose. In other words, the fifth to seventh hall sensors H5, H6, and H7 senses the variation in the magnetic force, which is caused by the rolling sensing unit 234, in the radius direction of the inner case 238.

In more detail, the control unit 290 may calculate the winding length of the display unit 250 owing to the first to fourth hall sensors H1, H2, H3, and H4 while the display unit 250 is wound on the inner case 238 in one layer in the second operation state (that is, the state of FIG. 3D). When the display unit 250 is wound on the inner case 238 while being stacked on each other in two layers, the fifth to seventh hall sensors H5, H6, and H7 sense the variation in the magnetic force in the radius direction. The control unit 290 may acquire the frequency of times that the display unit 250 is wound by using the variation in the magnetic force sensed through the fifth to seventh hall sensors H5, H6, and H7. The following winding length may be calculated by the first to fourth hall sensors H1, H2, H3, and H4. If the display unit 250 is stacked in three layers in the radius direction that the fifth to seventh hall sensors H5, H6, and H7, the variation in the magnetic force may be sensed by the fifth to seventh hall sensors H5, H6, and H7. As described above, the control unit 290 may calculate the length of the display unit 250 wound on the outer circumferential surface of the inner case 238 through the first to fourth hall sensors H1, H2, H3, and H4. In addition, the control unit 290 may calculate the number of times that the display unit 250 is wound on the outer circumferential surface of the inner case 283.

According to another embodiment of the present invention, the rollable display device 200-2 may further include an upper case 240, an intermediate case 220, and a lower case 260 at an opposite end portion of the display unit 250. The components described made with reference FIG. 3D may be included inside the intermediate case 200. Accordingly, a user may expand or reduce the display unit 250 by holding the rollable display device 200-2 with both ends of the user.

Figure 11G:
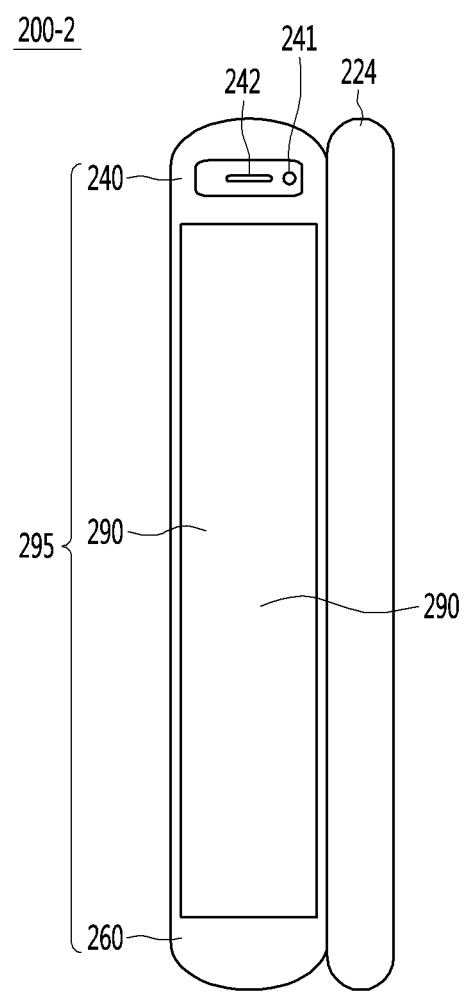
Figure 11H:
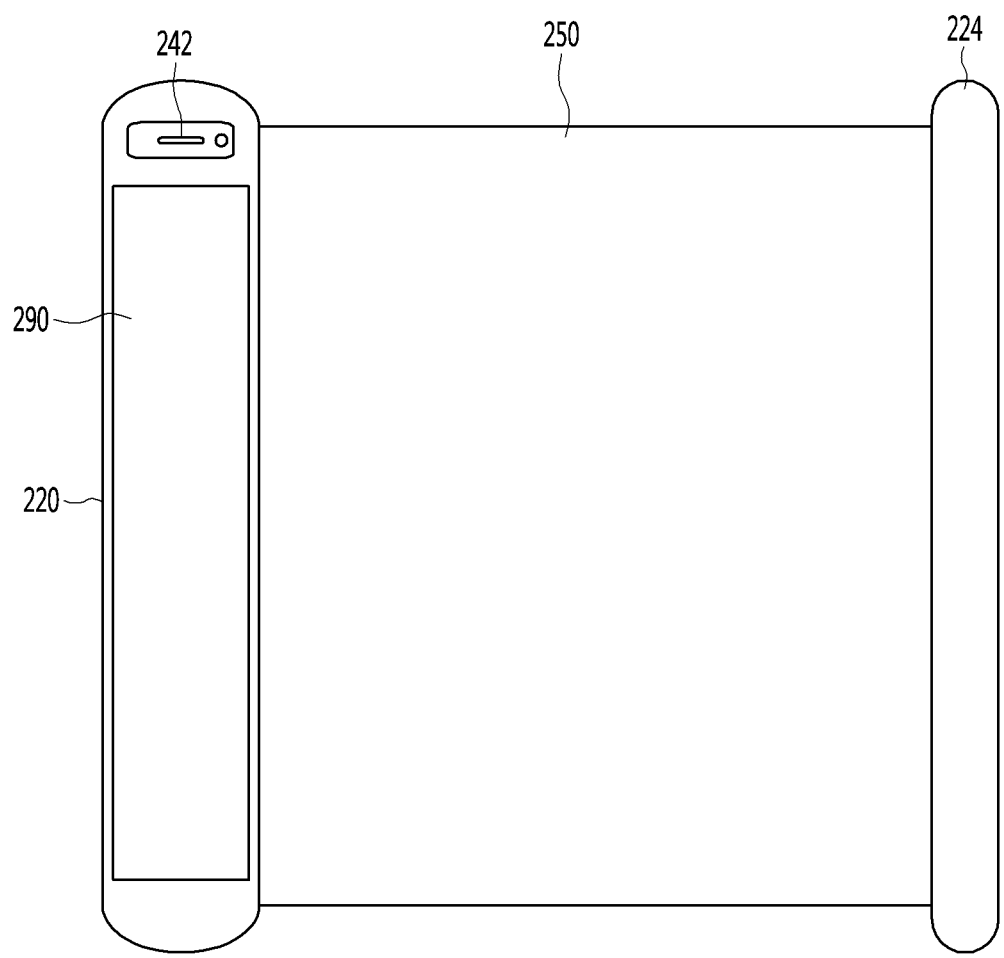

FIGS. 11G to 11H are views illustrating a rollable display device according to another embodiment of the present invention.

According to the present embodiment, the rollable display device 200-2 may include a case 295, a holder 224, and an audio output module 242. In this case, the case 295 may include an upper case 240, a lower case 260, and an intermediate case 260.

Meanwhile, the case 295 may receive the first display unit 250. In addition, a home button and a second display unit 290 may be mounted in the case 295.

In addition, according to the present embodiment, the rollable display device 200-2 may include the first display unit 250 as illustrated in FIG. 11H.

Meanwhile, the first display unit 250 may be provided at one end portion thereof with a second holder 224. The first holder (not illustrated) may be provided on an opposite end portion of the first display unit 250.

Meanwhile, the upper case 240, the lower case 260, and the intermediate case 220, the first display unit 250, the first holder (not illustrated) and the second holder 224 of the rollable display device 200-2 described with reference to FIGS. 11G to 11H may correspond to the upper case 240, the lower case 260, and the intermediate case 260, the first display unit 250, the first holder 223, and the second holder 224 of the rollable display device 200-2 described with reference to FIGS. 11A to 11F and may perform the functions of the upper case 240, the lower case 260, the intermediate case 260, the first display unit 250, the first holder 223, and the second holder 224 described with reference to FIGS. 11A to 11F.

In addition, according to the present embodiment, the rollable display device 200-2 may include all components of the rollable display device described with reference to FIGS. 11A to 11F.

Meanwhile, according to the present embodiment, the rollable display device 200-2 may include the second display unit 290.

The display unit 290 may form a layer structure together with a touch sensor and may be integrated with the touch sensor, thereby realizing a touch screen. A touch sensor is included in the touch screen to serve as a user input unit. In addition, the display unit 290 displays information to be processed by the rollable display device 200-2, thereby providing an output interface between the rollable display device 200-2 and the user.

Meanwhile, the rollable display device 200-2 illustrated in FIG. 11G has the display unit 250 which is not deformed and the first screen on the first display unit 250 is not exposed to the outside. Accordingly, as illustrated in FIG. 3G, the state that the first display unit 250 is not deformed and thus the first screen is not exposed to the outside may be defined as "the state that the first screen is closed".

In addition, the rollable display device 200-2 illustrated in FIG. 11H has the first display unit 250 which is expanded and the first screen on the first display unit 250 is exposed to the outside. Therefore, the state that the first display unit 250 is expanded so the first screen is exposed to the outside may be defined as "the state that the first screen is open".

Meanwhile, in the sectional view of FIG. 11D in which the rollable display device is cropped, a portion of the upper part of the rollable display device is open so a portion of the display unit 250 is exposed to the outside when viewed from the sectional view of the rollable display device.

Figure 11I:
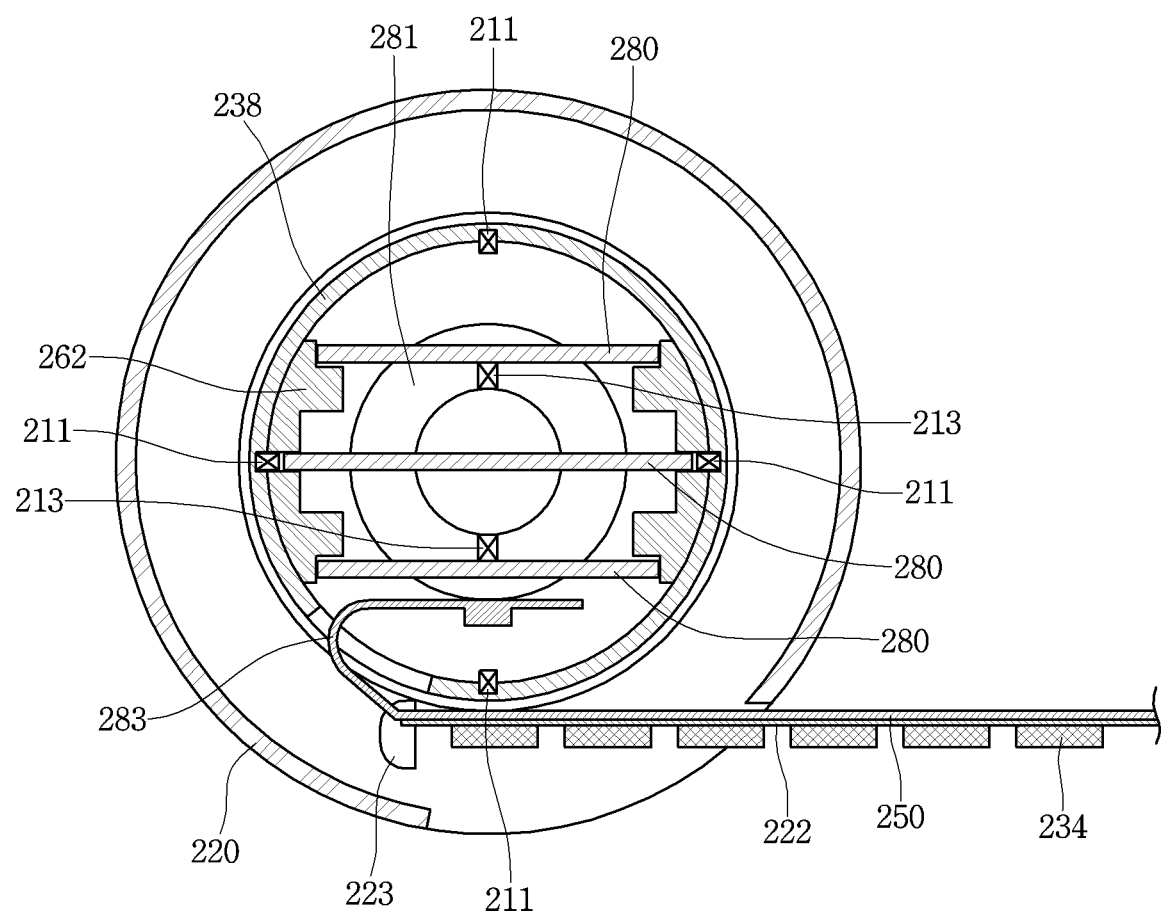

In addition, as illustrated in FIG. 11I, a portion of a lower portion of the rollable display device is open when viewed from the sectional view, so a portion of the first display unit 250 may be exposed to the outside.

In this case, the rotation direction of the inner case 238 of FIG. 11I may be opposite to the rotation direction of the inner case 238 of FIG. 11D. The surface on which the sheet 222 and the rolling sensing unit 234 are provided may be different from the surface on which the surface 222 and the rolling sensing unit 234 are provided in FIG. 3D.

Figure 11J:
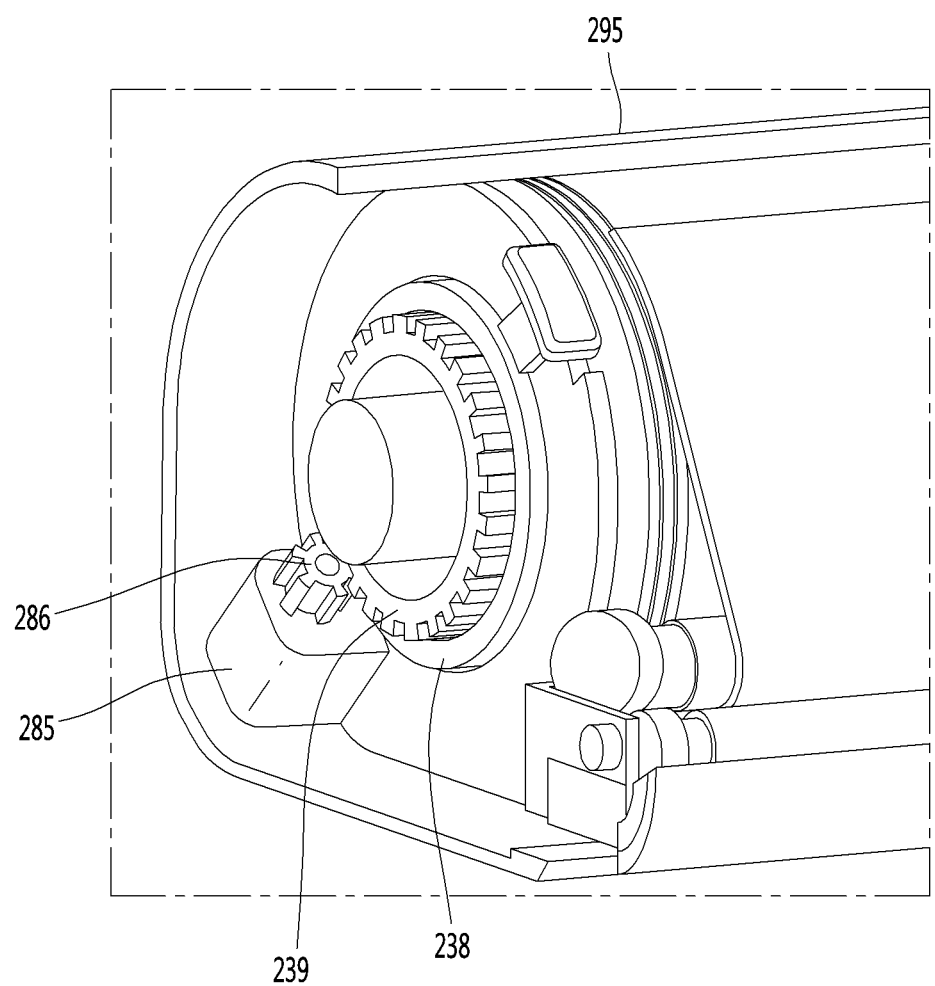
FIG. 11J is a view illustrating a method of expanding or reducing the screen of a rollable display device 200-2.

Meanwhile, FIG. 11J is a view illustrating a method of expanding or reducing a screen of the rollable display device 200-2.

The display unit 250 of the rollable display device 200-2 may include a driving device. In addition, the driving device may include a rotation driving unit 285 and a first power transmitting unit 286. Meanwhile, the inner case 238 may include a second power transmitting unit 239.

Meanwhile, the power generated from the rotation driving unit 285 may be transmitted to the second power transmitting unit 239 through the first power transmitting unit 286. The second power transmitting unit 239 may transmit power received from the first power transmitting unit 286 to the inner case 238.

Meanwhile, the driving device may generate driving force in a first direction or may generate driving force in a second direction.

Meanwhile, when driving force is generated in the first direction from the driving device, the driving force in the first direction may be transmitted to the inner case 238. In this case, the inner case 238 may rotate in a third direction to wind the display unit. Meanwhile, when the display unit is wound, the screen of the rollable display device 200-2 is expanded.

Meanwhile, when the driving force is generated in the second direction from the driving device, the driving force in the second direction may be transmitted to the inner case 238. In this case, the inner case may rotate in the fourth direction to wind the display unit. Meanwhile, if the display unit is wound, the screen of the rollable display device 200-2 is reduced.

Figure 11K:
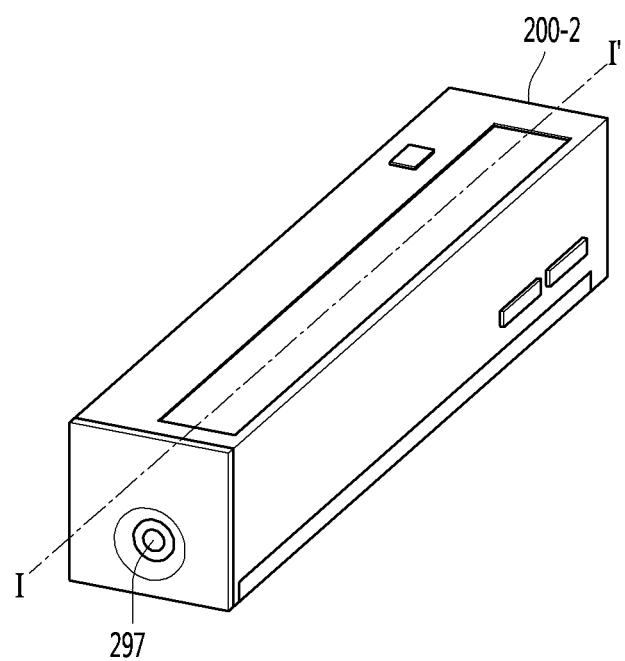
FIGS. 11K to 11M are views illustrating a pen 297 included in the rollable display device 200-2 according to an embodiment of the present invention.
Figure 11L:
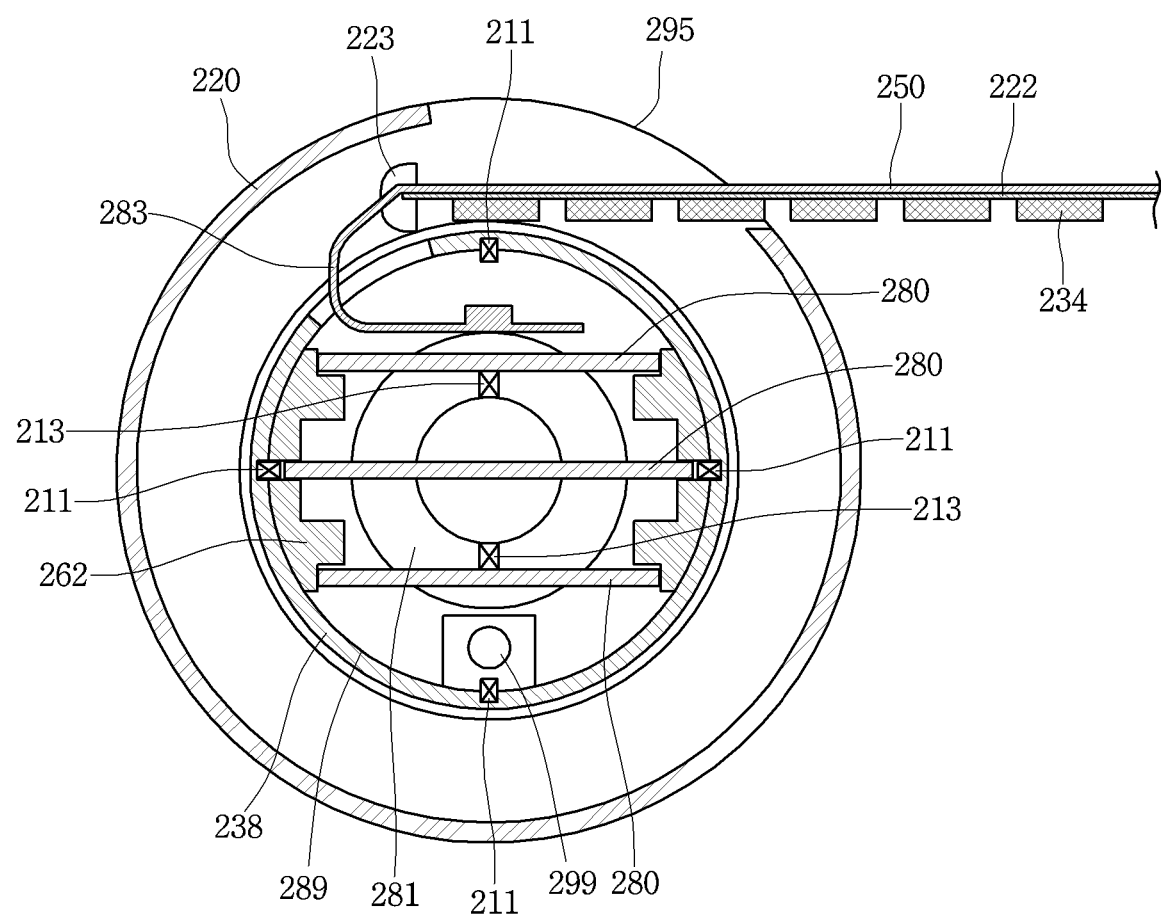
Figure 11M:
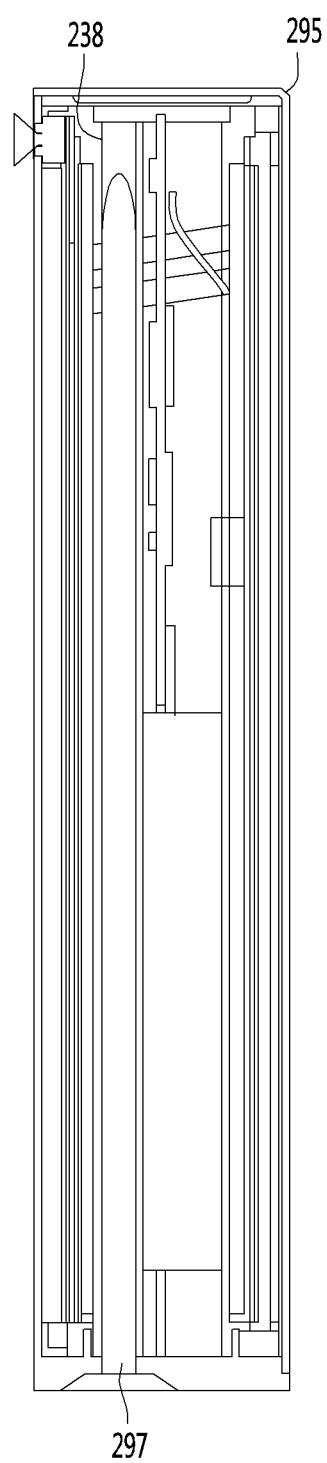

FIGS. 11K to 11M are views illustrating a pen 297 included in the rollable display device 200-2 according to an embodiment of the present invention.

The description on the pen 195 made with reference to FIGS. 2 to 10 may be applied to a pen 297 included in the rollable display device 200-2.

The rollable display device 200-2 may include the pen 297. The pen 297 may be attached to or detached from the rollable display device 200. The pen 297 makes a touch to a screen of the display unit to provide an input to the rollable display device 200-2. In this case, the pen 195 may a stylus pen.

FIG. 11K is a view illustrating the rollable display device 200-2 to which the pen 297 is attached.

FIG. 11L is a view illustrating the rollable display device 200-2 to which the pen 299 is additionally attached in the rollable display device 200-2 illustrated in FIG. 11D.

FIG. 11M is a sectional view of the rollable display device 200-2 taken along line I-I' illustrated in FIG. 11K.

The pen 299 may be located positioned the inner case 238. However, despite the inner case 238 is rotated, the pen 299 may be mounted at a fixed position.

Meanwhile, the description of the pen 195 made with reference to FIGS. 2 to 10 may be applied to the pen 297 included in the rollable display device 200-2 without change. That is, when the user pulls the pen 297 while the pen 297 is attached to the rollable display device 200-2, a part or an entire part of the pen 297 may be removed, and the pen 297 may rotate according to the handling of the user rotting the pen 297.

Meanwhile, the sensing unit of the rollable display device 200-2 may sense movement and rotation of the pen 297. The control unit determines whether the pen is detached, mounted, or rotated based on the sensing result of the sensing unit, and may perform a control operation according to the determination result.

Meanwhile, the flexible display device 200 may include at least one of the components of the mobile terminal 100 described above with reference to FIG. 1. In this case, the elements included in the flexible display device 200 may perform the same function as those in the mobile terminal 100 described above with reference to FIG. 1. For example, the sensing unit 210 of the flexible display device 200 may perform the function of the sensing unit 140 of the mobile terminal 100, and the display unit 250 may display the sensing unit 210 of the mobile terminal 100. In addition, the storage unit 270 may perform the function of the memory 170 of the mobile terminal 100.

Therefore, the following description will be made with the configuration and reference numerals of the mobile terminal 100, but the following description may be applied to the flexible display device 200 that may include the components of the mobile terminal 100. The following configuration of the flexible display device 200 described below may perform not only the functions of the mobile terminal 100 described above, but also the functions of the flexible display device 200 described above. For example, if the flexible display device 200 is described together with a display unit 151, the display unit 151 may perform the functions of the display unit 180 of the mobile terminal 100 illustrated in FIGS. 1 to 8. In addition, the display unit 151 may perform all the functions of the display unit 250 of the flexible display device 200 described with reference to FIGS. 9 to 11.

Next, various embodiments of the method of operating of the rollable display device 200_2 will be described. However, the following description may be applied to the flexible display device 200 as well as the rollable display device 200_2. In other words, the following embodiments may be applied to both the stretchable display device 200_1 described in FIGS. 10A to 10B and the rollable display device 200_2 described in FIGS. 11A to 11F.

FIGS. 12 to 15 are views illustrating a rollable display device which is expanded according to the detachment of a pen according to an embodiment of the present invention.

The roller-bar display device 200-2 may include a display unit 151 configured to display information on a screen and configured to expand or reduce the screen.

The rollable display device 200-2 may include a control unit 180 that controls the display unit 151 to expand the screen as the pen 195 is detached.

Figure 12:
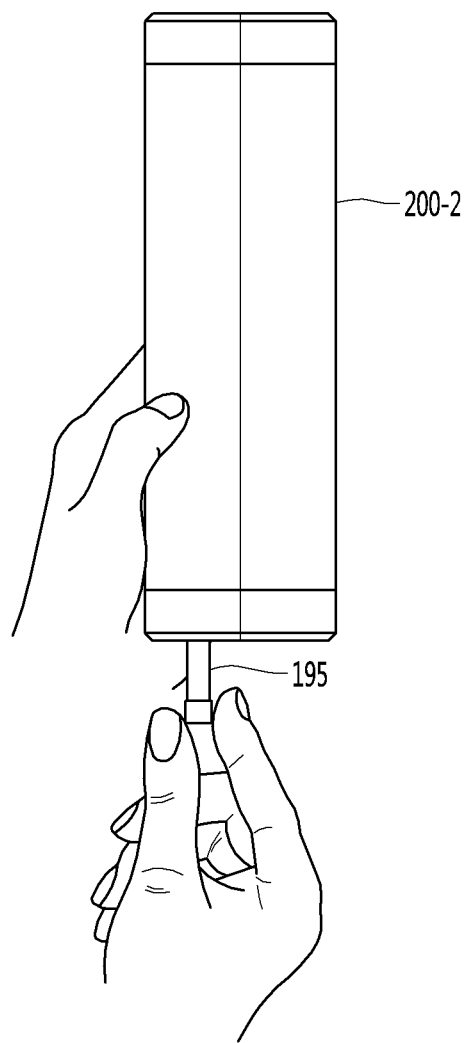
FIGS. 12 to 15 are views illustrating that a rollable display device is expanded according to the detachment of a pen according to an embodiment of the present invention.

Specifically, as illustrated in FIG. 12, in the state that the pen 195 is attached to the rollable display device 200-2, the user may pull the pen 195 to attach and detach the pen 195.

Figure 13:
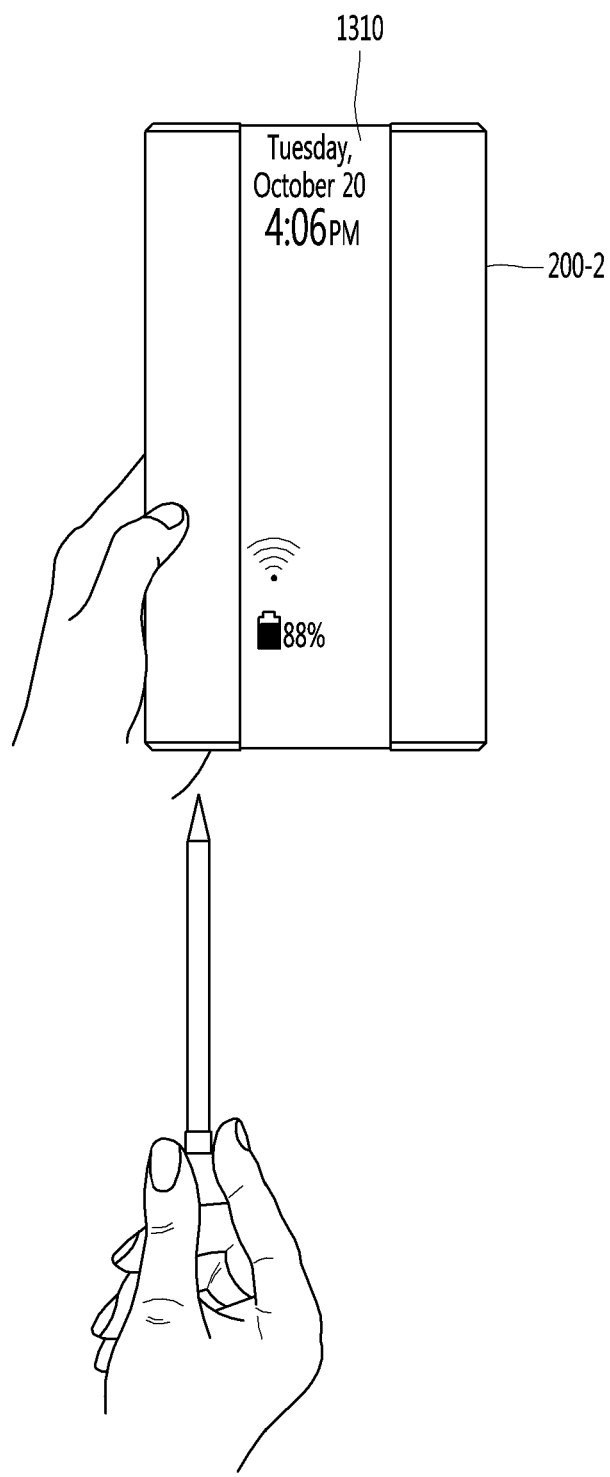

As illustrated in FIG. 13, the control unit 180 controls the display unit 151 to expand the screen 1310 of the rollable display device 200-2.

Specifically, when the detachment of the pen 195 is detected, the control unit 180 may control the driving unit to generate the driving force in the first direction. Meanwhile, when the driving force in the first direction is generated in the driving device, the driving force in the first direction may be transmitted to the inner case 238. The inner case 238 is rotated by the transmitted driving force to withdraw the display unit, so the screen of the rollable display device 200-2 may be expanded.

Meanwhile, if the detachment of the pen 195, the control unit 180 may control the display unit 151 to expand the screen 1310 of the rollable display device 200-2 by a specific length.

For example, if it is determined that the memo application is to be executed when the pen 195 is detached, the control unit 180 may expand the screen 1310 by a specific length such that the screen 1310 include the entire portion of the execution image of the memo application without being cropped.

Meanwhile, the size of the execution image of the memo application when the execution mode of the memo application is the pen mode may be different from the size of the execution image of the memo application when the execution mode of the memo application is the text mode.

In other words, when the memo application is executed by another input, the control unit 180 executes the memo application in the text mode and expands the screen by a first specific length to include the entire portion of the execution image of the memo application in the text mode. Meanwhile, when the pen 195 is detached, the control unit 180 executes the memo application in the pen mode, and may expand the screen 1310 by a second specific length such that the entire portion of the execution image of the memo application is included.

Meanwhile, when the pen 195 is detached, the memo application is executed and the screen is expanded such that the entire portion of an execution image is covered. However, the present invention is not limited thereto, and when the pen 195 is detached, an application different from the memo application is executed, and the screen may be expanded by a specific length such that the entire portion of the execution image of the specific application is covered.

Execution images of a plurality of applications may have different sizes from each other. Therefore, according to the present invention, when the pen is detached, and a screen is expanded in size suitable for the execution image of the application executed. Accordingly, the screen having the optimal size may be provided depending on the executed applications.

Meanwhile, when the detachment of the pen 195 is detected, the control unit 180 may execute an application while expanding the screen 1310 of the rollable display device 200-2 and may display an execution image of the application on the expanded screen. In this case, the executed application may be a memo application.

Specifically, when the detachment of the pen 195 is detected, the control unit 180 expands the screen 1310 of the rollable display device 200-2, executes the memo application, and displays the execution image of the memo application.

Figure 14:
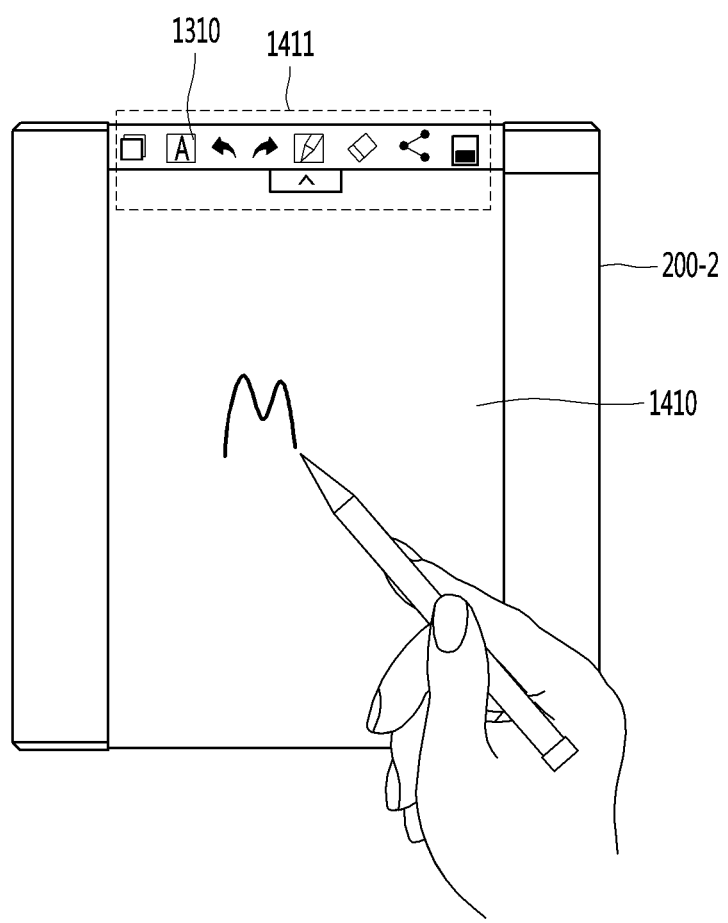

Meanwhile, the execution mode of the memo application executed when the pen 195 is detached may be the pen mode. In detail, when the detachment of the pen 195 is sensed, the control unit 180 may execute a memo application in the pen mode and may display an execution image 1410 of the memo application in the pen mode as illustrated in FIG. 14.

Meanwhile, the execution image 1410 of the memo application in the pen mode may include a palette UI 1411 used for making a memo using the pen 195.

Meanwhile, when the pen 195 is attached or detached while a specific application is being executed, the control unit 180 expands the screen 1310 of the rollable display device 200-2 and executes the memo application, and may display an execution image of the memo application on the expanded screen.

Specifically, as illustrated in FIG. 12, the application may be running in the state that the screen is closed (the screen is not expanded). For example, in the rollable display device 200-2 in the state that the screen is closed, a telephone call application may be being run. The user may perform a telephone call in the state that the screen is closed.

In this case, when the detachment of the pen 195 is detected while the telephone call application is being executed, the control unit 180 executes the memo application together with the screen 1310 of the rollable display device 200-2. The execution image of the memo application is displayed on the expanded screen, thereby providing an environment in which a user makes a memo while perform a telephone call.

Meanwhile, although the present embodiment has been described in that, when the detachment of the pen 195 is detected, the memo application is executed and the execution image of the memo application is displayed. However, the present invention is not limited thereto.

Figure 15:
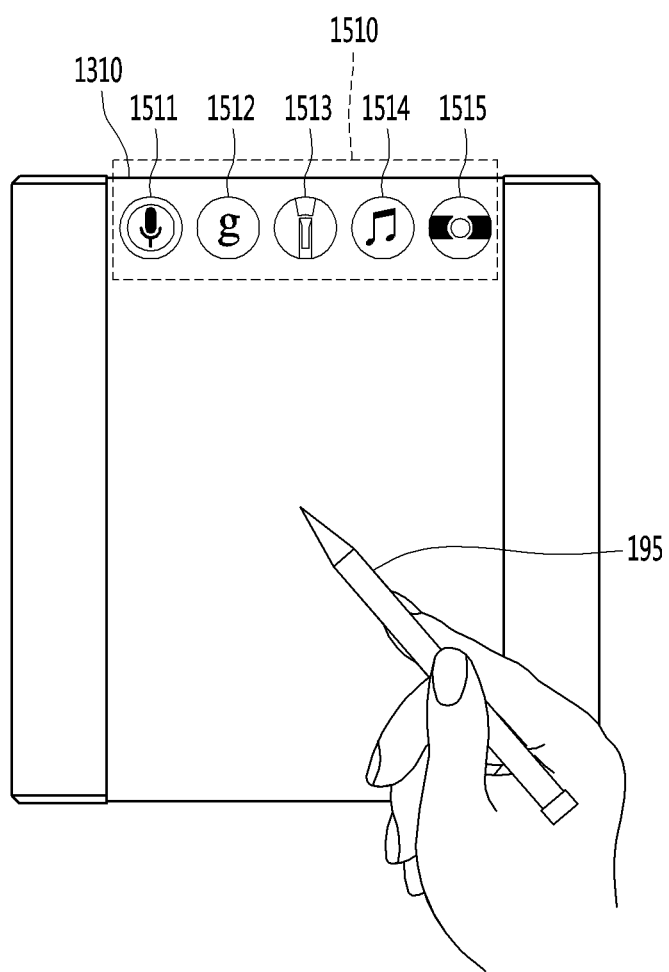

In detail, as illustrated in FIG. 15, when the detachment of the pen 195 is detected, the control unit 180 expands the screen 1310 of the rollable display device 200-2, and displays one or more icons 1511, 1512, 1513, 1514, and 1515 corresponding to one or applications. In this case, one or more applications allow a user to perform a control by using the pen 195. For example, the application may include a memo application.

Meanwhile, when an input for selecting a specific icon among the one or more icons 1511, 1512, 1513, 1514, and 1515 is received, the control unit 180 may execute a specific application corresponding to the specific icon and display an execution image of a specific application.

In this case, the control unit 180 may expand or reduce a screen 1310 such that the screen 1310 has the size corresponding to the size of the execution image of the specific application. For example, the control unit 180 may expand the screen 1310 by a specific length so that the entire portion of the execution image of a specific application may be included without being truncated. For another example, the control unit 180 may reduce the screen 1310 by a specific length so that the screen 1310 includes only the execution image of the specific application.

Figure 16:
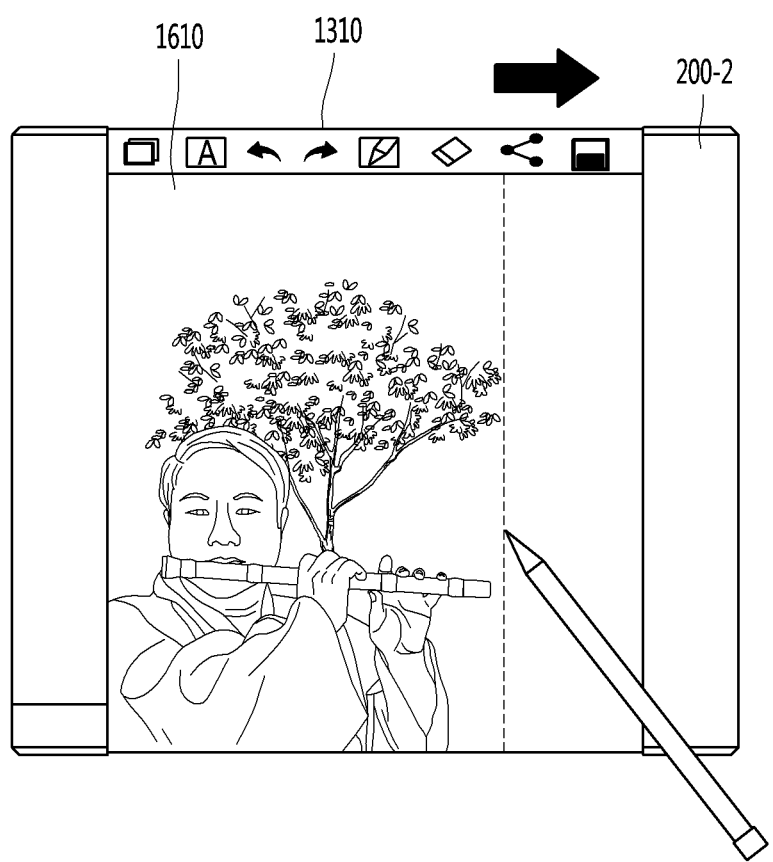
FIG. 16 is a view illustrating a rollable display device in which a screen is additionally expanded according to an embodiment of the present invention.

FIG. 16 is a view illustrating a rollable display device in which a screen is additionally expanded according to an embodiment of the present invention.

In the state that the execution image of the memo application is displayed, there may be a case where the user needs additional space for note.

For example, as illustrated in FIG. 16, when the memo application is executed and a specific image 1610 is added on a notepad UI and displayed, the space for the user to make a memo may be insufficient due to the size of the specific image 1610.

As another example, when a UI corresponding to the trajectory of the text or the pen 195 is displayed on a region having a specific area or more of the entire region of the notepad UI, a space may be insufficient for the user to make a note.

In this case, if the ratio of the region where the information (the text, the UI corresponding to the trajectory of the pen 195, the attached image, etc.) is displayed on the notepad UI becomes a specific ratio of the entire area of the notepad UI, the control unit 180 additionally expand the screen and may display an execution image of a memo application on the expanded screen 1310. In addition the execution image of the memo application displayed on the screen 1310 additionally expanded may include an expanded notepad UI.

As described above, according to the present invention, when a space is insufficient for a user to make a note, the memo space is automatically expanded by automatically enlarging the screen, thereby improving user convenience.

Figure 17:
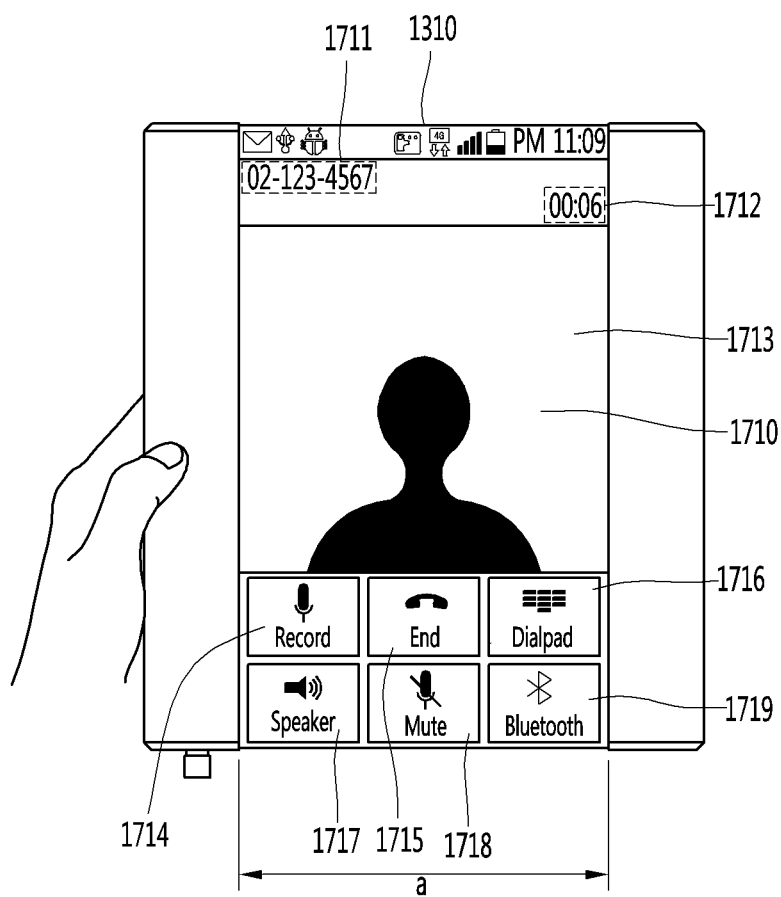

FIGS. 17 to 19 are views illustrating a rollable display device which is additionally expanded as a pen is detached in the state that the screen is expanded, according to an embodiment of the present invention.

As the pen 195 is detached, the expanded screen may be an expanded screen in the state that the screen is already expanded.

In detail, referring to FIG. 17, the screen 1310 of the rollable display device 200-2 is currently expanded, and the pen 195 is mounted on the rollable display device 200-2.

Figure 18A:
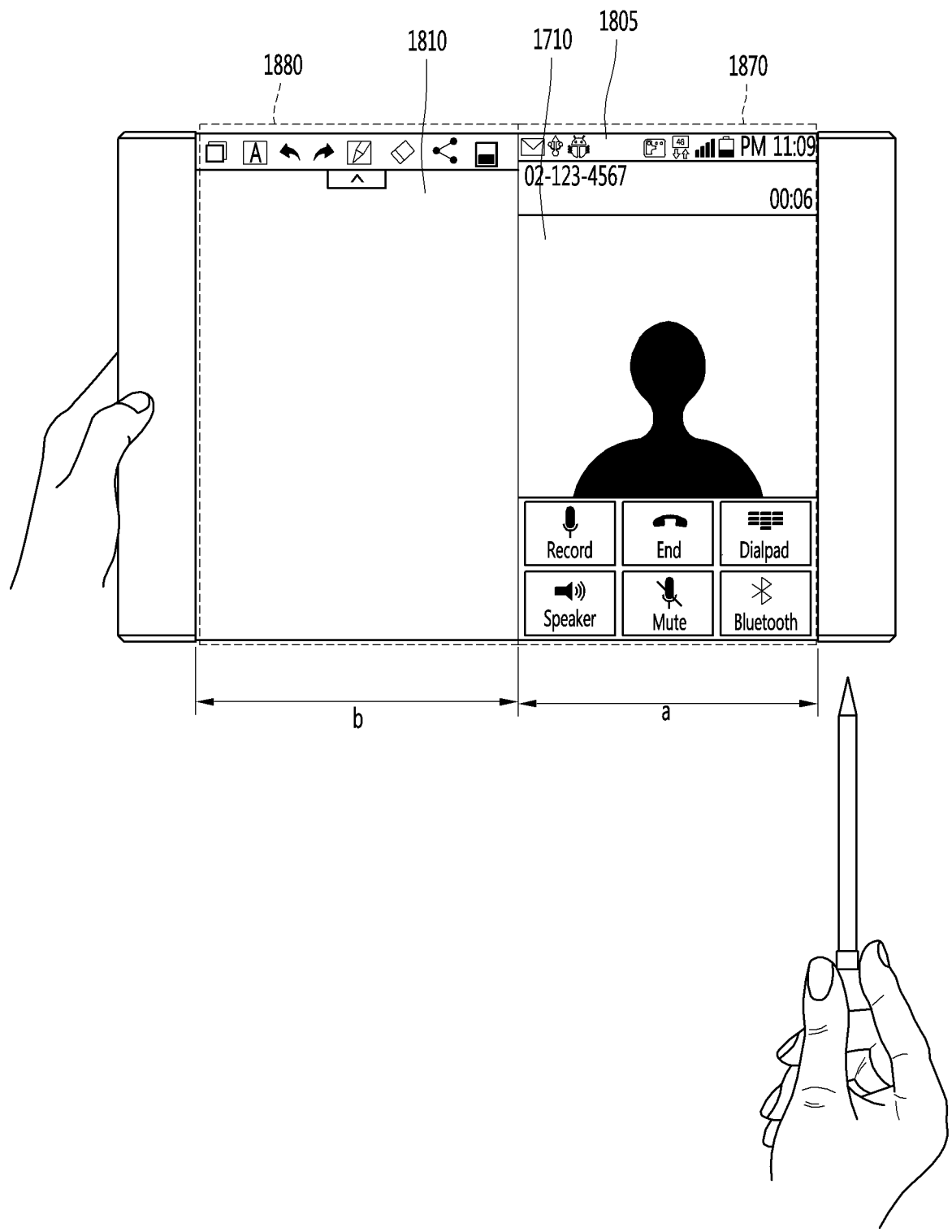

Meanwhile, when the detachment of the pen 195 is detected, as illustrated in FIG. 18A, the control unit 180 may control the display unit 151 to expand the screen of the rollable display device 200-2.

Meanwhile, when the detachment of the pen 195 is detected, the control unit 180 may control the display unit 151 to additionally expand the screen 1310 of the rollable display device 200-2 by a specific length.

Specifically, in FIG. 17, the screen 1310 has already been expanded by the length of "a".

Meanwhile, the memo application is preset to be executed when the pen 195 is detected. When the pen 195 is detached, as illustrated in FIG. 18A, the control unit 180 additionally expands the screen 1310 by a specific length of such that the region 1880 additionally expanded corresponding to the length of "b" contains the entire portion of the execution image 1810 of the memo application without being cropped.

As another example, when the pen 195 is detached, the control unit 180 executes the memo application in the pen mode, and additionally expands a screen 1310 by a specific length such that a region 1880 additionally expanded corresponding to the length of "b" contains the entire portion of an execution image of a memo application in the pen mode.

Meanwhile, the control unit 180 displays an execution image of the first application which has been executed in the rollable display device 200-2 before the pen 195 is detached on the first region of the expanded screen. The execution image of the second application executed as the pen 195 is detached may be displayed on the second region of the expanded screen.

Specifically, as illustrated in FIG. 17, a screen 1310 that is expanded by a length of "a" may include an execution image of a specific application. For example, if the telephone call application is running in the state that the pen 195 is not detached, the screen 1310, which has been previously expanded by the length of "a", may include an execution image 1710 of the telephone call application.

When the pen 195 is detached, the control unit 180 may additionally expand the screen 1310, and may display, on the additionally expanded screen 1805, the execution image of the specific application, which has been previously executed, and the execution image of the application executed as the pen 195 is detached.

For example, when the pen 195 is detached, the control unit 180 may additionally expand the screen as illustrated in FIG. 18A, and may display, on the additionally expanded screen 1805, the execution image 1710 of the telephone call application and the execution image 1810 of the memo application.

Meanwhile, the control unit 180 may display the execution image of the specific application, which has been previously executed, on a first region of the additionally expanded screen 1805 and may display the execution image of the application executed as the pen 195 is attached on the second region of the additionally expanded screen 1805.

In this case, the first region may be a region corresponding to the length of "a" in which the screen 1310 has already been expanded. In addition, the second region may be a region corresponding to a part expanded from the screen 1310 by the length of "b".

For example, as illustrated in FIG. 17, when the pen 195 is detached in the state that the execution image 1710 of the telephone call application is displayed on the screen 1310 expanded by the length of "a", the control unit 180 may additionally expand the screen 1310 by the length of "b" as illustrated in FIG. 18A.

In addition, the control unit 180 may display the execution image 1710 of the telephone call application, which has been previously executed, on a first region of the screen 1805 expanded by the length of "a" and the length of "b", that is, on a region 1870 corresponding to the length of "a" which has been already expanded.

In addition, the control unit 180 may display the execution image 1810 of the memo application, which is an application newly executed as the pen 195 is detached, on the second region of the screen 1805 expanded by the length of "a" and the length of "b", that is, on the region 1880 corresponding to the length of "b" additionally expanded.

Meanwhile, although the present embodiment has been described in that the execution image of the application, which has been previously executed, is displayed on the first region, and the execution image of the application executed as the pen is detached is displayed on the second region, the embodiment is not limited thereto. For example, the execution image of the application executed as the pen is detached may be displayed on the first region, and the execution image of the application, which has been previously executed, may be displayed on the second region.

Meanwhile, one or more UI objects included in the execution image of the application being executed may be rearranged after the screen of the rollable display device 200-2 is additionally expanded.

Figure 18B:
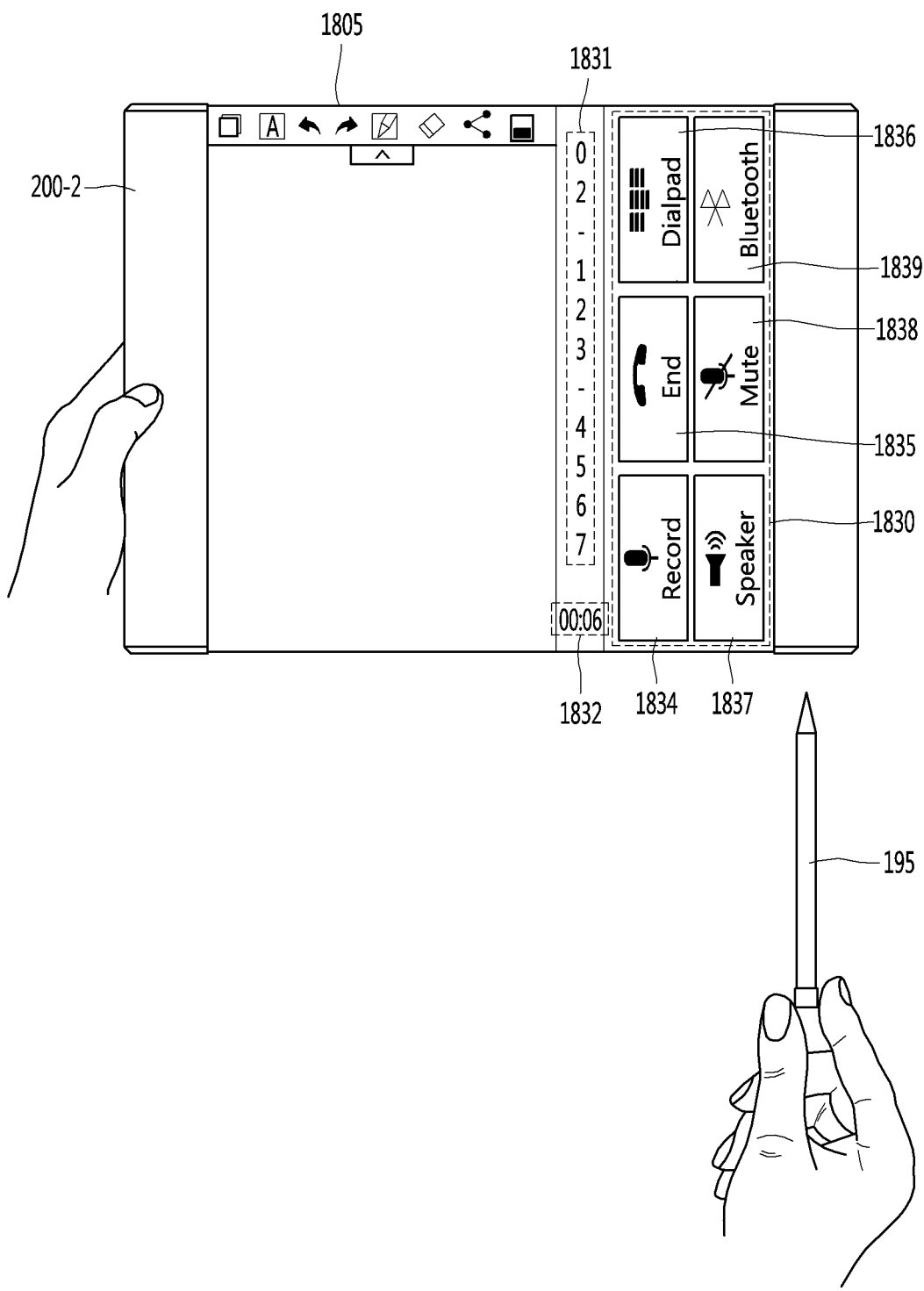

The details thereof will be described with reference to FIGS. 17 and 18B.

Referring to FIG. 17, the execution image 1710 of the specific application which is being executed may include one or more UI objects 1711, 1712, 1713, 1714, 1715, 1716, 1717, 1718, and 1719.

Meanwhile, if a screen is additionally expanded as the pen 195 is detached in the state that a specific application is already being executed, the control unit 180 may display an execution image 1830 of a specific application on a screen 1805 additionally expanded.

Meanwhile, the execution image 1830 of the specific application displayed on the screen 1805 additionally expanded may include one or more objects 1831, 1832, 1834, 1835, 1836, 1837, 1838, and 1839. In this case, the one or more objects 1831, 1832, 1834, 1835, 1836, 1837, 1838, and 1839 included in the execution image 1830 of the specific application displayed on the screen 1805 additionally expanded may be objects formed by re-arranging one or more UI objects 1711, 1712, 1713, 1714, 1715, 1716, 1717, 1718, 1719 or may be objects obtained by excluding some objects 1712 from one or more UI objects 1711, 1712, 1713, 1714, 1715, 1716, 1717, 1718, and 1719 included in the execution image 1710 of the specific application.

In addition, the size of the execution image 1830 of the specific application displayed on the expanded screen 1805, which is additionally expanded, may be different from the size of the execution image 1710 of the specific application displayed on the screen 1310 before the screen is further expanded have. Some objects are deleted from one or more UI objects 1711, 1712, 1713, 1714, 1715, 1716, 1717, 1718, and 1719 included in the execution image 1710 of the specific application displayed on the screen 1310 before the screen is additionally expanded, or the some objects are re-arranged. Accordingly, the control unit 180 may display the execution image 1830 of the specific application, which has the size different from the size of the execution image 1710 of the specific application displayed on the screen 1310 displayed before the screen is additionally expanded.

In the case of rollable display devices, the maximum expanded length of the screen may be limited. In addition, when the length of the screen is excessively expanded, it is inconvenient for a user to use the rollable display device.

In this case, the UI objects included in the execution image of the application which is being executed are re-arranged, so that the execution image of the application, which has a smaller size, is displayed, thereby preventing the size of the screen from being excessively enlarged.

FIG. 19 is a view illustrating a method of displaying an execution image of a memo application according to another embodiment of the present invention.

Description has been made in the foregoing embodiment, the execution image of the first application being executed is displayed on the first region of the expanded screen, and the execution image of the second application executed as the pen is attached is displayed on the second region of the expanded screen.

However, the present invention is not limited to thereto. For example, the present invention may be implemented in a scheme that the execution image of the second application executed as the pen is detached may be displayed on the entire region of the expanded screen.

For example, FIG. 17 illustrates that the telephone call application is running and the execution image 1710 of the telephone call application, which is running, is displayed on the screen 1310 previously expanded.

Meanwhile, if the pen 195 is detached, the control unit 180 may additionally expand a screen which is previously expanded. In addition, if the pen 195 is detached, the control unit 180 may execute the memo application and an execution image 1920 of a memo application may be displayed on a screen 1910 additionally expanded as illustrated in FIG. 19.

Meanwhile, an execution image of a telephone call application, which is running, is not displayed. However, the execution image of the telephone call application is only terminated, and the control unit 180 may keep executing the telephone call application. Accordingly, even if the execution image 1920 of the memo application is displayed on the entire portion of the screen 1910 additionally expanded, the user may keep making the telephone call.

Meanwhile, although the telephone call application is continuously running, when the execution image of the telephone call application is not displayed, that is, when the execution image of the telephone call application is run in background, the control unit 180 may display a UI representing that the telephone call application is running in background or a UI 1930 including execution information of the telephone call application.

Figure 20:
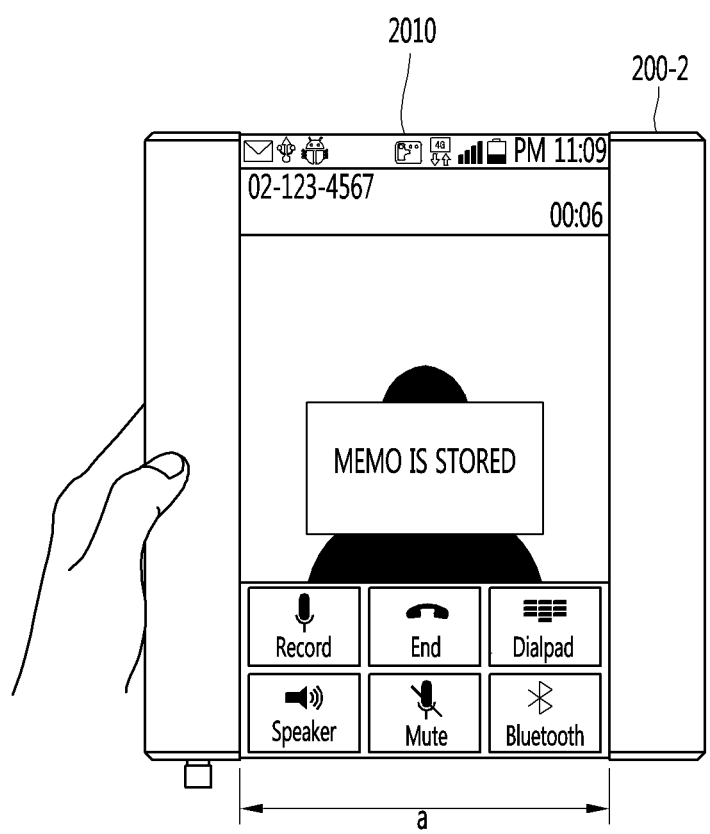
FIG. 20 is a view illustrating a rollable display device in which a screen is reduced as a pen is re-mounted according to an embodiment of the present invention.

FIG. 20 is a view illustrating a rollable display device having a screen reduced as a pen is re-mounted, according to an embodiment of the present invention.

When the pen re-mounted, the control unit 180 may reduce a screen of a rollable display device 200-2.

The length of the screen of the rollable display device 200-2, which has been reduced, may be equal to the length of a screen of the rollable display device 200-2 before the screen is expanded as the pen 195 is detached.

For example, it is assumed that a screen is additionally expanded by the length of "b" as illustrated in FIG. 18A as the pen 195 is detached in the state that the screen is previously expanded by the length of "a" as illustrated in FIG. 17. In this case, when the detached pen 195 is mounted again, the control unit 180 may reduce the screen of the rollable display device 200-2 as illustrated in FIG. 20. In this case, the length of "a" of the screen 2010 reduced as the detached pen 195 is mounted may be equal to the length of "a" of the screen 1310 before the screen is expanded as the pen 195 is detached.

For another example, it is assumed that a screen is expanded as illustrated in FIG. 15 as the pen 195 is detached in the state that the screen is not expanded (the screen is closed) as illustrated in FIG. 12. In this case, when the detached pen 195 is re-attached, the control unit 180 may reduce the screen of the rollable display device 200-2. In this case, the length of the screen reduced as the detached pen 195 is attached may be equal to the length of the screen 1310 before the screen is expanded as the pen 195 is detached. In other words, the control unit 180 may reduce the expanded screen to be closed.

Meanwhile, if the detached pen 195 is attached again, the control unit 180 may store, in the storage unit 170, information (that is, a memo input by the user) displayed on the notepad UI and may terminate the execution of the memo application.

As described above, according to the present invention, the expansion of a screen, the execution of an application, and the reduction of the screen, the storage of the information, and the termination in the execution of the application are controlled only by detaching and re-attaching the pen without another operation, thereby improving the convenience of the money.

Figure 21A:
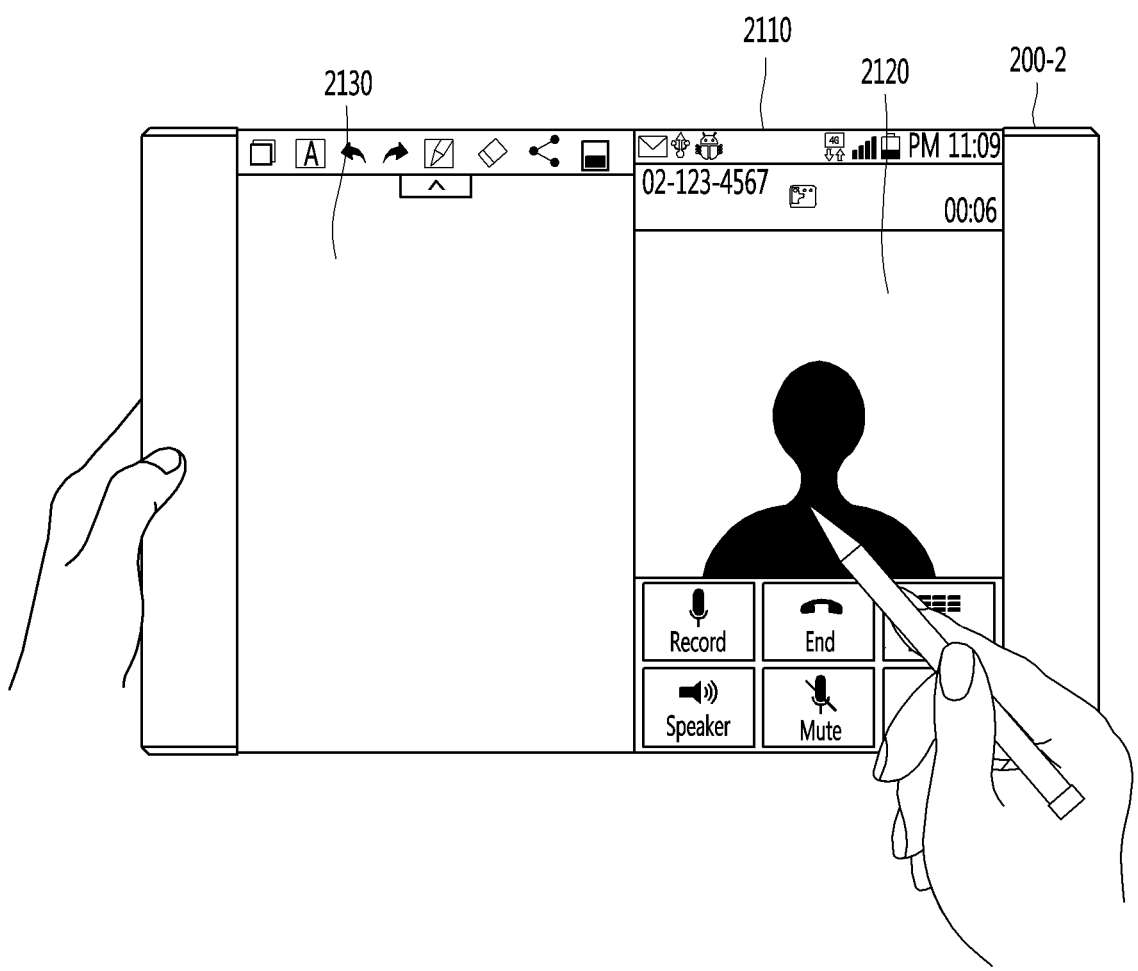
FIGS. 21A and 21B are views illustrating a method of directly writing a memo on an execution screen of an application executed according to an embodiment of the present invention.
Figure 21B:
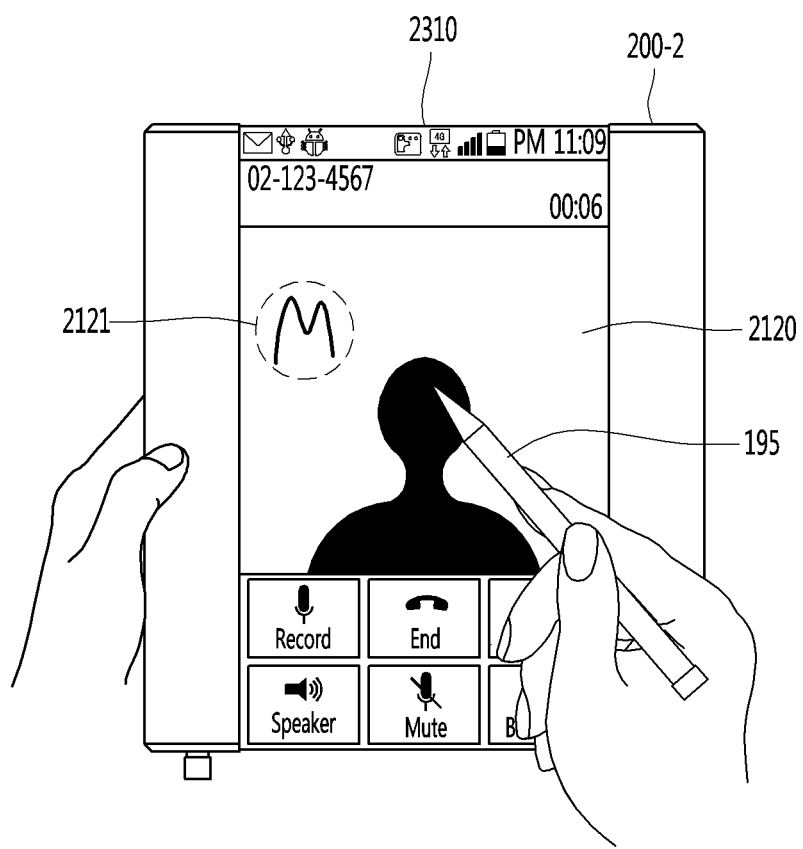

FIGS. 21A and 21B are views illustrating a method of directly making a memo on the execution image of an application, which is previously executed, according to the embodiment of the present invention.

FIG. 21A illustrates a rollable display device 200-2 in the state that a screen is additionally expanded as the pen 198 is detached while the telephone call application is executed on a screen expanded, and an execution image 2120 of a telephone call application and an execution image 2130 of a memo application are displayed on a screen 2110 additionally expanded.

The control unit 180 may receive, from a user, a touch input to a screen. If received is a touch input to a region that the execution image 2120 of the telephone call application is displayed, the control unit 180 may reduce the additionally expanded screen 2110 as illustrated in FIG. 21B. In addition, the control unit 180 may display the execution image 2120 of the telephone call application on the reduced screen 2130.

Meanwhile, the description on the forgoing embodiment has been described regarding that information corresponding to an input received from a user is displayed on a notepad UI. However, the present invention is not limited thereto. For example, the information corresponding to the input received from the user may be displayed on an execution image of a specific application.

For example, if a touch input using the pen 195 is received as illustrated in FIG. 21B, the control unit 180 may display information 2121 corresponding to the received input on the execution image 2120 of the telephone call application.

In this case, if an input to store the information 2121 corresponding to the received input is received, the control unit 180 may store the information 2121 corresponding to the received input in the storage unit 170.

In this case, the control unit 180 may store only information 2121 corresponding to the received input, that is, information displayed on the execution image of the telephone call application. However, the present invention is not limited. The control unit 180 may store the execution image 2120 of the telephone call application and the information 2121 corresponding to the received input included in the execution image 2120 of the telephone call application.

Meanwhile when a touch input to an execution image 2120 of the telephone call application is received while a telephone call is being made together with a mobile terminal of a specific person, the control unit 180 display information corresponding to the received touch input on an execution image 2120 of the telephone call application, may match information corresponding to the received touch input with the information on a telephone number of the specific person, and may store the matching result. The details thereof will be described below.

Meanwhile, although the present embodiment has been described in that a screen is reduced if a touch input is received with respect to a region that the execution image 2120 of the telephone call application is displayed, but the present invention is not limited thereto.

For example, it may be implemented that, even if the touch input is received with respect to the region that the execution image 2120 of the telephone c application is displayed, if an input is received from a user in the state that the screen is not reduced, the control unit 180 may display information corresponding to the received input on the execution image 2120 of the telephone call application even if the execution image 2120 of the telephone call application.

As described above, the present invention may provide an environment that a user may not only make a memo on an execution image of the memo application, but directly make a memo an execution image of another application. In particular, in the case of the telephone call application, information on a caller is mainly displayed on the execution image of the telephone call application. Accordingly, the present invention may provide an environment that a memo may be directly made on the execution image of the telephone call application instead of a notepad and both the execution image of the telephone call application and the memo contained in the execution image of the telephone call application may be stored. Accordingly, a user may make a call with a certain caller while easily detecting the type of the note.

In addition, the present invention has an advantage of resolving the inconvenience of a user to be caused due to a larger screen by reducing the size of a screen when the user makes a memo on the execution image of another application.

Meanwhile, although the foregoing embodiment has been described in that the memo application is executed as the pen 195 is detached during the execution of the telephone call application, the present invention is not limited thereto.

The details thereof will be described with reference to FIG. 22 in detail.

Figure 22:
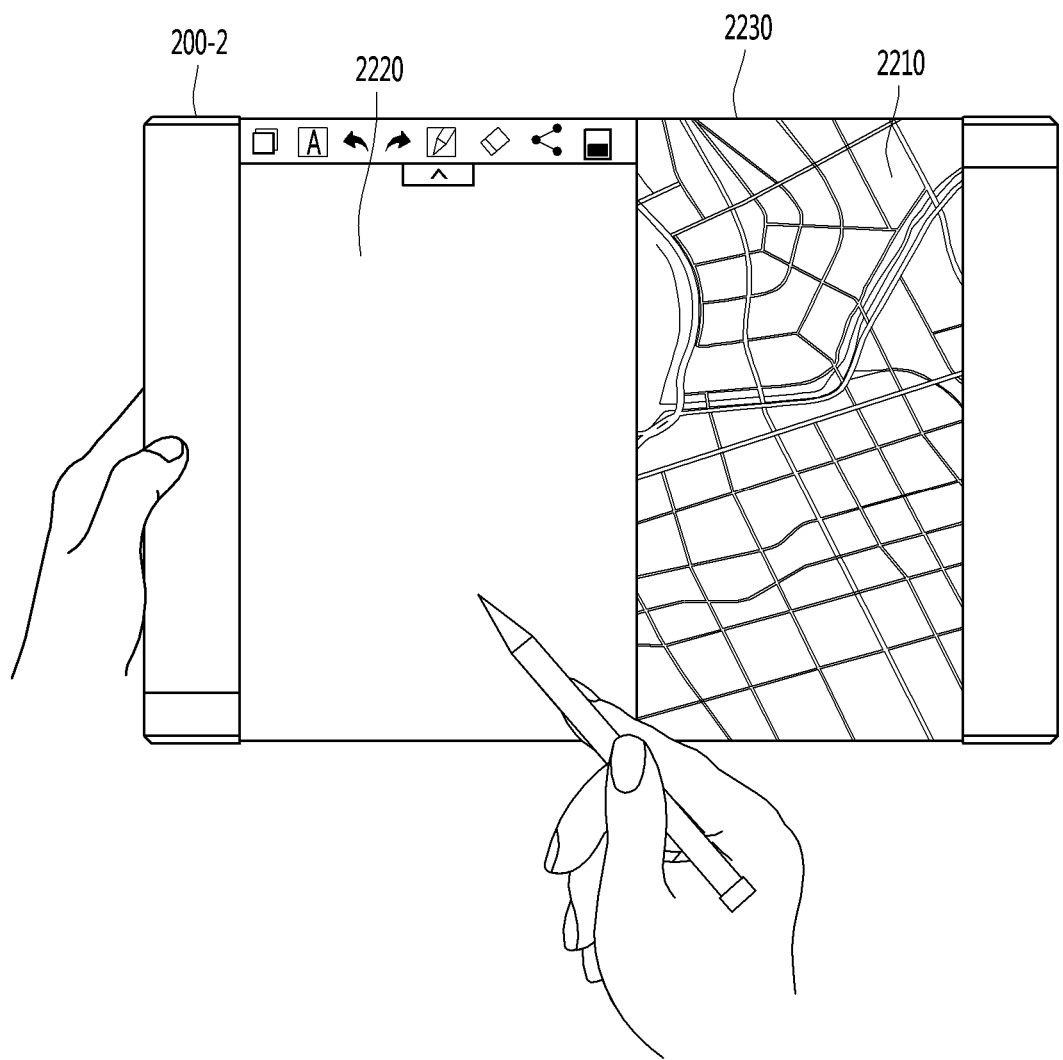
FIG. 22 is a view illustrating a method of operating the rollable display device in the case that the pen is detached during execution of a gallery application.

FIG. 22 is a view illustrating a method of operating a rollable display device when the pen is detached during the execution of the gallery application.

All embodiments that the execution of the telephone call application has been described with reference to FIGS. 12 to 21 by way of example will be applicable to an embodiment of FIG. 22.

Referring to FIG. 22, when the pen 195 is detached while a gallery application is executed and an execution image of the gallery application is displayed on a previously expanded screen, the control unit 180 may additionally expand the screen.

Meanwhile, the control unit 180 may display an execution image 2210 of the gallery application and an execution image 2220 of a memo application may be displayed on a screen 2230 additionally expanded. In this case, the execution image 2220 of the memo application may include a notepad UI in which information corresponding to an input received from the user is displayed.

In this case, the user may make a memo of information on a specific photo contained in the execution image 2210 of the gallery application on the notepad UI of the execution image 2220 of the memo application.

Meanwhile, information displayed on the notepad UI is matched with the specific photo contained in the execution image 2210 of the gallery application and the matching result may be stored.

As described above, the present invention provides an environment that information associated with applications may be easily stored while not only a telephone call application, but various applications are being executed.

For example, the present invention may provide an environment that a user may easily make a desired memo while a user is using an Internet application by providing an execution image of the memo application while the Internet application is being executed.

The details thereof will be described in detail with reference to FIGS. 23 to 24.

Figure 23:
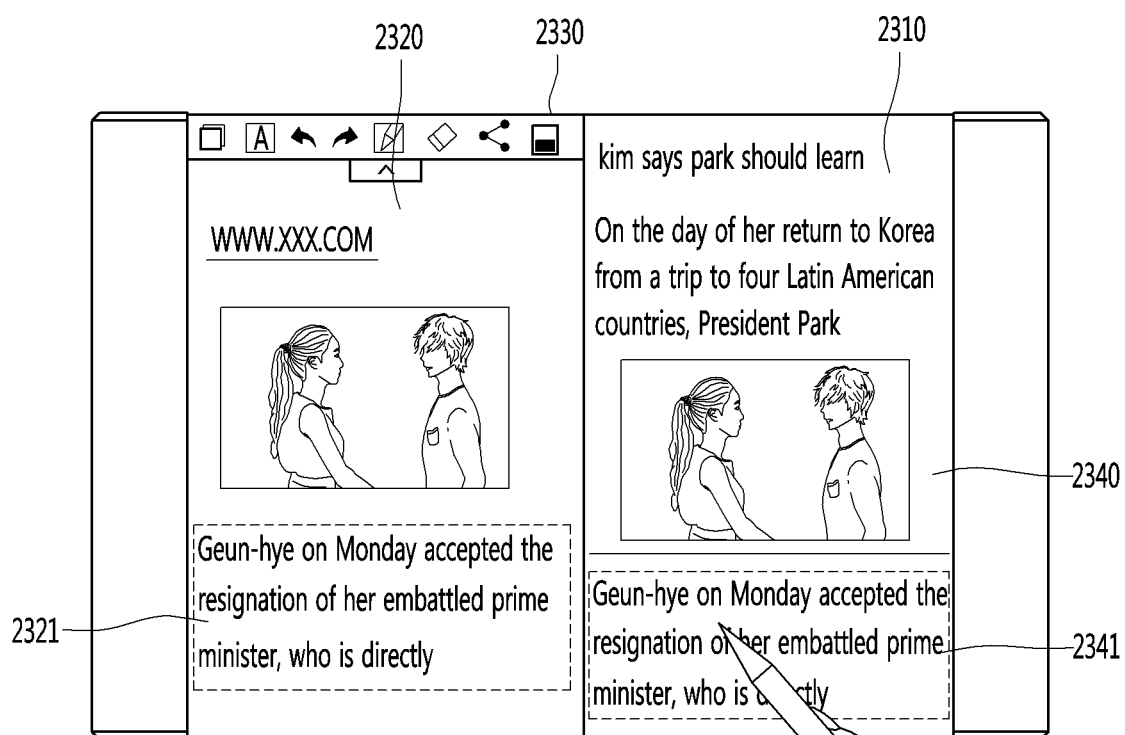
FIGS. 23 to 24 are views illustrating a method of executing a memo application during the execution of an Internet application.
Figure 24:
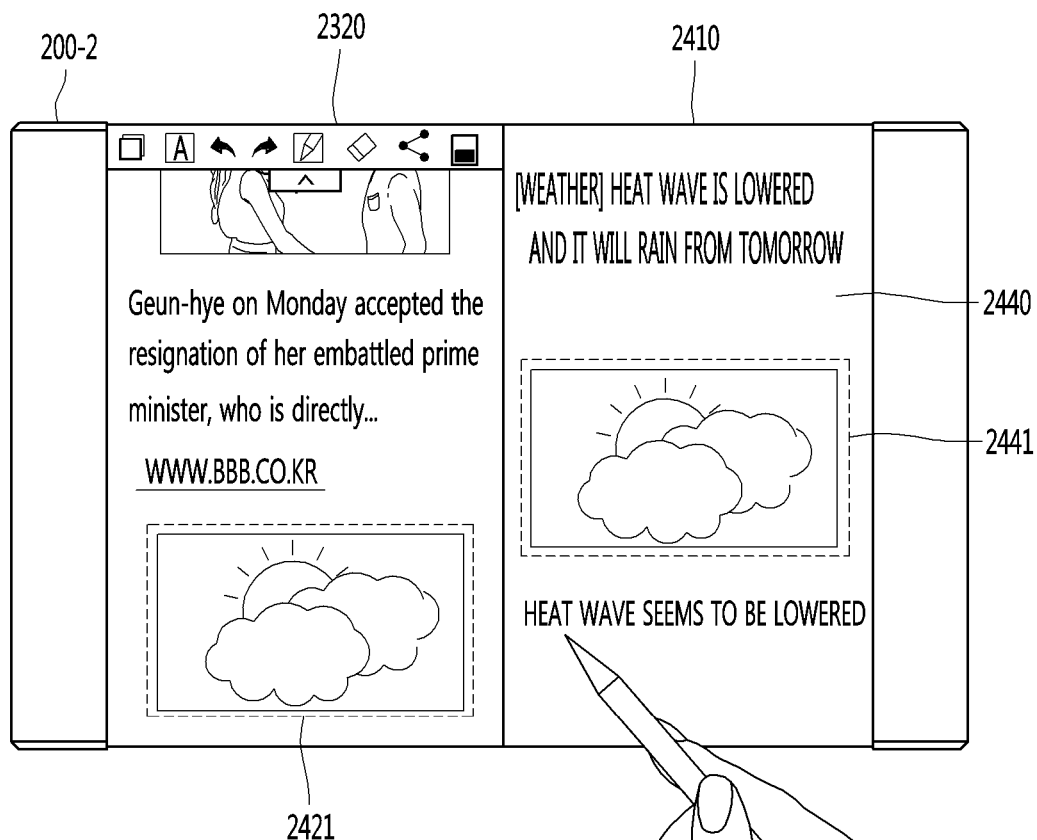

FIGS. 23 to 24 are views illustrating a method of executing a memo application while the Internet application is being executed.

Referring to FIG. 23, when the pen 195 is detached while the Internet application is being executed and the execution image of the Internet application is displayed on a screen which is previously expanded, the control unit 180 may additionally expand the screen.

Meanwhile, the control unit 180 may display an execution image 2310 of the Internet application and an execution image 2320 of a memo application may be displayed on a screen 2330 which is additionally expanded. In this case, the execution image 2320 of the memo application may include a notepad UI on which information corresponding to an input received from a user is displayed.

In this case, a user may make a memo of information associated with the execution image 2310 of the Internet application on the execution image 2320 of the memo application, based on the execution image 2310 of the Internet application.

Meanwhile, the execution image 2320 of the memo application may contain an image obtained by scraping information contained in the execution image of the application which is running.

For example, when the execution image 2310 of the Internet application and the execution image 2320 of the memo application are displayed on the screen 2330 which is additionally expanded as the pen 195 is detached, the control unit 180 may display an image obtained by scraping the information included in the execution image 2310 of the Internet application on the execution image 2330 of the memo application.

Specifically, the execution image 2310 of an Internet application may include an image 2340 of a specific webpage. Meanwhile, the control unit 180 may receive an input for selecting information 2341 contained in the image 2340 of the specific web-page. Meanwhile, when an input for selecting the information 2341 contained in the image 2340 of the specific web-page is received, the control unit 180 displays information corresponding to the information 2341 contained in the image 2340 of the specific web-page 2321 on the execution image 2320 of the memo application.

The information 2321 corresponding to the information 2341 contained in the image 2340 of the specific web-page may be text. For example, when the information 2341 included in the image 2340 of a specific web-page is text, the information 2321 corresponding to the information 2341 contained in the image 2340 of the specific web-page may also be text. In this case, the control unit 180 may display a text corresponding to the text contained in the image 2340 of the specific web-page on the execution image 2320 of the memo application in a scheme of copying a text contained in the image 2340 of the specific web-page.

Meanwhile, when information contained in the image 2340 of a specific web-page is an image, information corresponding to information contained in the image 2340 of the specific web-page may be an image. In this case, the control unit 180 may acquire an image corresponding to an image contained in the image 2340 of the web-page in a manner of capturing an image included in the image 2340 of a specific web-page or downloading the image from the server and displaying the acquired image on the execution image 2320 of the memo application.

Meanwhile, the control unit 180 may change the execution image of the Internet application, based on the input received from the user.

In detail, as illustrated in FIG. 24, the control unit 180 may display, based on an input received from a user, an execution image of the Internet application containing an image 233 of a second web-page different from a specific web-page described with reference to FIG. 23.

For another example, although not illustrated, the control unit 180 may display an execution image of an Internet application containing an image in which the specific web-page is scrolled as described in FIG. 23.

Meanwhile, the control unit 180 may receive an input for selecting information 2441 included in an image. Meanwhile when the input for selecting the information 2441 contained in the image 2440 of the second web-page is received, the control unit 180 may display the information 2421 corresponding to the information 2441 contained in the image 2440 of the second web-page on the execution image 2320 of the memo application.

FIGS. 25 to 28 are views illustrating a rollable display device in which the execution mode of the memo application is changed according to an embodiment of the present invention.

Although the description has been made with reference to FIGS. 6 to 8 in that the execution mode of the memo application is changed as the pen 195 is detached or attached. All embodiments described with reference to FIGS. 6 to 8 may be applied to the operation of the rollable display device 200-2 described with reference to FIGS. 25 to 28.

Accordingly, hereinafter, the description will be made regarding an embodiment additionally applied in addition to the embodiments described with reference to FIGS. 6 to 8.

Figure 25:
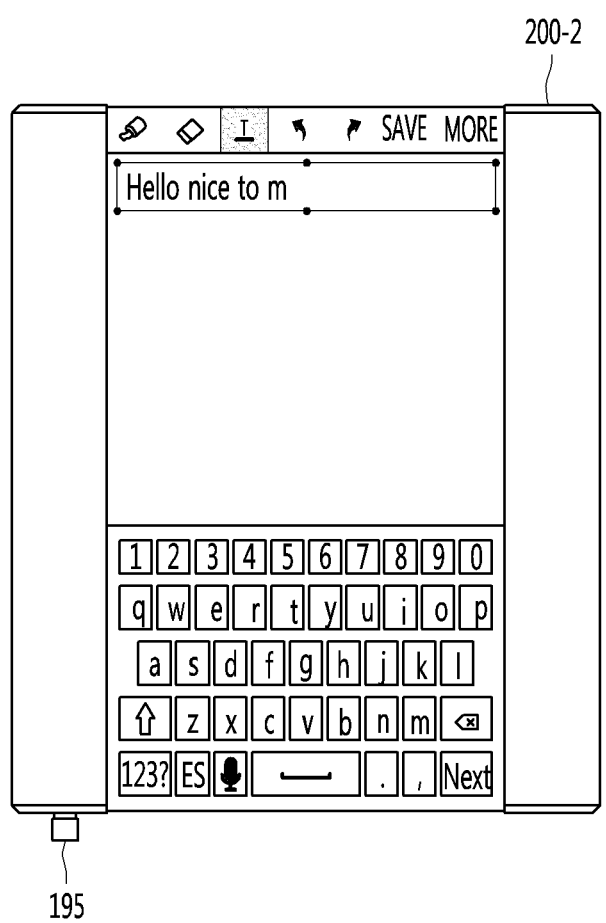

FIG. 25 illustrates the rollable display device 200-2 in the pen 195 is mounted on the rollable display device 200-2 and the memo application is executed in the text mode.

Meanwhile, as illustrated in FIG. 26, the control unit 180 may change the execution mode of the memo application from the text mode to the pen mode when the pen 195 is detached. In addition, when the execution mode of the memo application is changed to the pen mode, the control unit 180 may display an execution image 2720 of the memo application in the pen mode as illustrated in FIG. 27.

Meanwhile, when the pen 195 is detached, the control unit 180 may expand a screen of the rollable display device 200-2. In this case, the control unit 180 may control the display unit 151 such that the screen of the rollable display device 200-2 is expanded by a specific length.

In detail, when the pen 195 is detached, the control unit 180 may expand the screen of the rollable display device 200-2 by a specific length such that the expanded screen 2710 contains the entire portion of the execution image 2720 of the application in the pen memo mode without cropping the execution image 2720.

The size of the execution image of the memo application when the execution mode of the memo application is a pen mode may be different from the size of the execution image of the memo application when the execution mode of the memo application is a text mode. Accordingly, when the pen 195 is detached, the control unit 180 may expand the screen of the rollable display device 200-2 by a specific length such that the expanded screen 2710 contains the entire portion of the execution image 2720 of the memo application.

Figure 28:
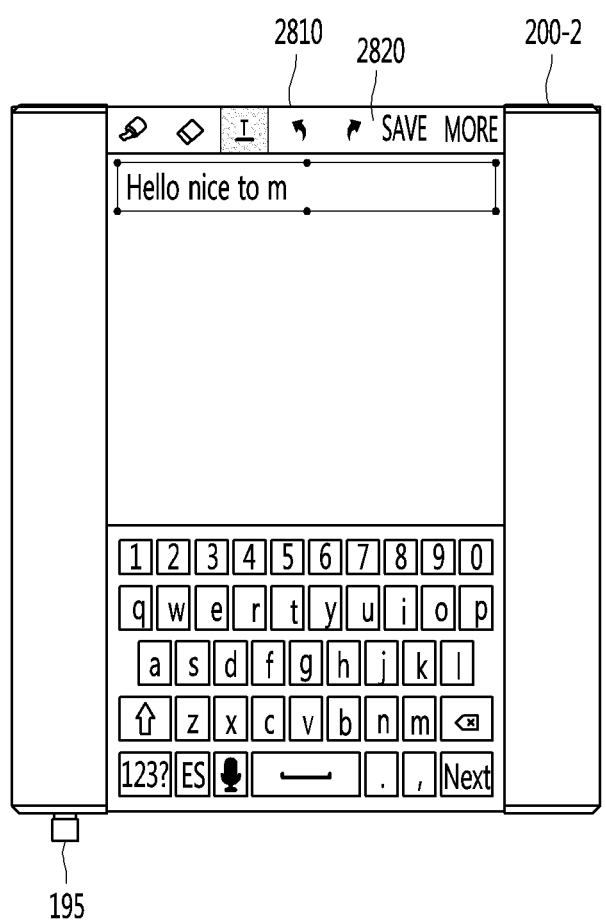

Meanwhile, when the pen 195 is attached as illustrated in FIG. 28 in the state that the execution mode of the memo application is the pen mode, the control unit 180 may change the execution mode of the memo application from the pen mode to the execution mode. In addition, when the execution mode of the memo application is changed to the text mode, the control unit 180 may display the execution image 2820 of the memo application in the text mode.

Meanwhile, when the detached pen 195 is attached again, the control unit 180 may reduce the screen of the rollable display device 200-2 and may display, on the reduced screen 2810, the execution image 2820 of the memo application in the text mode.

In this case, the control unit 180 may control the display unit 151 such that the screen of the rollable display device 2002-2 is reduced by a specific length.

In detail, when the pen 195 is attached again, the control unit 180 may reduce the screen of the rollable display device 200-2 by a specific length such that the execution image 2820 of the memo application in the text mode is displayed on the entire portion of the screen 2810 in which the execution image 2820 of the memo application in the text mode is reduced.

As described above, according to the present invention, as the pen 195 is detached and attached again, the execution mode of the memo application is automatically changed and a screen is provided in size corresponding to the execution mode of the memo application, thereby improving the convenience of the user. In other words, in the pen mode, a screen may be expanded such that a user may make a memo on a larger screen. In the text mode, a screen may be reduced such that the user may easily make memo by using a text input window.

FIGS. 29A to 30B are views illustrating a display method of a memo application, which varies depending on user's hands detaching the pen according to an embodiment of the present invention.

The rollable display device 200-2 may include a first case 295 and a second case 298. The first case 295 may be provided at one end of the display unit, and the second case 298 may be provided at an opposite end of the display unit.

In this case, the second case 298 includes the same configuration as that of the first case 295, and may expand and reduce the screen. In other words, the screen of the rollable display device 200-2 may be expanded and reduced through the operation in the first case 295 and may be expanded and reduced through the operation in the second case 298.

The second case 298 may have the same configuration as that of the first case 295, but the present invention is not limited thereto. For example, the second case 298 may only serve as a holder that allows the user to pull the second case 298 to expand the screen.

Meanwhile, the pen 195 may be attached to the first case 295 or the second case 298. Meanwhile, the rollable display device 200-2 may include two pens. When the rollable display device 200-2 includes two pens, one pen may be attached to the first case 295 and the other pen may be attached to the second case 298.

The first case 295 may include a first sensing unit (not illustrated) for sensing a user's touch to the first case 295. The second case 298 may include a second sensing unit (not illustrated) for sensing a user's touch to the second case 298.

The control unit 180 may determine a region of the screen on which the execution image of the memo application is displayed, based on the first sensing unit (not illustrated) for sensing the touch of the user to the first case 295 and a second sensing unit (not illustrated) for sensing the touch of the user to the second case 298, The user grips the first case 295 and the second case 298 with one hand and detaches the pen 195 with the other hand.

Figure 29A:
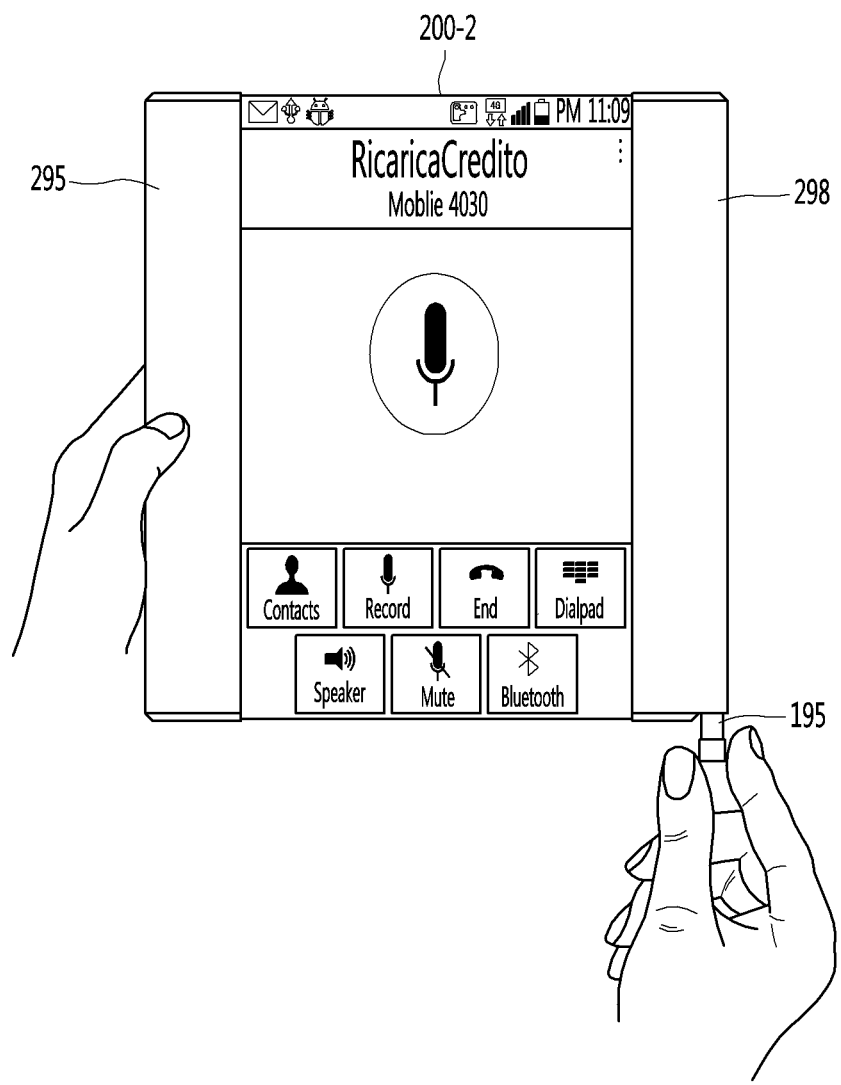
FIGS. 29A to 30B are views illustrating a display method of a memo application, which varies depending on user's hands detaching the pen according to an embodiment of the present invention.

As illustrated in FIG. 29A, when the user touches the first case 295, the first sensing unit (not illustrated) may sense the user's touch to the first case 295.

Figure 29B:
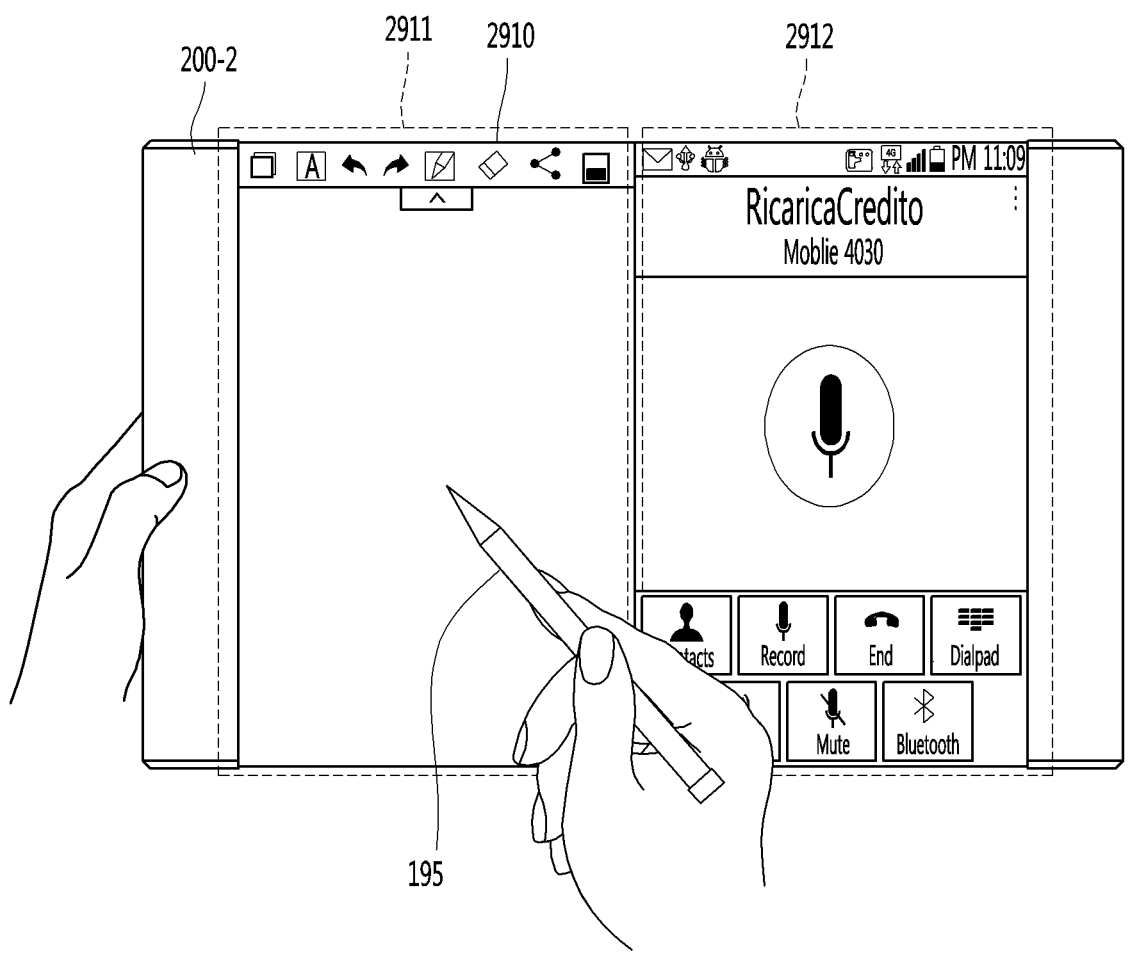

Meanwhile, when the pen 195 is detached, the control unit 180 may expand the screen as illustrated in FIG. 29B. Meanwhile, the region of the expanded screen 2910 may include a left region 2911 and a right region 2912.

When the touch of the user to the first case 295 is detected by the first sensing unit and the pen 195 is detached, the control unit 180 displays the execution image of the memo application on the left side region 2911 of the expanded screen.

When the user holds the pen with the right hand, the user holds the rollable display device 200-2 with the left hand. When the user holds the rollable display device 200-2 with the left hand, the user holds the first case 295 with the left hand.

Accordingly, when the pen 195 is detached in the state that the user holds the first case 295 with the left hand, that is, when the pen 195 is detached in a state that a touch to the first case 295 is being sensed, the control unit 180 may determine that the pen 195 is detached by the user's right hand.

Meanwhile, when the user supports the rollable display device 200-2 by holding the first case 295 with the left hand of the user, the user may make a memo on the side closer to the first case 295 supported by the user. In this case, the rollable display device 200-2 may be prevented from being shaken and the user making a memo may feel convenient.

Accordingly, when the user detaches the pen 195 while holding the first case 295 with the left hand, the control unit 180 may display the execution image of the memo application in the left region 2911 of the expanded screen.

Figure 30A:
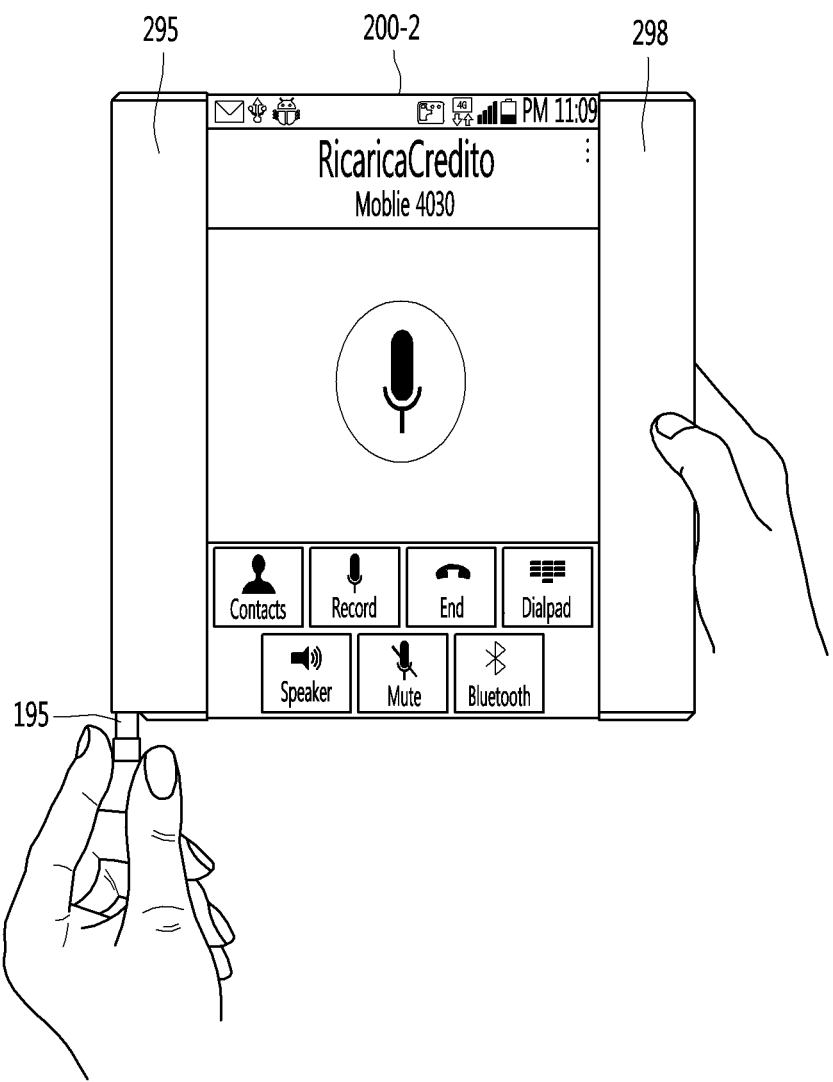
Figure 30B:
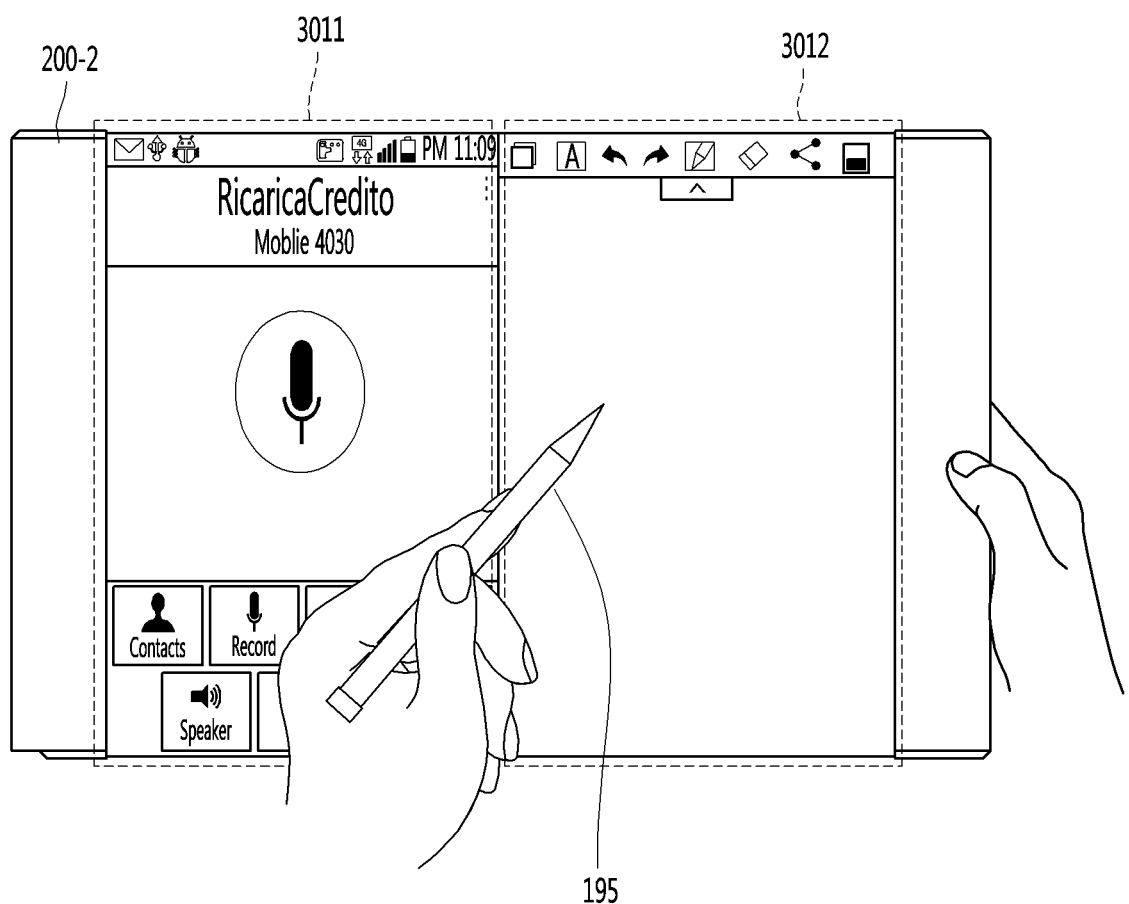

FIGS. 30A to 30B illustrate a method of displaying the execution image of a memo application when a user holds THE rollable display device 200-2 with the right hand of the and makes a memo using the pen 195 with the left hand of the user, in contrast to the case described with reference to FIGS. 29A to 29B.

As illustrated in FIG. 3A, when the user touches the second case 298, the second sensing unit (not illustrated) may sense the touch of the user to the second case 298.

Meanwhile, when the pen 195 is detached, the control unit 180 may expand the screen as illustrated in FIG. 30B. Meanwhile, the region of the expanded screen 3010 may include a left region 3011 and a right region 3012.

Meanwhile, if the touch of the user to the second case 298 is detected by the second sensing unit (not illustrated) and the pen 195 is detached, the control unit 180 displays the execution image of the memo application on a right region 3012 of the expanded screen 3010.

That is to say, when the user supports the roller-covered display device 200-2 by holding the second case 298 with the right hand, the user may be allowed to make a memo on the side closer to the second case 298 supported by the user, thereby preventing the rollable display device 200-2 from being shaken and providing convenience to the user who make a note.

Accordingly, when the pen 195 is detached in the state that the user holds the second case 298 with the right hand of the user, the control unit 180 displays the execution image of the memo application on the right region 3012 of the expanded screen 3010.

Meanwhile, the hand supporting the rollable display device 200-2 may be changed in the state that the pen is detached. For example, when the user holds the first case 295 with the left hand of the user and grips the pen 195 with the right hand of the user while making a note, the user, so the user holds the second case 298 with the right of the user and holds the pen 195 with the left hand of the user by changing the hand to make a note.

In this case, if the touch to the first case 295 is no longer detected and the touch to the second case 298 is detected, while the touch to the first case 295 is detected in the state that the pen 195 is detached, the control unit 180 may display the execution image of the memo application displayed in the left region of the expanded screen on the right region of the expanded screen.

Meanwhile, a recent mobile terminal has a function of automatically rotating an image on a screen. Similarly, the rollable display device 200-2 may also rotate an image on the screen at 180 degrees.

When the image on the screen of the rollable display device 200-2 is rotated at 180 degrees, and when the touch to the second case 298 is detected and the pen 195 is detached, the control unit 180 may display the execution image of the memo application on the left region of the expanded screen.

In addition, when the image on the screen of the rollable display device 200-2 is rotated at 180 degrees, and when the touch to the first case 295 is sensed and the pen 195 is detached, the control unit 180 may display the execution image of the memo application on the right region of the expanded screen.

Figure 31:
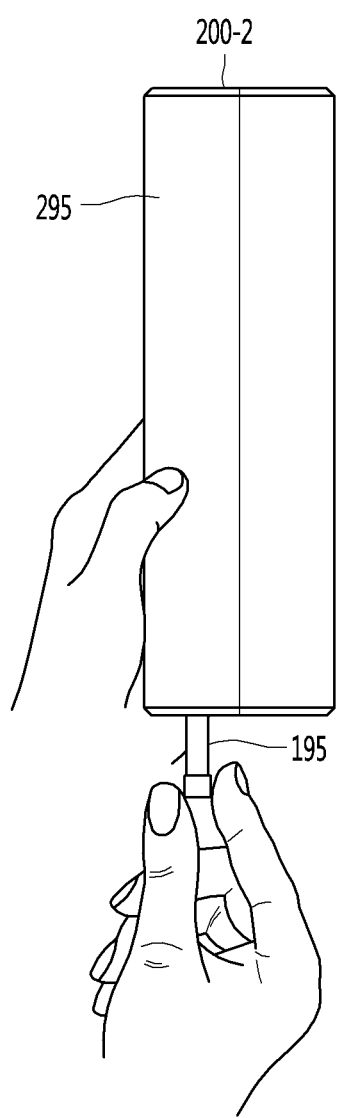
FIGS. 31 to 32 are views illustrating a method of expanding or reducing a screen of a rollable display device using a pen according to another embodiment of the present invention.
Figure 32:
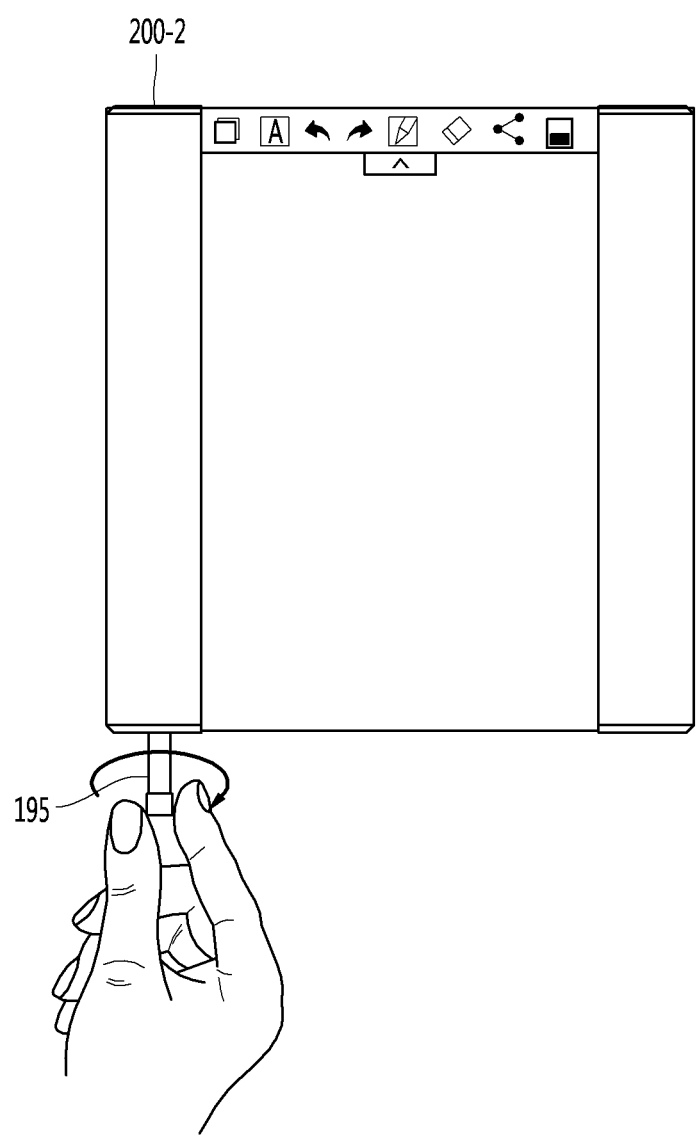

FIGS. 31 to 32 are views illustrating a method of expanding or reducing a screen of a rollable display device using a pen according to another embodiment of the present invention.

The forgoing embodiment has been described in that, when the pen is detached from the rollable display device 200-2, the screen is expanded by a specific length, and when the pen is mounted on the rollable display device 200-2, the screen is reduced by a specific length.

However, the present invention is not limited thereto, and the screen of the rollable display device 200-2 may be expanded or reduced according to the input of rotating the pen.

As illustrated in FIG. 31, the user may detach the pen 195. However, the pen 195 is not completely detached from the rollable display device 200-2 and only a part of the pen 195 is detached from the rollable display device 200-2. In addition, another part of the pen is present inside the rollable display device 200-2. Meanwhile, only a part of the pen 195 is detached from the rollable display device 200-2 and another part of the pen 195 is present inside the rollable display device 200-2, which is defined as the state that the part of the pen is detached.

Meanwhile, when a part of the pen 195 is detached, the first sensing unit (not illustrated) of the first case 295 may detect that a part of the pen 195 is detached.

Meanwhile, as illustrated in FIG. 32, the user may rotate the pen 195, which is detached, in the first direction or in the second direction opposite to the first direction. For example, the first direction may be clockwise and the second direction may be counterclockwise.

Meanwhile, when a part of the pen 195 is detached and the pen 195 is rotated, the control unit 180 may control the display unit 151 such that the screen is expanded or reduced.

Specifically, the sensing unit 140 may sense the movement of the pen 195. Meanwhile, based on the movement of the pen 195 sensed by the sensing unit 140, the control unit 180 may determine that a part of the pen 195 is detached.

Meanwhile, the sensing unit 140 may sense the rotation of the pen 195. In this case, based on the rotation of the pen 195 sensed by the sensing unit 140, the control unit 180 may determine the rotation state and the rotation direction of the pen 195.

Meanwhile, when the pen 195 is rotated in the first direction in the state that the part of the pen 195 is detached, the control unit 180 may control the display unit 151 to expand the screen. When the pen 195 is rotated in the second direction opposite to the first direction in the state that a part of the pen 195 is detached, the control unit 180 may control the display unit 151 to reduce the screen.

Meanwhile, the rollable display device 200-2 may include an elastic member (not illustrated). When the pen 195 is rotated, the elastic member (not illustrated) may apply the elastic force to the pen 195 in a direction opposite to the rotating direction of the pen 195. Therefore, when a user, who has applied the rotational force to the pen 195 by holding the pen 195, releases the pen 195, the pen 195 may be recovered to the state before the pen is rotated, by the elastic member (not illustrated).

Meanwhile, if the pen 195 is recovered to the state before the pen 195 is rotated, the control unit 180 may control the display unit 151 to stop the expansion or reduction of the screen.

For example, when the user rotates the pen 195 in the first direction by applying rotational force to the pen 195, the control unit 180 may control the display unit 151 to expand the screen. When the user releases the pen 195, elastic force acts on the pen 195 to recover the pen 195 before the pen 195 is rotated. The control unit 180 may control the display unit 151 to stop the expansion of the screen.

For another example, when the pen 195 is rotated in the second direction by applying the rotational force to the pen 195, the control unit 180 may control the display unit 151 to reduce the screen. In addition, when the user releases the pen 195, elastic force is applied to the pen 195 so the pen 195 is recovered to the state before the pen 195 is rotated, and the control unit 180 may control the display unit 11 to stop the reduction of the screen.

The description has been made with reference to FIGS. 31 to 32 regarding the expansion and reduction of the screen according to the rotation of the pen 195. Meanwhile, the following description will be made with reference to FIGS. 33 to 36 regarding the image displayed on the screen when the screen is expanded or reduced as the pen 195 is rotated.

FIGS. 33 to 37 are views illustrating a method of displaying a web-page image according to expansion and reduction of a screen and a method of capturing a web-page image.

Figure 33:
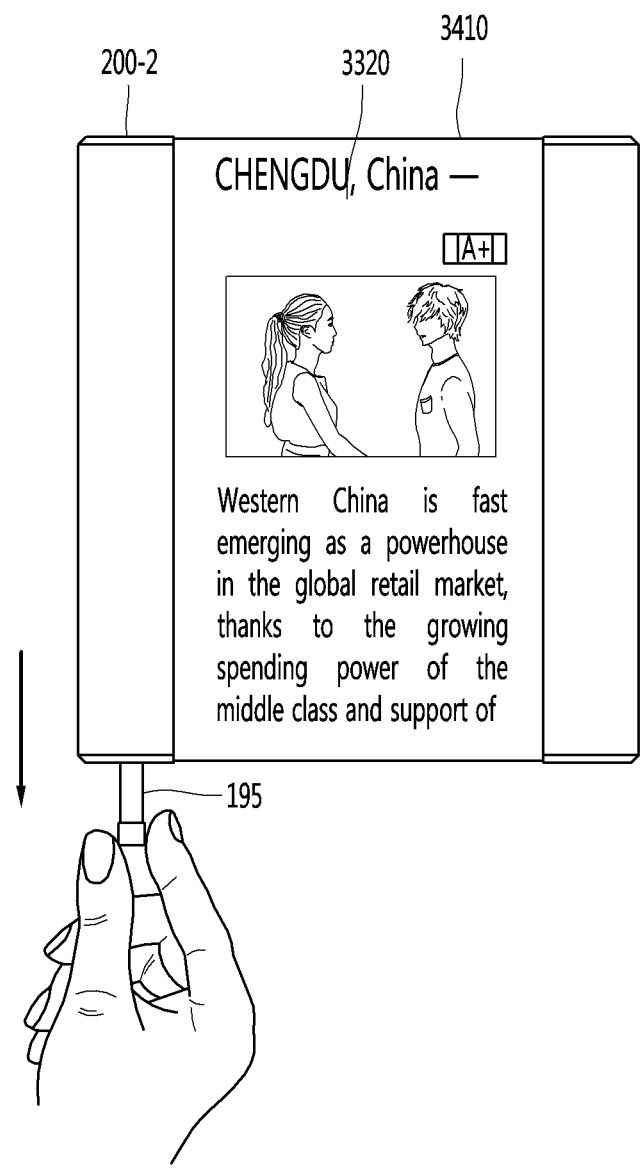
FIGS. 33 to 38 are views illustrating a method of displaying a web-page image according to expansion and reduction of a screen and a method of capturing a web-page image.

As illustrated in FIG. 33, an image on a web-page has been displayed on the screen 3310 before the screen 3310 is expanded.

The image of the web-page, which is included in the screen 3410 before the screen is expanded, may be a partial image 3320 of the whole image of the web-page. In other words, when the size of the whole image of the web-page is larger than the size of the screen 3410 before the screen 3410 is expanded, the control unit 180 displays the partial image 3320 of the whole image of the web-page on the screen 3410 before the screen 3410 is expanded.

In addition, when a handling of scrolling a partial image 3320 of the web-age included in the screen 3410 before the screen is expanded, the control unit 180 may change the image, which is included in the screen 3410 before the screen 3410 is expanded, to another partial image.

Figure 34:
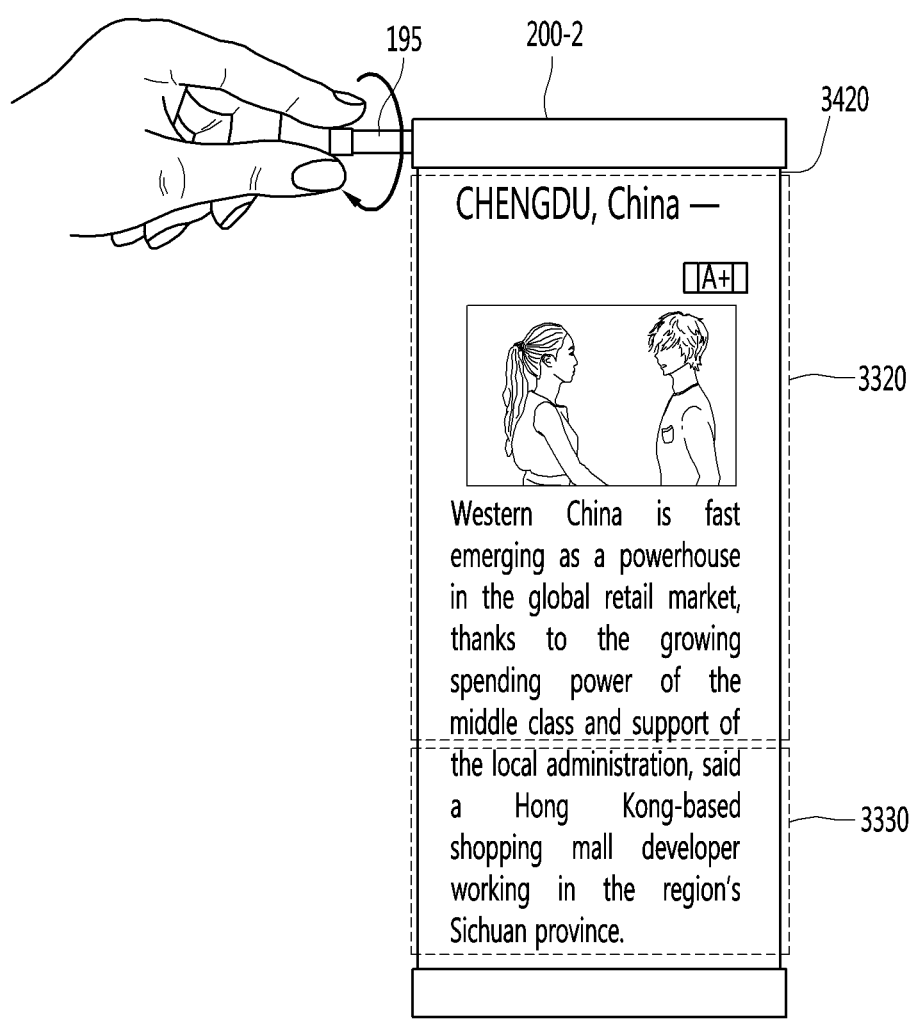

Meanwhile, when the pen 195 rotates in the first direction in the state that a part of the pen 195 is detached, the control unit 180 may control the display unit 151 to expand the screen as illustrated in FIG. 34.

Meanwhile, if the screen is expanded, the control unit 180 may display a partial or whole image 3310 of the web-page on the expanded screen 3420. In this case, the partial or whole image 3310 of the web-page may include the partial image 3320 of the web-page displayed on the screen 3310 before the screen 3310 is expanded and the partial image 3330 of the web-page additionally displayed as the screen is expanded.

In other words, if the screen is expanded in the state that a part of the web-page is displayed, another partial image of the web-page, which may not be displayed due to the size of the image, may be displayed in the additional display space produced as the screen is expanded.

Therefore, according to the present invention, the image, which is currently displayed on the we-page, is maintained to be continuously maintained while another part of the web-page is additionally displayed on the additionally expanded display space. Accordingly, the user does not need view the currently displayed image by changing the image. That is, the present invention may provide an environment that the user views the currently displayed image while viewing another part of the web-page.

Further, the present invention may provide an advantage that the user may easily adjust the size of the screen through the rotation of the pen by enlarging or reducing the screen when the pen is rotated.

Meanwhile, when a screen is expanded and a new image is additionally displayed on an expanded screen 3420, the control unit 180 may rotate the image displayed on the expanded screen 3420 and display the rotated image. In other words, an image 3320 displayed on a screen 3410 is not rotated as illustrated in FIG. 33. However, when the screen is expanded, the control unit 180 may display an image 3310 rotated at 90 degrees and may display the rotated image 3310 on the expanded screen 3420 as illustrated in FIG. 34.

Figure 35:

Meanwhile, FIG. 35 is a view illustrating a method of operating of a rollable display device when the screen is expanded by a maximum expandable length in the state that the pen is rotated As illustrated in FIG. 35, the rollable display device 200-2 is expanded to the maximum extensible length.

When the pen 195 is rotated in the first direction in the state that a part of the pen 195 is detached, the screen of the rollable display device 200-2 may be expanded.

Meanwhile, if the screen of the display device 200-2 is expanded to the maximum expanded length and the pen 195 is rotated in the first direction in the state that the part of the pen 195 is detached, the control unit 180 may scroll down the web-page and may display an image 3510 of the scrolled web-page on the screen 3430 expanded to the maximum extension length.

Specifically, when the pen 195 is maintained to be rotated in the first direction, the control unit 180 may continuously scroll the web-page, and the image of the continuously scrolled web-page may be displayed on the screen 3430 expanded to the maximum expansion length.

In this case, if a user recover the pen 195 to the state before the pen 195 is rotated by releasing the pen 195, the control unit 180 stops scrolling the web-page and displays a partial image 3510 of the displayed web-page when the scrolling of the web-page is stopped.

The user may continue to expand the size of the screen to obtain additional information from other portions of the web-page that are not yet displayed. Accordingly, when the screen is expanded to the maximum extension length, it is possible to provide an environment in which the user may easily acquire additional information by automatically scrolling the web-page without any additional operation for scrolling the web-page.

Meanwhile, the description has been made with reference to FIG. 5 regarding that the web-page is scrolled and the image of the scrolled web-page is displayed as the pen 195 rotates in the first direction in the state that the screen is expanded to the maximum extension length.

However, the present invention is not limited thereto. In addition, it may be implemented that the reduced image of the web-page is displayed as the pen 195 is rotated in the first direction in the state that the screen is expanded to the maximum expansion length.

Specifically, when the pen 195 is rotated in the first direction in the state that the screen is expanded to the maximum extension length, the control unit 180 displays the reduced image 3610 of the web-page.

For another example, when the pen 195 is rotated in the first direction in the state that the screen is expanded to the maximum extension length, and the pen is maintained to be rotated in the first direction, the control unit 180 may display an image of the web-page gradually reduced.

For another example, whenever the pen 195 is rotated in the first direction in the state that the screen is expanded to the maximum extension length, the control unit 180 may display an image of the web-page reduced by a specific ratio.

As described above, the present invention may provide an environment in which the user may easily obtain additional information by providing a reduced image as the pen is rotated when the screen is expanded to the maximum extension length.

Meanwhile, although the embodiments of FIGS. 33 to 37 have been described in that the screen is expanded or reduced as the pen is rotated, the present invention is not limited. In addition, the screen may be expanded or reduced based on another input of expanding or reducing in addition to the rotation of the pen.

Although the description has been made with reference to FIGS. 33 to 36 in that the screen is expanded or an image of an additional web-page is displayed as the pen is rotated in the first direction, the description made with reference to FIGS. 33 to 36 may be reversely applied when the pen is rotated in the second direction. In other words, the screen may be reduced as the pen is rotated in the second direction, an image of the up-scrolled web-page may be displayed as the pen is rotated in the second direction, or the image of the expanded web-page may be displayed as the pen is rotated in the second direction.

Figure 37:
Figure 38:
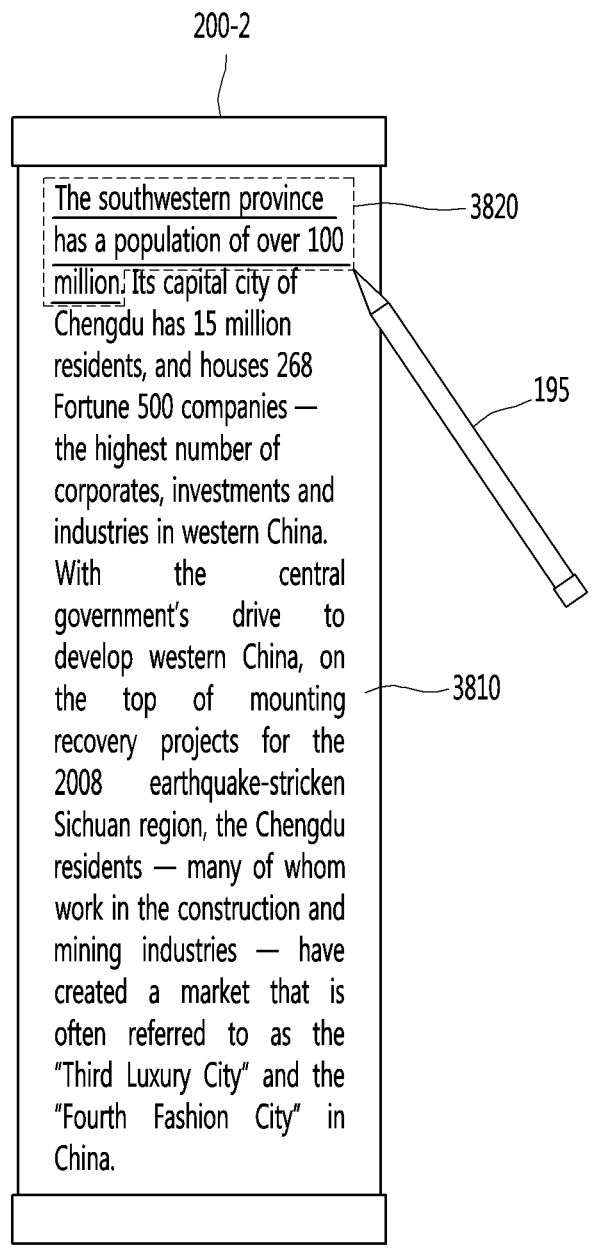

FIGS. 37 to 38 are views illustrating a method of capturing an image of a web-page according to an embodiment of the present invention.

The user may press the pen 195 to capture an image of the currently displayed web-page.

Meanwhile, when the pen 195, which has been partially detached, is mounted on the rollable display device 200-2 as the user presses the pen 195, the control unit 180 captures an image 3710 of the displayed web-page and the captured image may be stored in the storage unit 170.

For another example, the user may capture the image of the currently displayed web-page and may pull the pen 195 to make a memo on the captured image.

Meanwhile, when the pen 195, which has been partially detached, is completely detached from the rollable display device 200-2 as the user pulls the pen 195, the control unit 180 may capture an image 3810 of the displayed web-page as illustrated in FIG. 38.

In addition, the control unit 180 may display the captured image 3810 of the web-page. In addition, when an input for the memo is received from the user on the captured image 3810 of the web-page, the control unit 180 may display information 3820 corresponding to the input received from the user on the captured image 3810 of the web-page.

Figure 36:
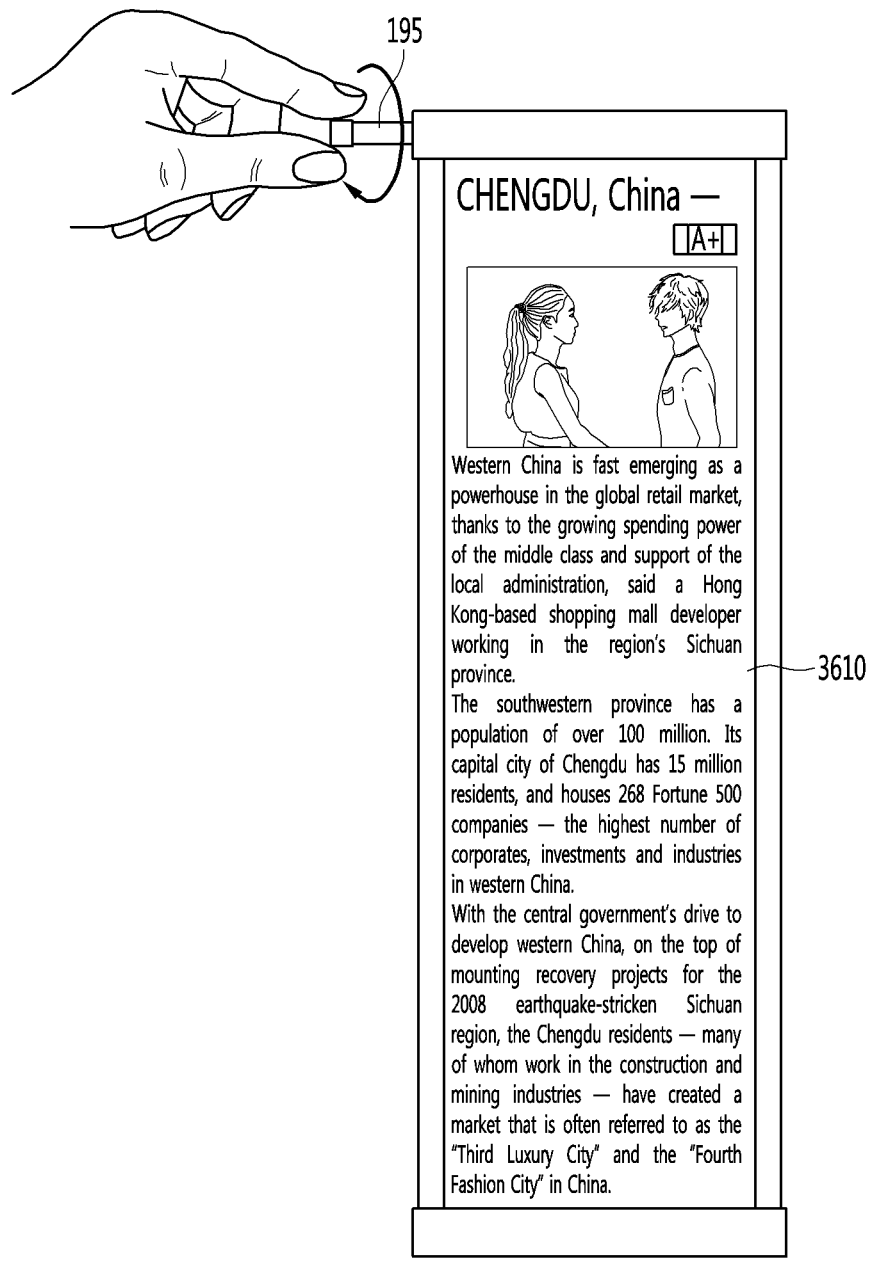

Meanwhile, as illustrated in FIG. 5, when a part 3510 of the whole image of the web-page is displayed, the control unit 180 may capture a part of the whole image of the web-page. As illustrated in FIG. 36, when the whole image 3610 of the web-page is displayed, the control unit 180 may capture the whole image of the web-page.

As described above with reference to FIGS. 31 to 36, the present invention may provide that a screen may be expanded or the web-page may be moved by using a pen, so that a user may easily select an image to be captured or a user, which is searching the web-page by using the pen, may easily capture an image by using the pen.

In addition, the present invention may be provided an environment allowing a user to simply perform a capture function in a desired capture scheme using the pen. In detail, when wanting to only capture a web-page currently displayed, a user may capture the web-page only by pressing the pen as illustrated in FIG. 37, and, when wanting to capture the web-page and to make a memo on the captured web-page, the user may capture the web-page and making the memo only by pulling the pen.

Further, according to the present invention, when a user wants to make a memo on a web-page after capturing the web-page, the pen is completely detached, so the process of making a memo is performed subsequently to the capturing, thereby improving the user convenience.

Meanwhile, although the description is made with reference to FIGS. 33 to 36 in that the screen of the rollable display device 200-2 is expanded as the pen 195 is rotated, the present invention is not limited thereto.

For example, the user may pull the pen 195 to detach a portion of the pen 195 to capture an image of the web-page. In this case, when an input for detaching a part of the pen 195 is received from the user, the control unit 180 may control the display unit 151 to expand the screen.

Meanwhile, when an input for detaching the part of the pen 195 is received from the user, the control unit 180 may expand the screen of the rollable display device 200-2 to a length in which the whole image of the web-page may be displayed.

Meanwhile, since the length of the whole image of the web-page is longer than the maximum extension length of the screen, even if the screen of the rollable display device 200-2 is expanded to the maximum extension length, the whole image of the web-page may not be displayed. In this case, that is, when the length of the whole image of the web-page is longer than the maximum extension length of the rollable display device 200-2, the control unit 180 may expand the rollable display device 200-2 to the maximum expansion length.

Meanwhile, when an input for rotating the pen 195 in the first direction is received in the state that the screen of the rollable display device 200-2 is expanded to the maximum extension length, the control unit 180 may scroll down the web-page and displays an image of the scrolled web-page 3510 on a screen 3430 expanded to the maximum expansion length as illustrated in FIG. 35.

For another example, if an input for rotating the pen 195 in the first direction is received while the screen of the rollable display device 200-2 is expanded to the maximum extension length, the control unit 180 may display a whole image 3610 of a web-page by reducing the image of the web-page as illustrated in FIG. 36.

Meanwhile, when an input for attaching the pen 195, which is partially detached, to the rollable display device 200-2 is received as illustrated in FIG. 37, or when an input for completely detaching the pen 195 partially detached is received as illustrated in FIG. 38, the control unit 180 may capture the displayed image and may store the captured image in the storage unit 170.

Figure 39A:
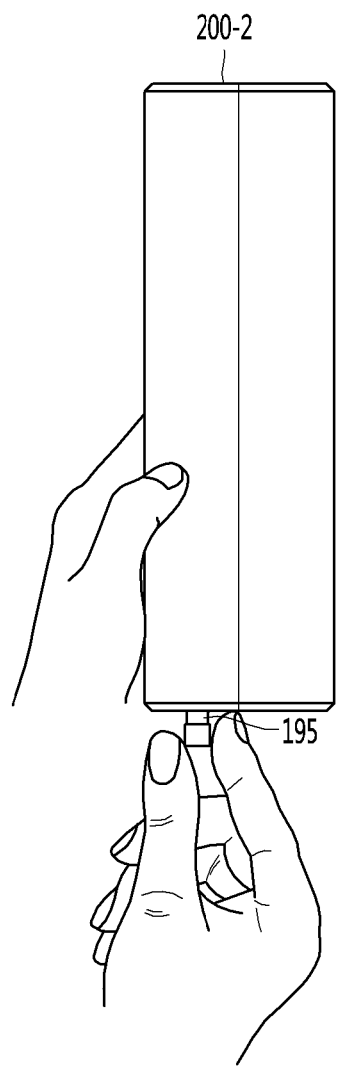
FIGS. 39A to 39C are views illustrating a method of operating a rollable display device 200-2 according to another embodiment of the present invention.
Figure 39B:
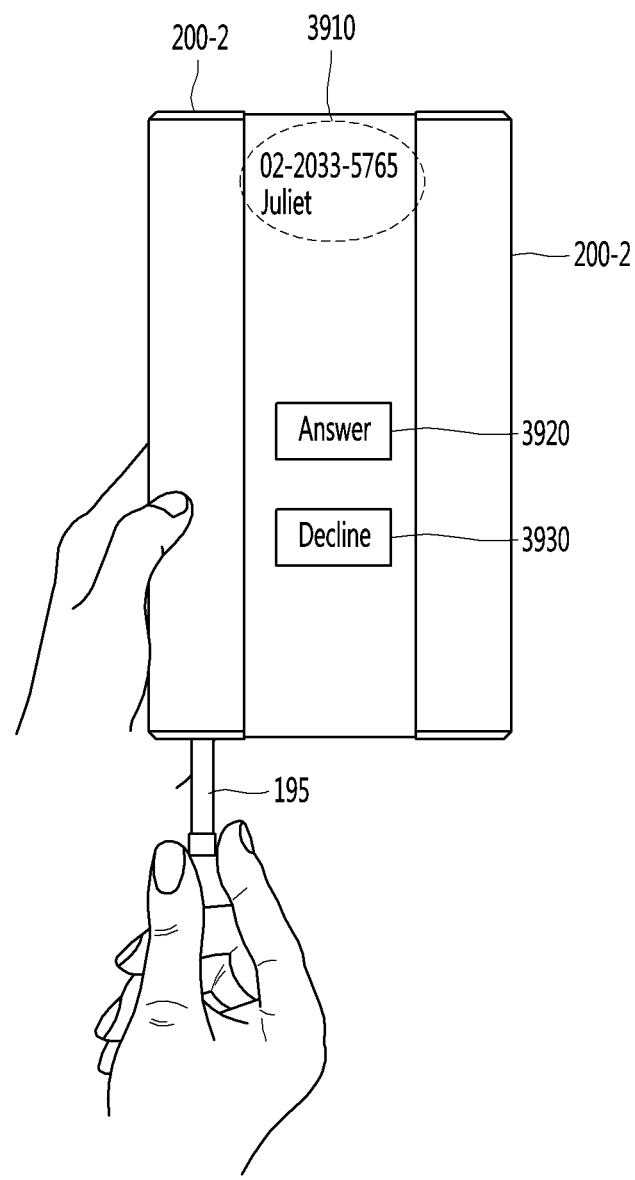
Figure 39C:
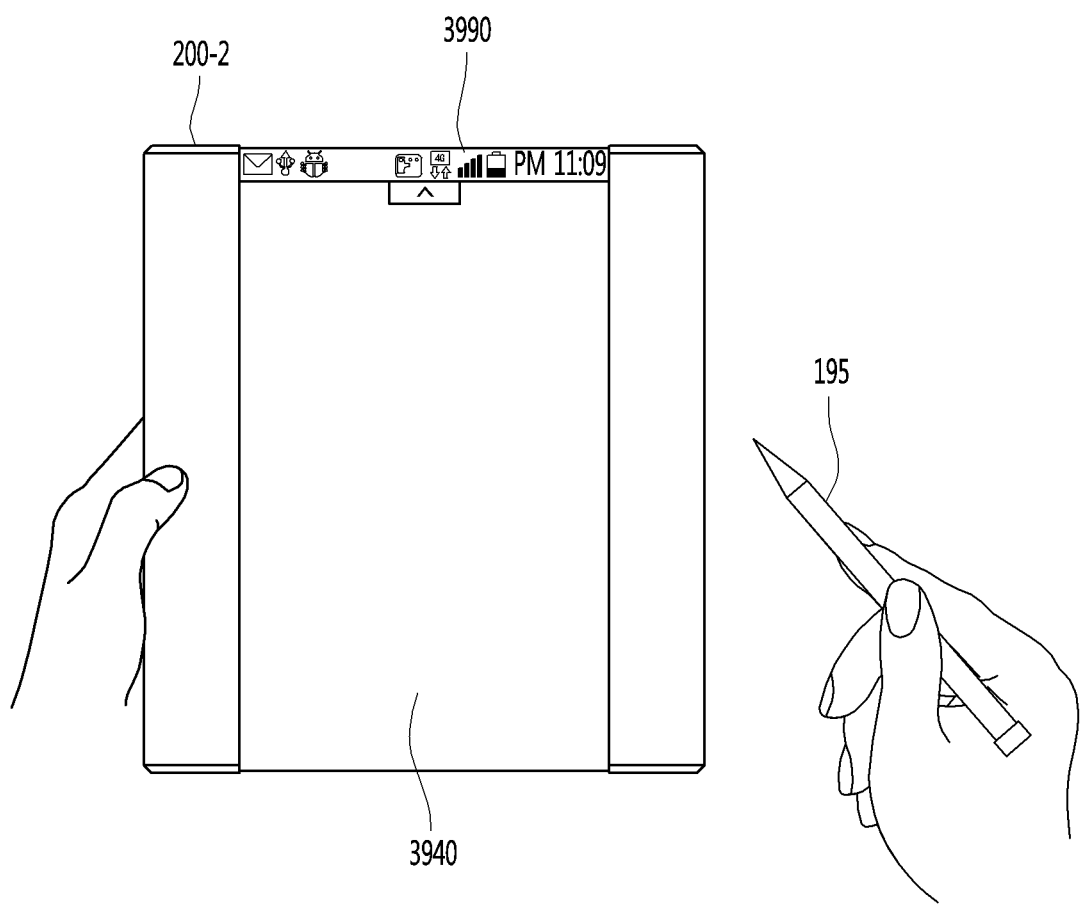

FIGS. 39A to 39C are views illustrating a method of operating the rollable display device 200-2 according to another embodiment of the present invention.

FIG. 39A is a view illustrating a situation in which a call is received from another mobile terminal in the state that the screen of the rollable display device 200-2 is closed.

When a call request is received from another mobile terminal while the screen of the rollable display device 200-2 is closed, and when a part of the pen 195 is detached, the control unit 180 may control the display unit 151 to be expanded as illustrated in FIG. 39B.

Meanwhile, when the screen is expanded, the control unit 180 displays, on the expanded screen, information 3910 on the other party requesting the telephone call, a UI 3920 for connecting the telephone call with the other party, and a UI 3930 rejecting the call.

Meanwhile, when an input for selecting the UI 3920 for calling the other party is received, the control unit 180 may receive the call of the mobile terminal of the other party. When an input for selecting a UI 3930 for rejecting the call of the other party is received, the control unit 180 may reject the call of the mobile terminal of the other party.

Meanwhile, when the user pushes the pen 195 back into the rollable display device 200-2, that is, when an input is received in which a part of the detached pen 195 is attached to the rollable display device, the control unit 180 may change the screen to be in a closed state by reducing the expanded screen again, and may receive the call of the mobile terminal of the other party.

Meanwhile, when the user pulls the pen 195, that is, when receiving an input for completely detaching the pen 195, which is partially detached, from the rollable display device 200-2, the control unit 180 may connect a telephone call with the mobile terminal of the other party and may execute the memo application as illustrated in FIG. 39C. In addition, the control unit 180 may further expand the expanded screen and may display the execution image 3940 of the memo application on the screen 3990 which is additionally expanded. In this case, the control unit 180 may additionally expand the screen so that the execution image 3940 of the memo application may be included without being truncated.

Meanwhile, when the user pulls the pen 195 again, that is, when an input for attaching the pen 195, which is partially attached to the rollable display device 200-2, is received so that a call is connected with the mobile terminal of the other party, the control unit 180 may output an audio received through the telephone call with the other party in a normal mode.

Meanwhile, when a user pulls the pen 195, that is, when an input for completely detaching the pen 195, which is partially detached, from the rollable display device 200-2 is received so that a call is connected with the mobile terminal of the other part, the control unit 180 may output, in a speaker mode, an audio received through the telephone call with the other party or may transmit an audio signal corresponding to the audio to an external device which outputs the audio.

FIGS. 40A to 40D are views illustrating a method of operating the rollable display device 200-2 according to an embodiment of the present invention.

Figure 40A:
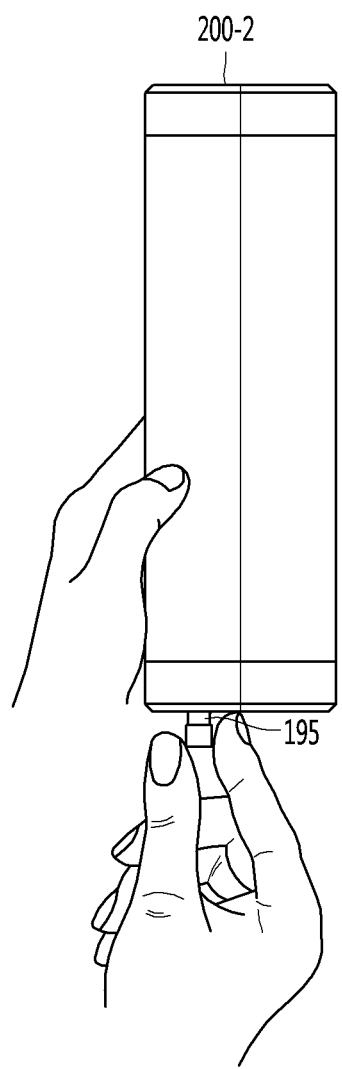
FIGS. 40A to 40E are views illustrating a method of operating a rollable display device 200-2 according to an embodiment of the present invention.

As illustrated in FIG. 40A, when a part of the pen 195 is detached in the state that the screen of the rollable display device 200-2 is closed, the control unit 180 may control the display unit 151 to expand a screen.

Meanwhile, when the screen is expanded, the control unit 180 may display one or more icons 40211 and 4022 corresponding to the application associated with the pen 195 on the expanded screen.

In this case, the application associated with the pen 195 may refer to an application that may control the operation of the application using the pen 195. For example, an application associated with the pen 195 may include a memo application allowing a user to make a memo using the pen 195, a wallpaper application of displaying one or more icons and allowing a user to select a particular icon using the pen 195, a game application allowing the user to play a game using the pen 195, and a gallery application allowing a user to edit a picture using the pen 195 or draw a new picture.

Meanwhile, based on a user operation to rotate the pen 195 in the state that one or more icons 4021 and 4022 corresponding to the application associated with the pen 195 are displayed, the control unit 180 may receive an input for selecting a specific icon of one or more icons 4021 and 4022.

Figure 40B:
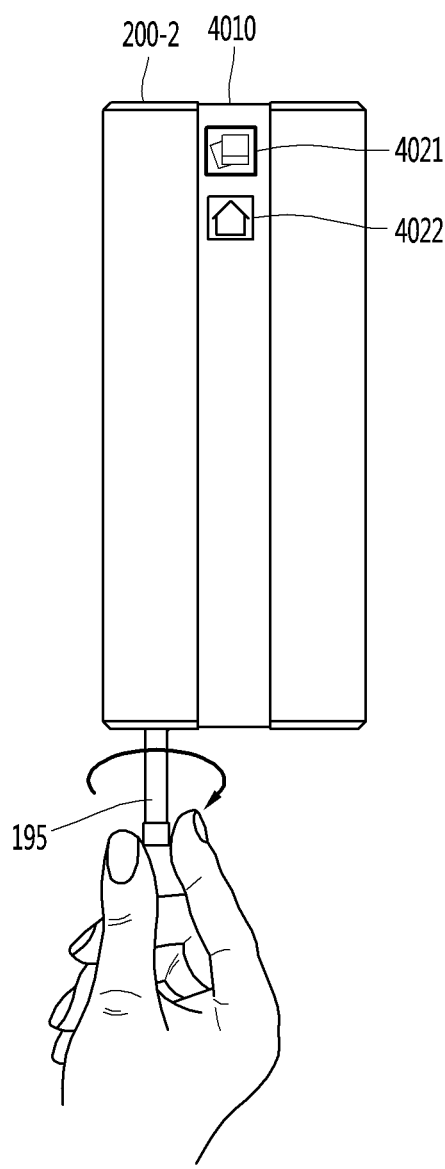
Figure 40C:
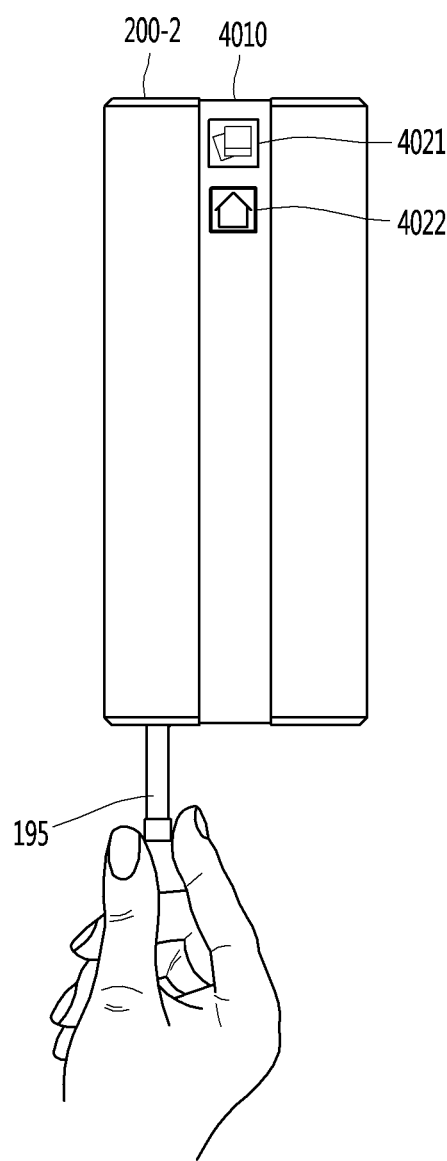

More specifically, as illustrated in FIG. 40B, when an input for rotating the pen 195 in the first direction is received in the state that the first icon 4021 of the one or more icons 4021 and 4022 is highlighted, the control unit 180 may change the highlighted icon from the first icon 4021 to the second icon 4022 as illustrated in FIG. 40C. In other words, the control unit 180 may highlight the second icon 4022.

Meanwhile, when the input for rotating the pen 195 in the second direction opposite to the first direction is received in the state that the second icon 4022 is highlighted, the control unit 180 may change the highlighted icon from the second icon 4022 to the first icon 4021. In other words, the control unit 180 may highlight the first icon 4021.

When an input for completely detaching the pen 195 from the rollable display device 200-2 is received in the state that a specific icon is highlighted, the control unit 180 determines an input for selecting a specific icon as being received.

Meanwhile, when one or more icons 4021 and 4022 are displayed and a specific icon is highlighted, when an input for completely detaching the pen 195 from the rollable display device 200-2 is received, the control unit 180 may display the execution image of the application corresponding to the specific icon.

Figure 40D:
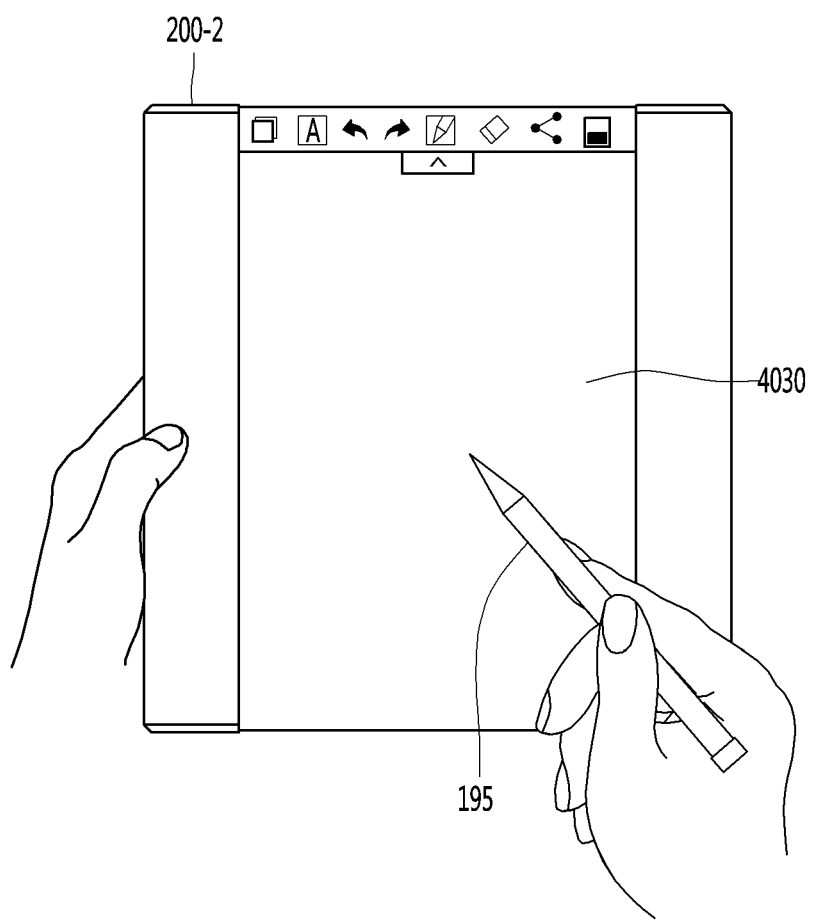

For example, when the icon corresponding to the memo application is selected, the control unit 180 may display an execution image 4030 of the memo application, as illustrated in FIG. 40D.

Figure 40E:
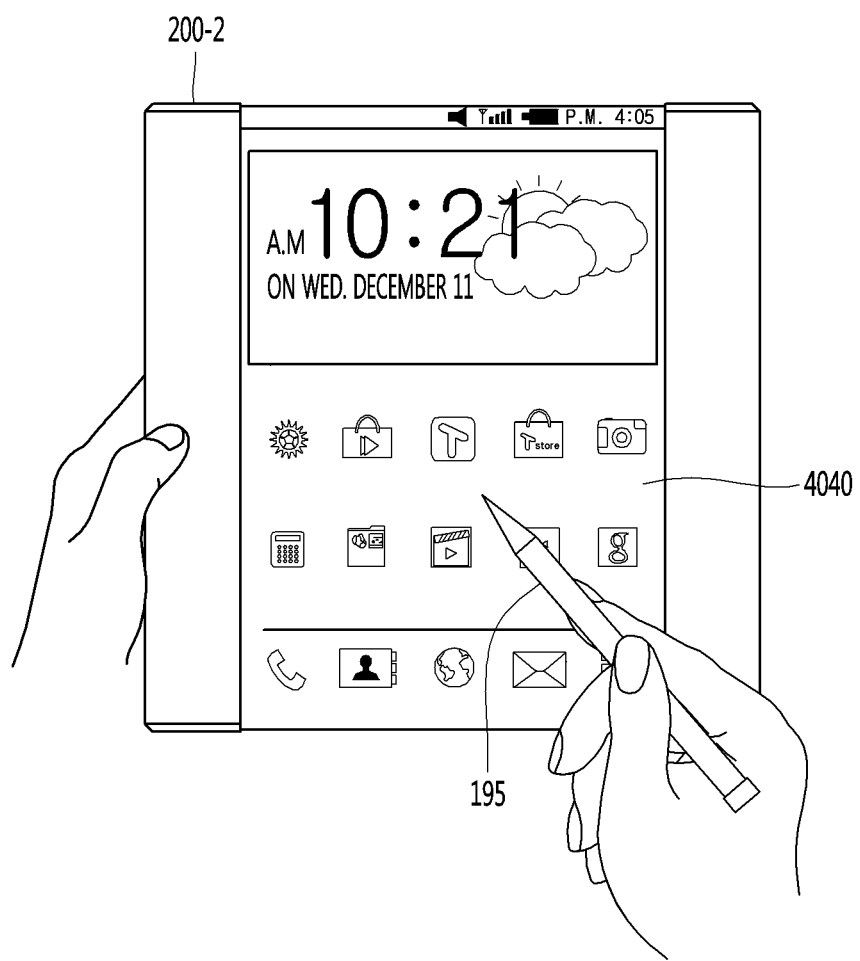

For another example, when an icon corresponding to the wallpaper application is selected, the control unit 180 may display the execution image 4040 of the wallpaper application, as illustrated in FIG. 40E.

Meanwhile, when an input for completely detaching the pen 195 from the rollable display device 200-2 is received, the control unit 180 may execute the application corresponding to the specific icon, and may expand the screen of the rollable display device 200-2 to have the size corresponding to the size of the execution image of the executed application.

Here, the size of the screen corresponding to the size of the execution image of the executed application may include the size of the execution image of the executed application, which covers the entire portion of an image having a preset size, when the execution image of the executed application is displayed in a preset size (for example, a size allowing a user to most comfortably view the execution image).

For example, when the predetermined size of the image of the memo application is 20 cm in width and 15 cm in length, the control unit 180 may expand the screen so that the size of the screen of the rollable display device 200-2 is 20 cm in width and 15 cm in length.

For another example, when the preset size of the image of the wallpaper application is 10 cm in width and 15 cm in length, the control unit 180 expands the screen so that the size of the screen of the rollable display device 200-2 is 10 cm in width and 15 cm in length.

As described above, the present invention may provide an environment in which a user may select various applications using a pen by detaching a part of the pen. In addition, there may be provided an environment in which a user may view an execution image of an application selected by the user on an optimized-size screen only through a subsequent operation of completely detaching a pen which is partially detached.

FIGS. 41A to 41F are views illustrating a method of operating the rollable display device according to another embodiment of the present invention.

Figure 41A:
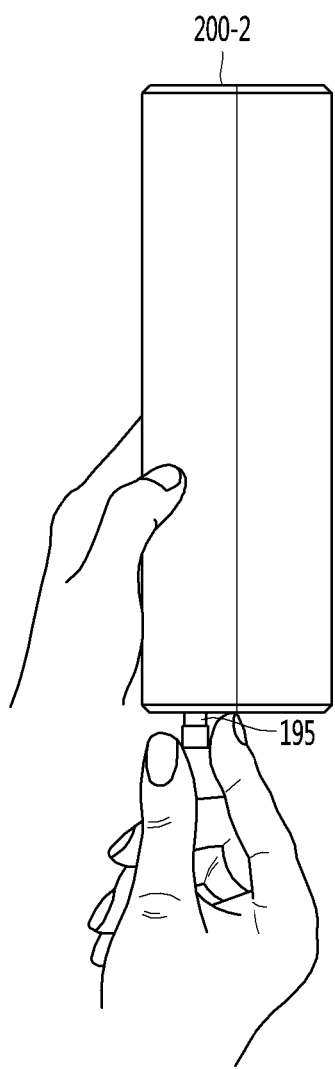
FIGS. 41A to 41F are views illustrating a method of operating a rollable display device according to another embodiment of the present invention.
Figure 41B:
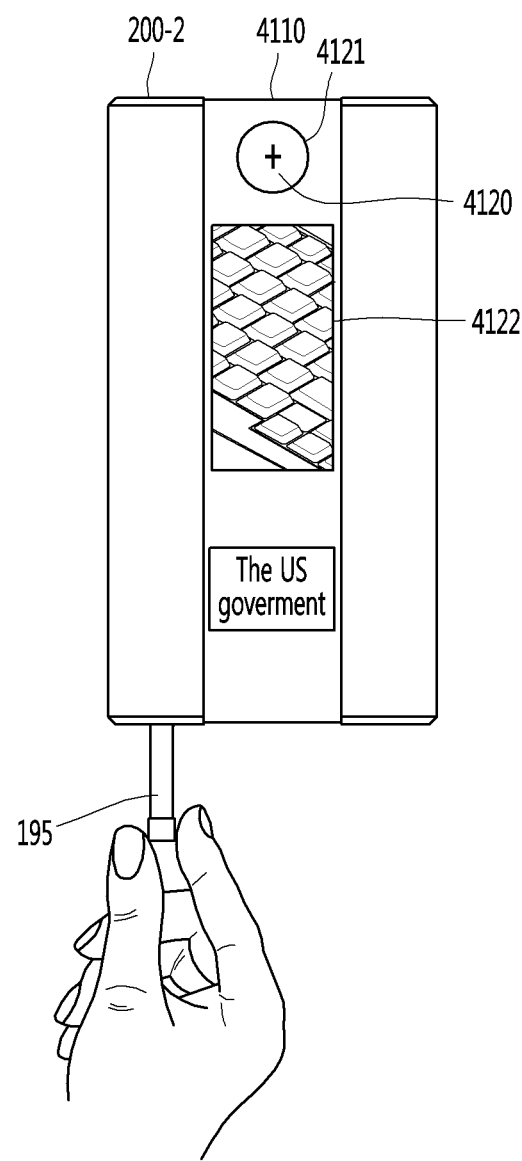

When a part of the pen 195 is detached in the state that the screen of the rollable display device 200-2 is closed as illustrated in FIG. 41A, the control unit 180 displays the display unit 151 to expand the screen as illustrated in FIG. 41B.

Meanwhile, when the screen is expanded, the control unit 180 may display the execution image 4120 of the memo application on the expanded screen 4110.

Meanwhile, an execution image 4120 of the memo application may include at least one of a UI 4121 corresponding to a new memo and a UI 4122 corresponding to a previous note.

Here, the UI 4121 corresponding to the new memo may be a UI that allows a user to make a new memo by displaying a new memo UI when selected by the user. In addition, the UI 4122 corresponding to the previous note, may be a UI allow a user to make a memo of new information on a notepad UI (that is, a notepad UI in which information corresponding to the user input has been already displayed) on when the user makes a note, when selected by the user.

Meanwhile, the UI 4122 corresponding to the previous memo may include information previously made by the user. For example, if a particular image is displayed on the notepad UI by the user attaching a specific image to the notepad UI, the UI 4122 corresponding to the previous memo may include a portion or the entire portion of the particular image.

Meanwhile, the control unit 180 may receive an input for selecting one of the UI 4121 corresponding to the new memo and the UI 4122 corresponding to the previous note.

Figure 41C:
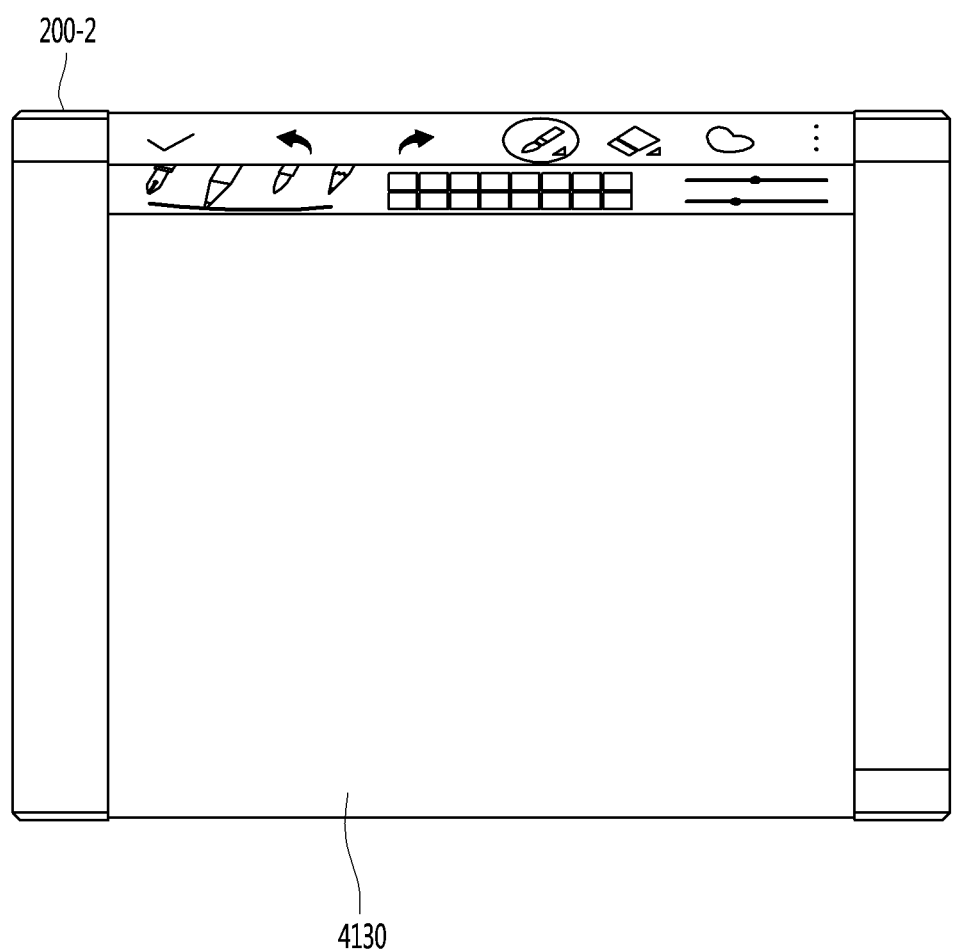

Meanwhile, when an input for selecting the UI 4121 corresponding to the new memo is received, the control unit 180 may display an execution image 4130 the memo application in the new memo mode, as illustrated in FIG. 41C. Here, the execution image 4130 of the application in the new memo mode may include a memo UI that does not contain any information.

Figure 41D:
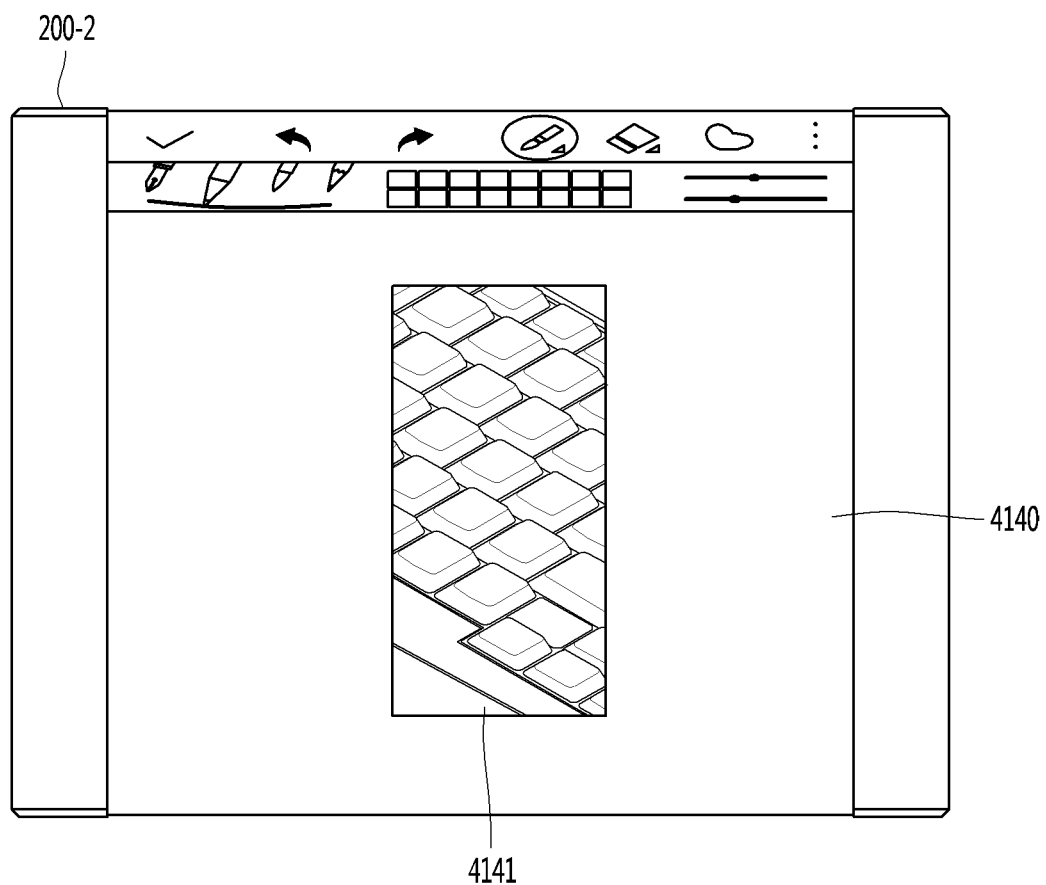

Meanwhile, when an input for selecting the UI 4122 corresponding to the previous memo is received, the control unit 180 may display the execution image 4140 of the memo application in the previous memo mode, as illustrated in FIG. 41D. In this case, the execution image 4140 of the application in the previous memo mode may include a memo UI including the memo that the user has previously performed, that is, information 4141 corresponding to the input previously received from the user.

As described above, the present invention is advantageous in that a user may easily select a desired memo option as the user detaches a part of the pen.

Meanwhile, an execution image 4130 of the application in the new memo mode or an execution image 4140 of the application in the previous memo mode may include a UI for providing functions necessary for the user to make notes.

Figure 41E:
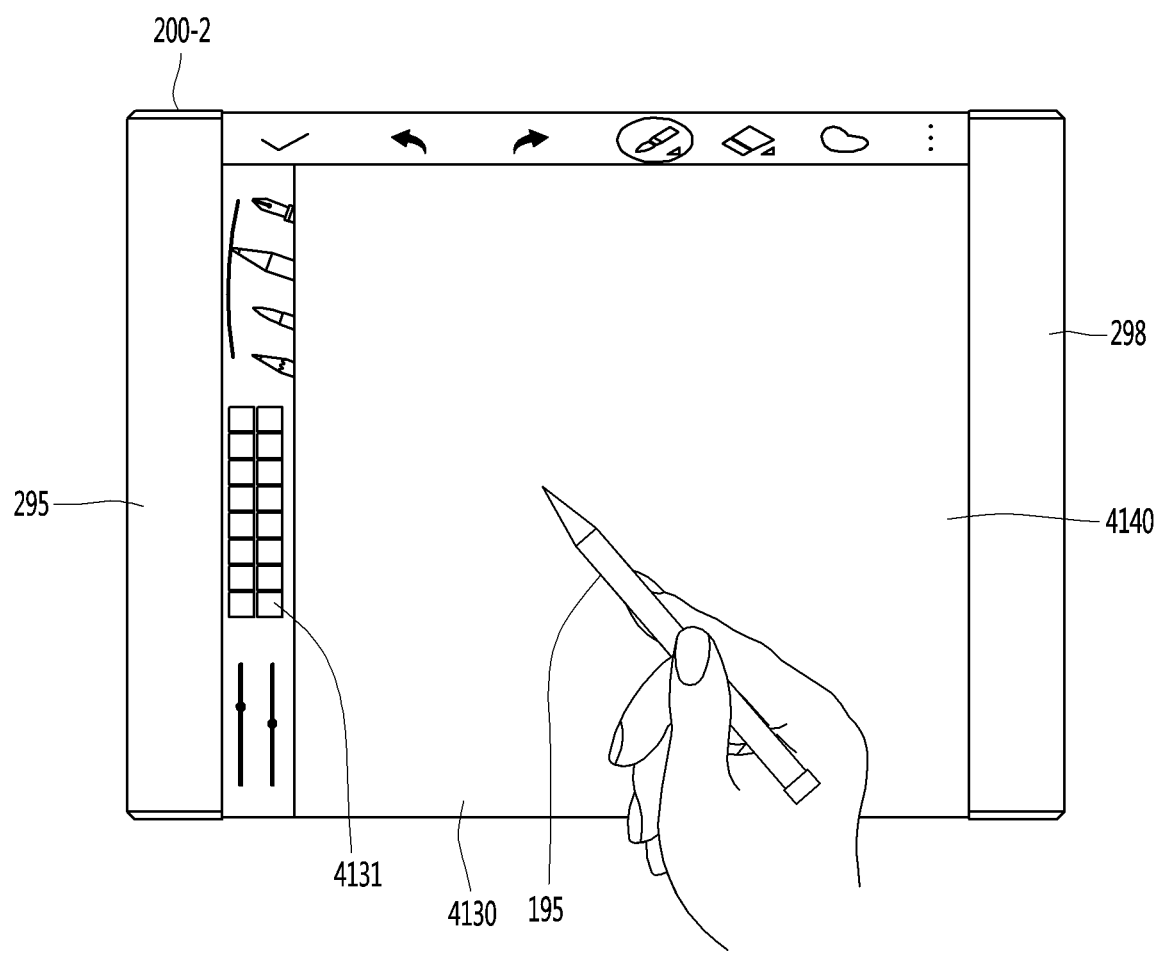
Figure 41F:
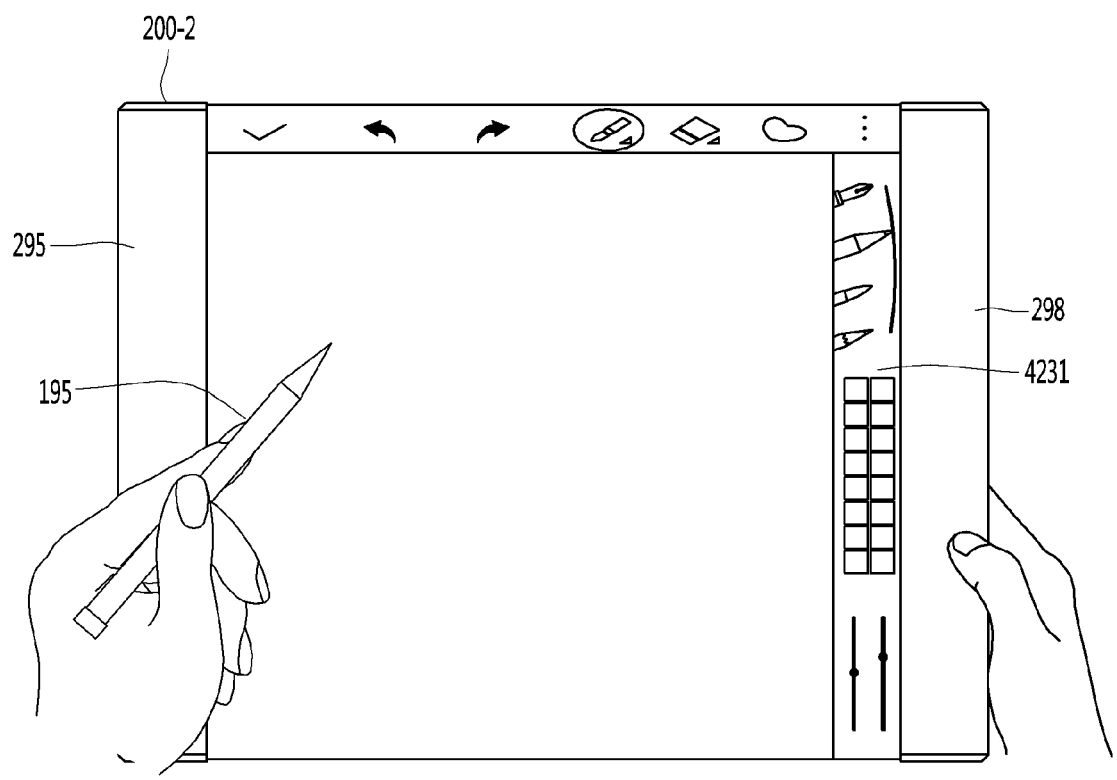

Although the description has been made with reference FIGS. 41E and 41F in that a UI is displayed to provide a function necessary for a user to make a memo in the state that the UI is displayed on the execution image 4130 of the application in the new memo mode, but the present invention is not limited thereto. The embodiments of FIGS. 41E and 41F may be applied even in the state that the execution image 4140 of the application in the previous mode is displayed.

The execution image 4130 of the memo application may include a UI for providing functions necessary for the user to make a note. For example, the execution image 4130 of the memo application may include a palette UI 4131 that allows the user to select at least one of the color, thickness, and effect of the UI corresponding to the input.

Meanwhile, based on the position of the hand supporting the rollable display device 200-2, the control unit 180 may display the UI for providing a function necessary for a user to make a memo at a specific position.

For example, as illustrated in FIG. 41E, when the user holds the first case 295 with the left hand of the user and holds the pen 195 with the right hand of the user, that is, when the touch of the user to the first case 295 is sensed by the first sensing unit (not illustrated) and the pen 195 is detached, the control unit 180 displays a UI 4131 for providing the function necessary for the user to make a memo on the left side of the screen.

For example, as illustrated in FIG. 41F, when the user holds the second case 298 with the right hand of the user and holds the pen 195 with the left hand thereof, and when the touch of the user to the second case 298 is sensed through the second sensing unit (not illustrated) and the pen 195 is detached, the control unit 180 displays the UI 4131 for providing a function necessary for the user to make a memo on the right side of the screen.

As described above, the present invention may provide an optimized UI to the hand of the user.

FIGS. 42A to 42D are views illustrating a method of operating of the rollable display device according to an embodiment of the present invention.

Figure 42A:
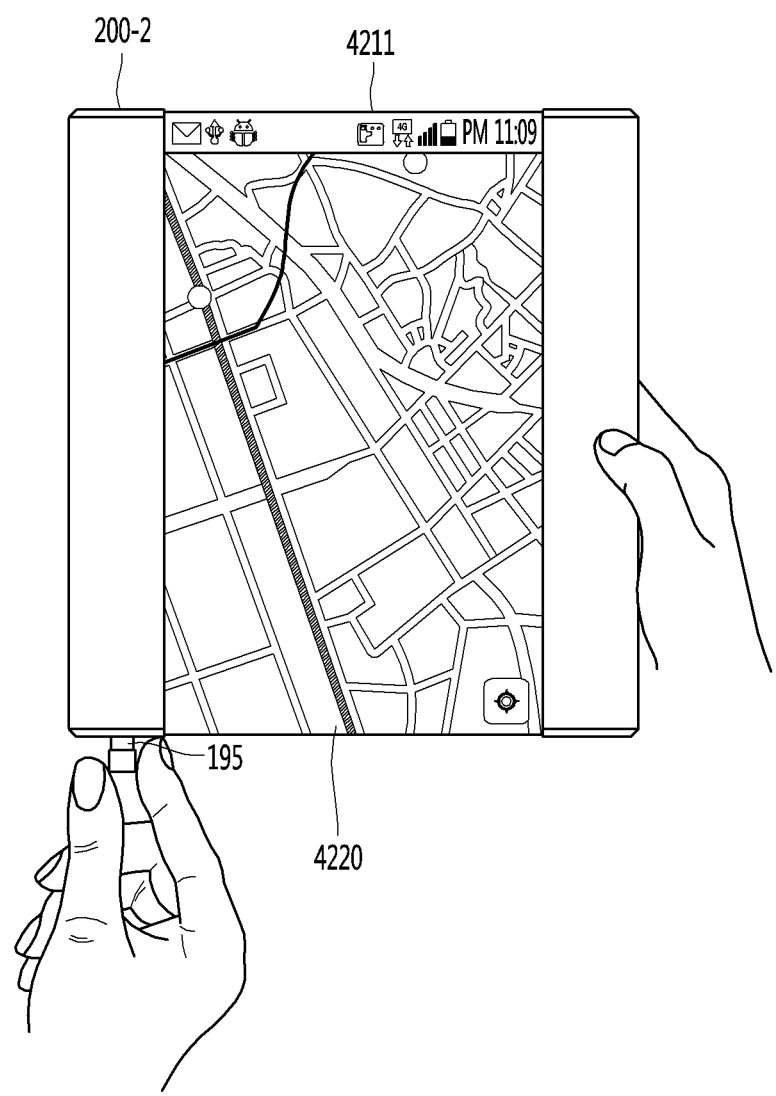
FIGS. 42A to 42D are views illustrating a method of operating of a rollable display device according to an embodiment of the present invention.

In FIG. 42A, the screen of the rollable display device 200-2 is currently open, and the execution image 4220 of the map application is displayed on the screen 4211.

Figure 42B:
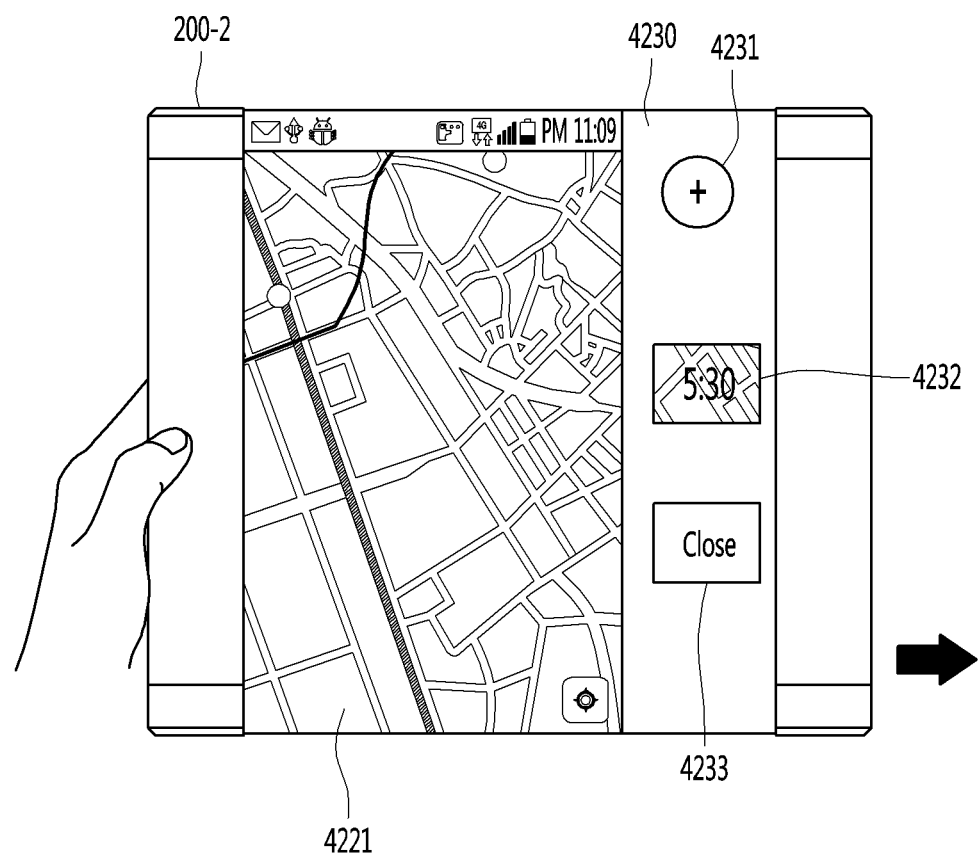

Meanwhile, when the pen 195 is detached, the control unit 180 may execute the memo application and may display the execution image 4230 of the memo application, as illustrated in FIG. 42B.

Meanwhile, an execution image 4230 of the memo application may include at least one of a memo UI 4231 related to the map, a memo UI 4232 on the map, and an ending UI 4233 of the memo application.

In this case, a memo UI 4231 related to a map is a UI for allowing the user to make a memo related to the map by displaying the memo UI when the memo UI 4231 related to the map is selected by the input received from the user.

In addition, a memo UI 4232 on a map may include a UI in which, when the memo UI 4232 on the map is selected by a input received from the user, a map 4221, which is currently displayed, is captured and a notepad UI including the captured map is displayed, thereby allowing a user to make a not on the captured map.

Meanwhile, a termination UI 4233 of the memo application may be a UI of terminating the memo application, which is running, when the termination UI 4233 of the memo application is selected by the input received from the user.

Figure 42C:
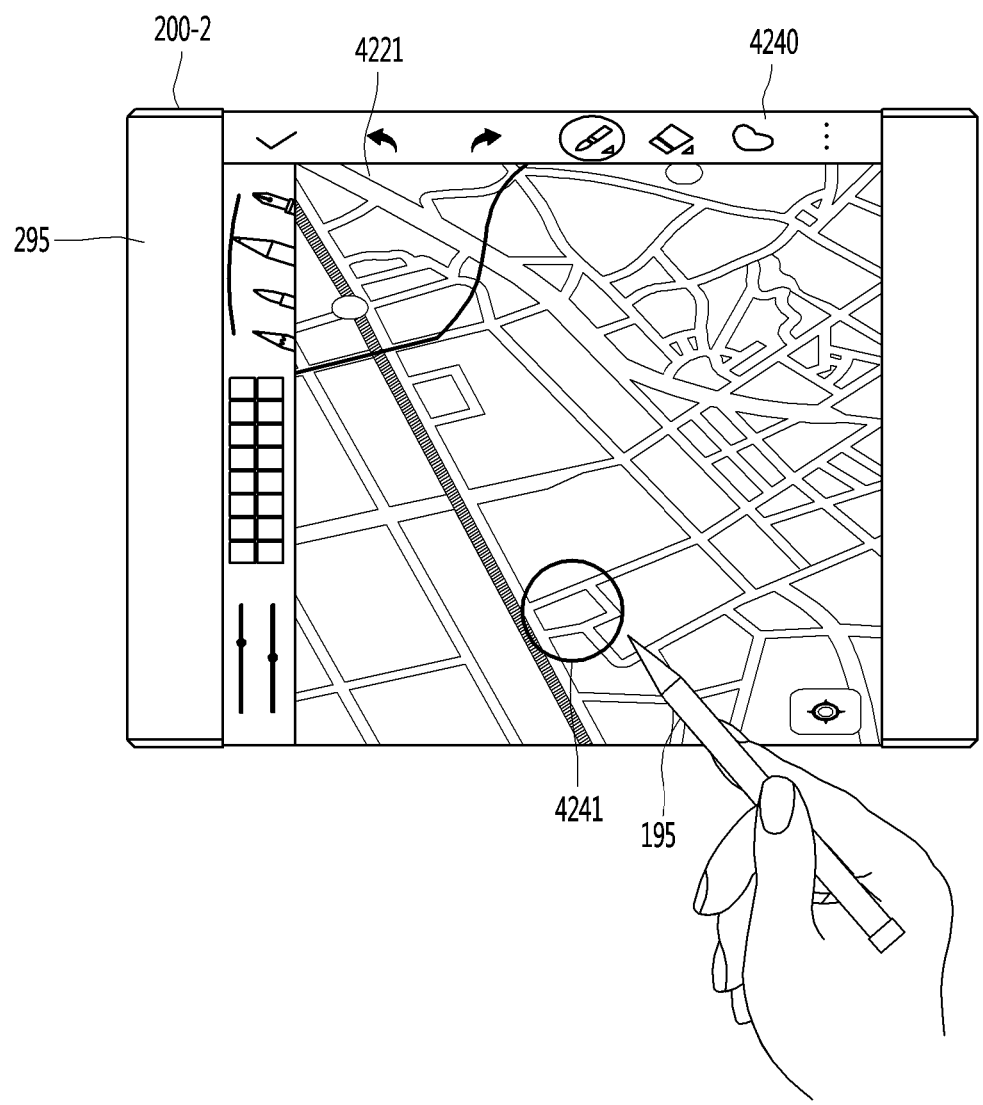

When an input for selecting the memo UI 4232 on the map is received, the control unit 180 may capture the displayed map 4221 an may display an execution image 4240 of a memo application including the captured map as illustrated in FIG. 42C.

Meanwhile, when an input is received from the user, the control unit 180 may display information corresponding to the input received from the user. For example, when an input using the pen 195 is received on the map 4221, the control unit 180 displays the UI 4241 corresponding to the movement trajectory of the pen 195 on the map 4221.

Figure 42D:
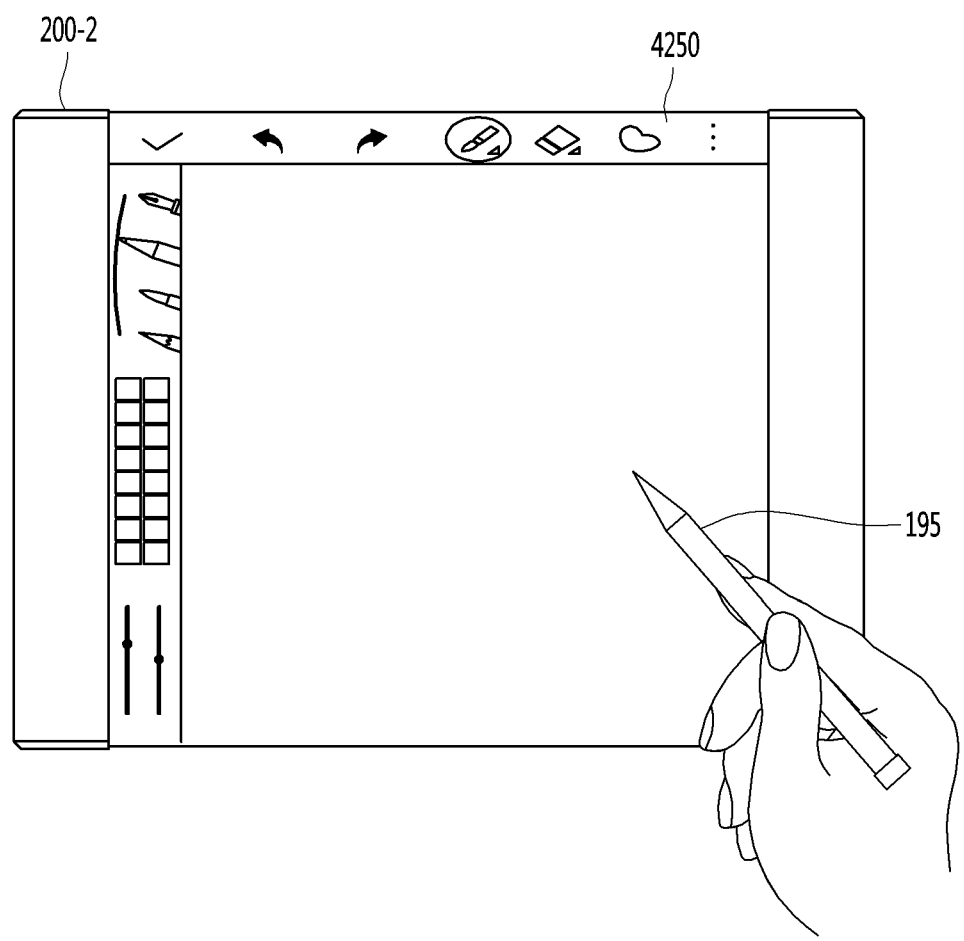

Meanwhile, when an input for selecting the memo UI 4231 related to the map is received, the control unit 180 may display the execution image 4250 of the memo application including the memo UI as illustrated in FIG. 42D.

Meanwhile, when an input is received from the user, the control unit 180 may display information corresponding to the input received from the user on the notepad UI.

Meanwhile, when an input for storing the information displayed on the notepad UI is received and when the input for selecting the memo UI 4231 related to the map is received, the control unit 180 stores the map displayed, may match information displayed on the notepad UI to the stored map, and may be store the matching result.

Meanwhile, when an input for selecting the memo UI 4231 related to the map is received, or when an input for selecting the memo UI 4232 on the map is received, the control unit 180 expands the screen of the rollable display device 200-2 such the size of the screen of the rollable display device 200-2 is matched with the size of the execution image of the memo application in a pen mode.

Meanwhile, the description has been described with reference to FIG. 42B in that at least one of the memo UI 4231 related to the map, the memo UI 4232 on the map, and the termination UI 4233 of the memo application is displayed, the present invention is not limited thereto.

For example, the process described in FIG. 42B may be omitted. More specifically, as illustrated in FIG. 42A, when the pen 195 is detached in the state that the screen of the rollable display device 200-2 is currently opened and the execution image 4220 of the map application is displayed on the screen 4211, the control unit 180 may capture the displayed map 4221 and display the execution image 4240 of the memo application including the captured map as illustrated in FIG. 42C.

As described above, according to the present invention, when a user detaches a pen to make a note, a UI for selecting various memo options is automatically displayed, so that the user may easily select a manner of making note, which is desired by the user.

FIGS. 43A to 44D are views illustrating a method of operating the rollable display device 200-2 according to another embodiment of the present invention.

The above description has been described in that the sensing unit 140 may sense the detachment and rotation of the pen 195.

Then, the pen 195 may be detached according to an operation in which the user holds the pen 195 while pulling it. Further, the pen 195 may be detached according to an operation in which the user holds the pen 195 and rotates while pulling it.

Meanwhile, based on whether the pen 195 is detached or rotated, the control unit 180 may determine whether to expand the screen of the rollable display device 200-2.

Figure 43A:
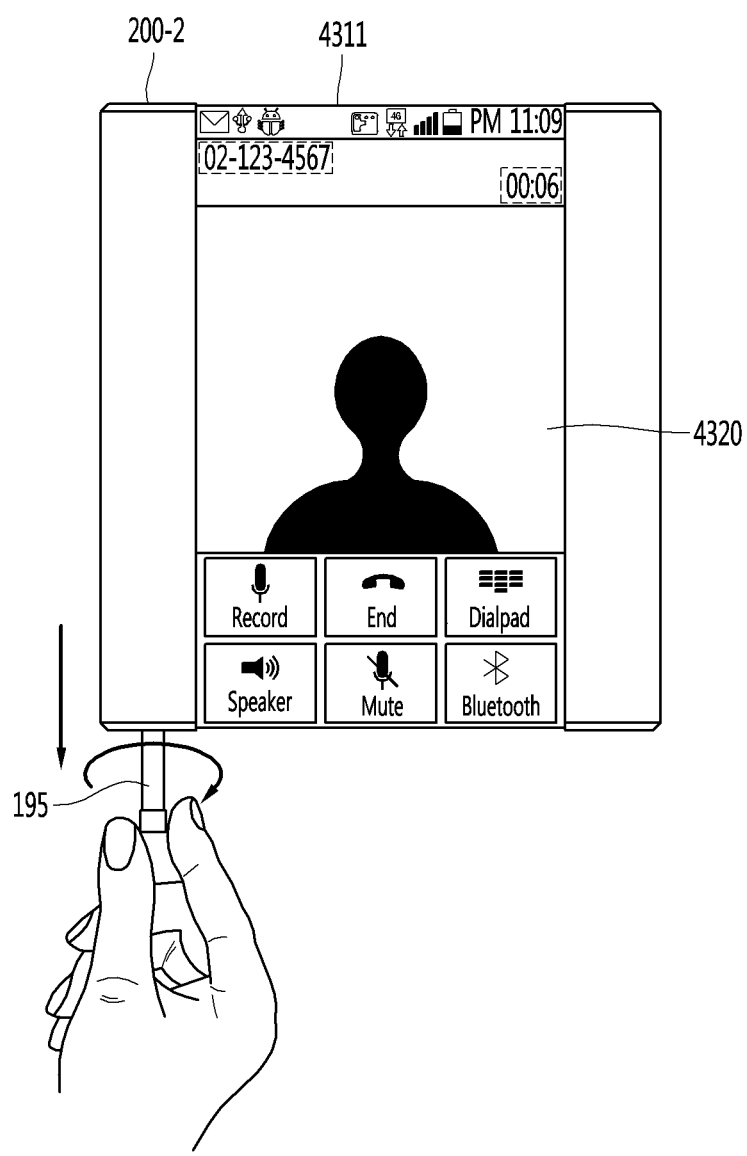
FIGS. 43A to 44B are views illustrating a method of operating a rollable display device 200-2 according to another embodiment of the present invention.
Figure 43B:
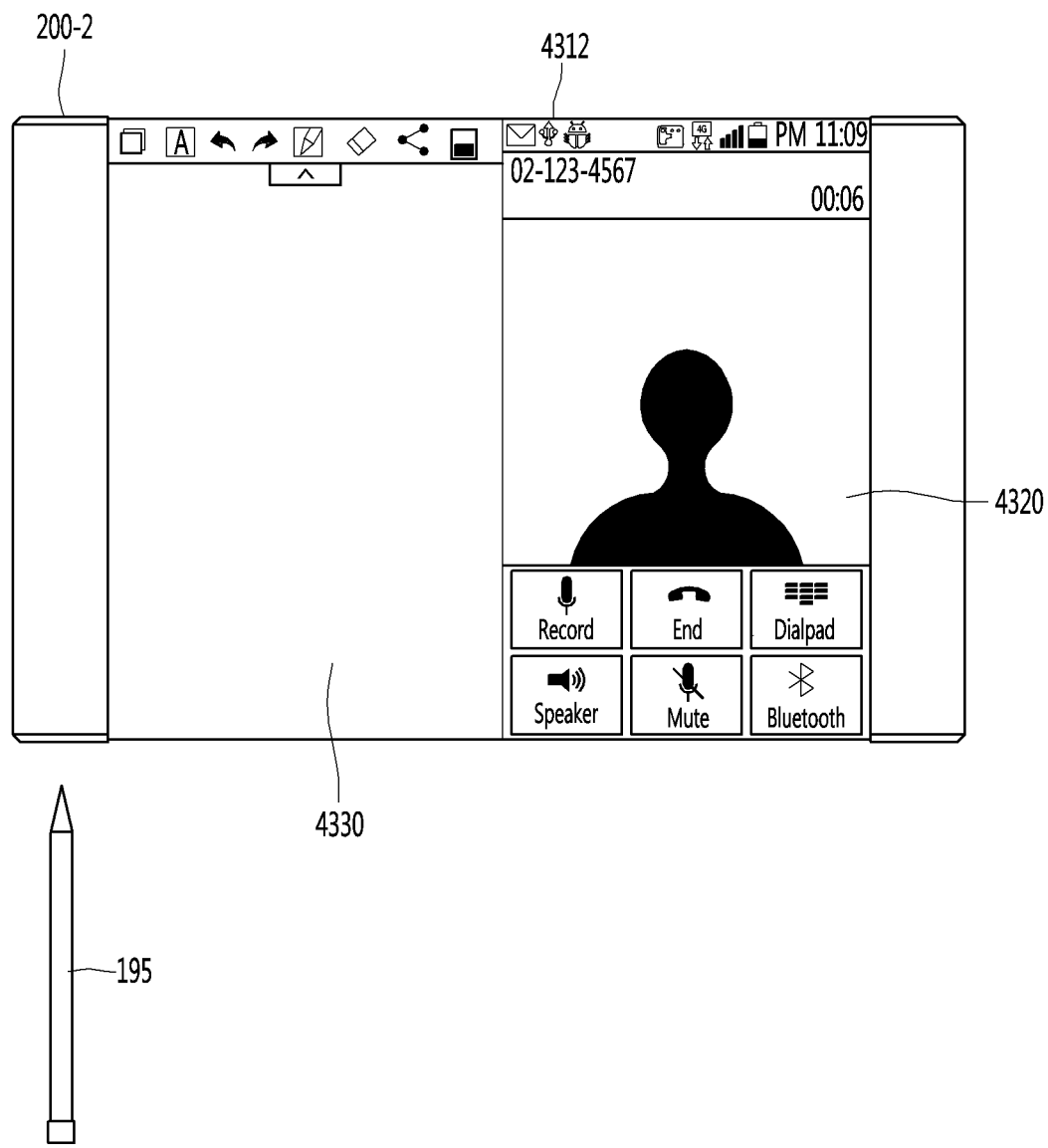

Specifically, referring to FIG. 43A, the execution image 4320 of the telephone call application is displayed while the screen 4311 of the rollable display device 200-2 is open.

Meanwhile, if the rotation and the detachment of the pen 195 is detected in the state that the screen 4311 of the rollable display device 200-2 is open (that is, when the pen 195 is rotated while being detached), the control unit 180 may expand the screen of the rollable display device 200-2, may execute the memo application, may display an execution image 4330 of the memo application on the first region of the expanded screen 4312, and may display an execution image 4320 of a telephone call application on the second region of the expanded screen 4312.

Meanwhile, when an input is received on the execution image 4330 of the memo application, the control unit 180 may display the information corresponding to the received input on the execution image 4330 of the memo application.

Figure 44A:
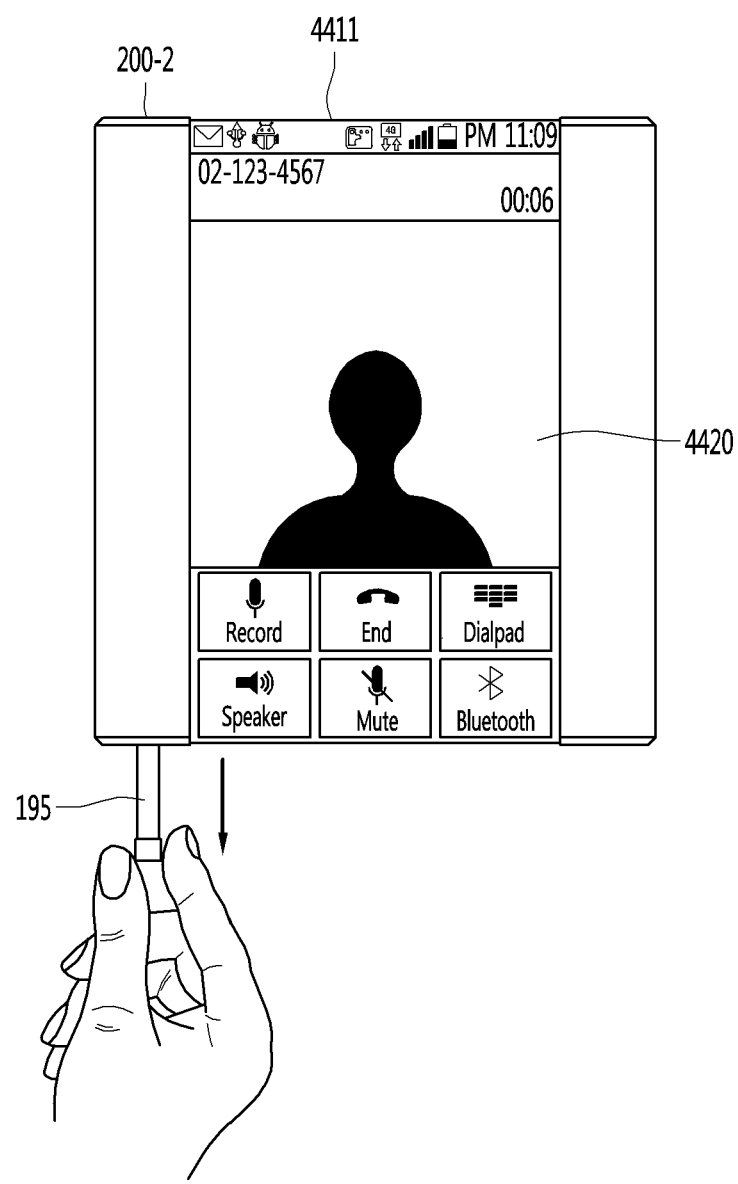
Figure 44B:
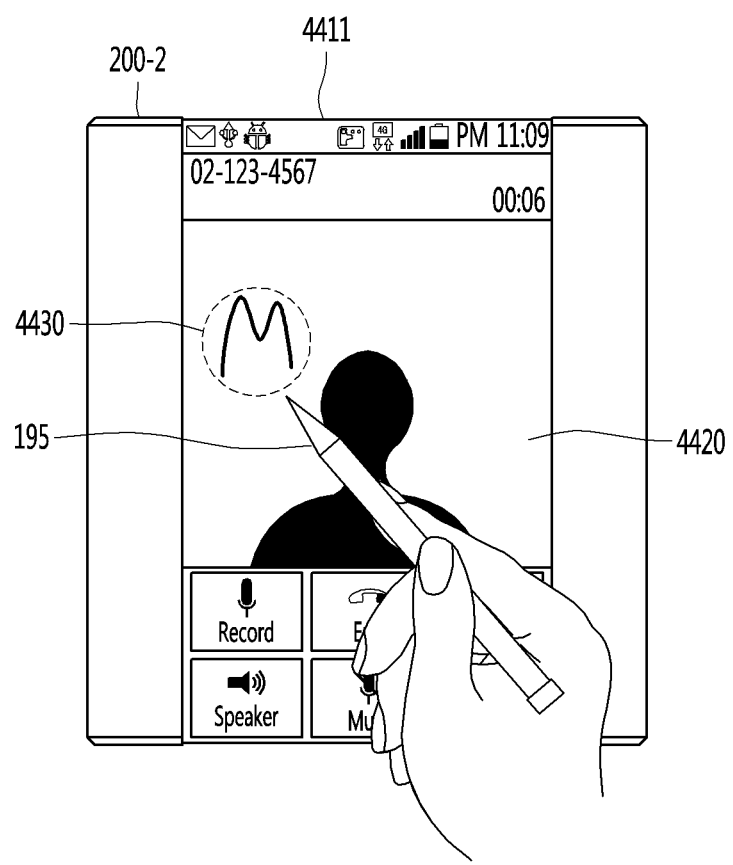

Meanwhile, referring to FIG. 44A, the execution image 4420 of the telephone call application is displayed in the state that the screen 4411 of the rollable display device 200-2 is open.

Meanwhile, when the detaching of the pen 195 is sensed (that is, when the pen 195 is detached without being rotated) in the state that the screen 4411 of the rollable display device 200-2 is open, the control unit 180 may execute the memo application. In this case, the execution mode of the memo application which is executed may be a mode for displaying information corresponding to the input received from the user on the execution image 4420 of the telephone call application. Meanwhile, if the pen 195 is detached without being rotated, the screen 4411 of the rollable display device 200-2 is also not expanded.

Meanwhile, as illustrated in 44B, when an input is received on the execution image 4420 of the telephone call application, the control unit 180 sends the information 4430 corresponding to the received input to the execution image 4420 of the telephone call application.

Meanwhile, when an input for storing the information 4430 displayed on the execution image 4420 of the telephone call application is received, the control unit 180 may store the displayed information 4430 in the storage unit 170. For another example, when an input for storing the information 4430 displayed on the execution image 4420 of the telephone call application is received, the control unit 180 may store information 4430 displayed on the execution image 4420 of the telephone call application together with the execution image 4420 of the telephone call application. For another example, when an input for storing the displayed information 4430 on the execution image 4420 of the telephone call application is received, the control unit 180 may match the displayed information 4430 with a phone number of the other party of a telephone call and may store the information matched with the telephone call of the other party.

Thus, the present invention provides an environment allowing the user to select various memo modes based on the method of detaching the pen.

Figure 45A:
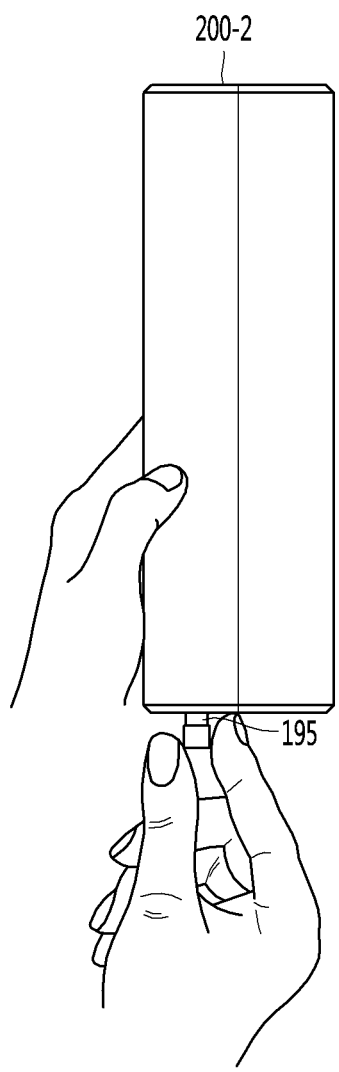
FIGS. 45A to 45C are views illustrating a method of enlarging a screen according to another embodiment of the present invention.
Figure 45B:
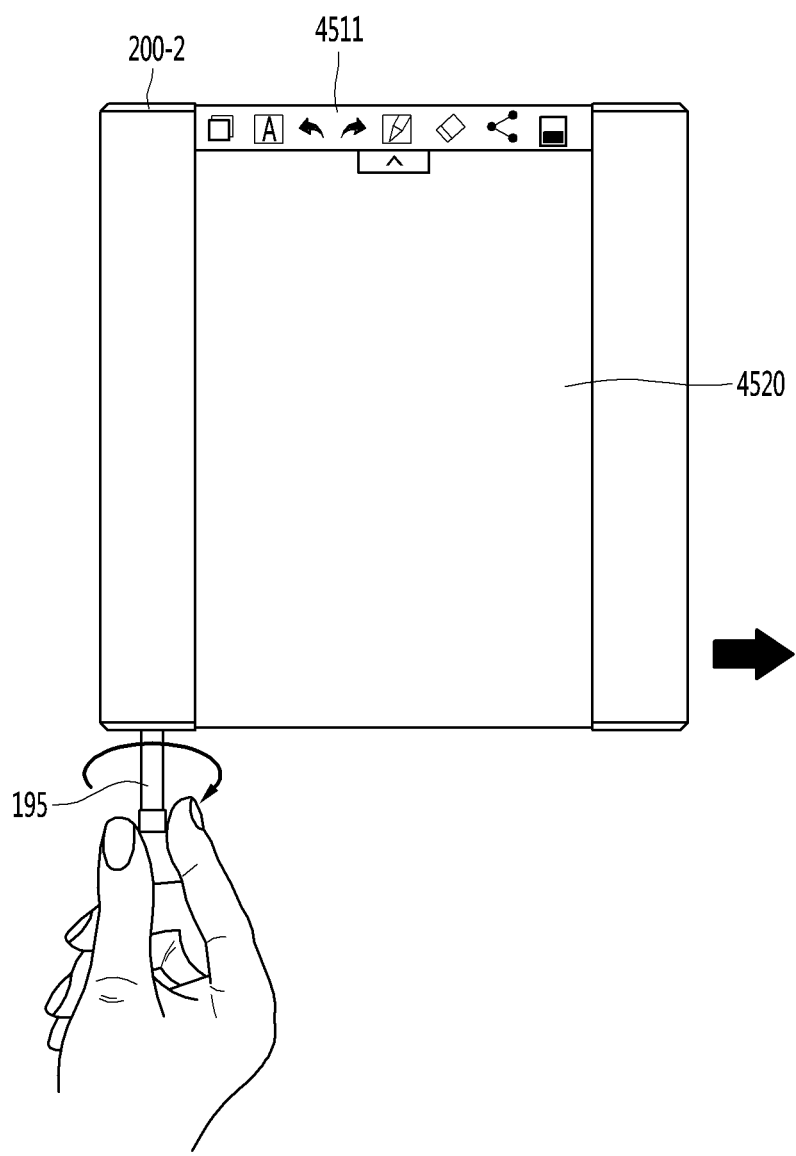
Figure 45C:
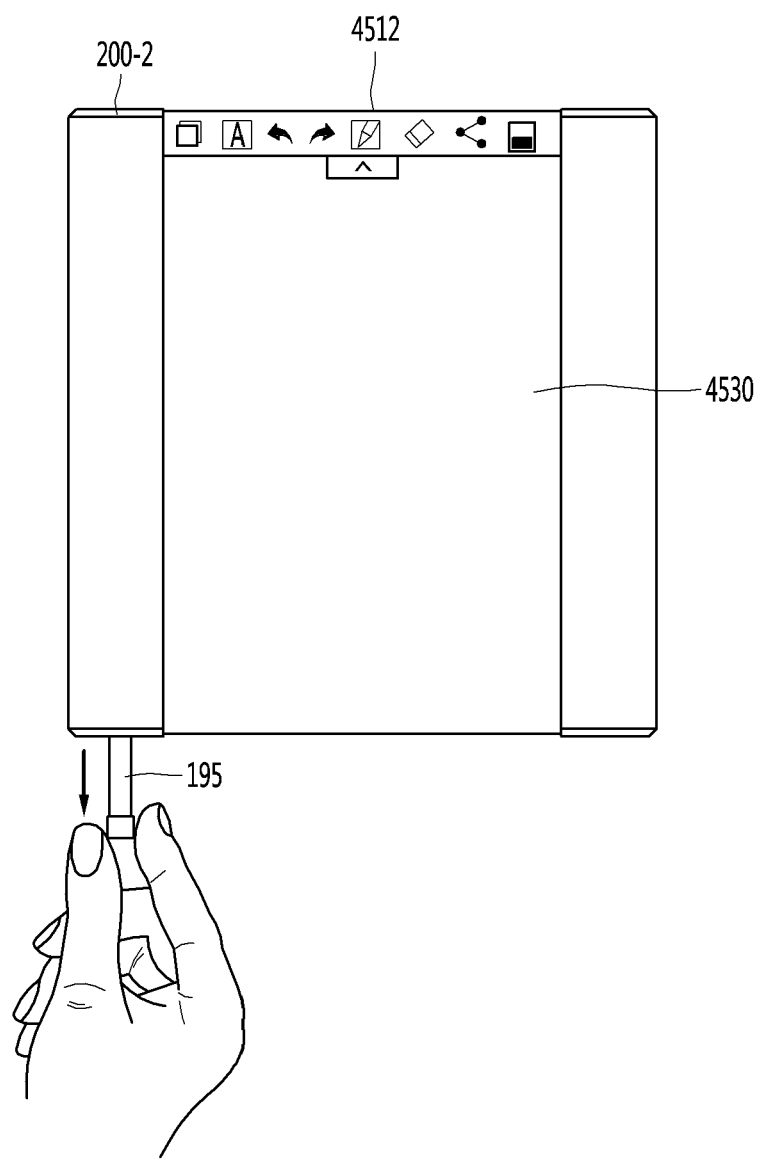

FIGS. 45A to 45C are views illustrating a method of expanding a screen according to another embodiment of the present invention.

As illustrated in FIG. 45A, the screen of the rollable display device 200-2 is currently closed.

Meanwhile, if a part of the pen 195 is detached in the state that the screen is closed, the control unit 180 may change the mode of the rollable display device 200-2 to a screen size adjustment mode. Here, the screen size adjustment mode is a mode in which the screen may be expanded or reduced according to the rotation of the pen 195.

Meanwhile, when the pen 195 is rotated in the first direction in the state that the part of the pen 195 is detached, the control unit 180 may control the display unit 151 to expand the screen of the rollable display device 200-2 as illustrated in FIG. 45B. In this case, the first direction may be a clockwise direction.

Meanwhile, when a part of the pen 195 is detached in the state that the screen is closed, the control unit 180 may execute the memo application. Meanwhile, as the screen of the rollable display device 200-2 is expanded, the control unit 180 may display the execution image 4520 of the memo application corresponding to the size of the screen 4511 to be expanded.

Meanwhile, when the pen 195 is completely detached from the rollable display device 200-2 and the rotation of the pen 195 is stopped, the control unit 180 may stop the expansion of the screen and may display the execution image 4530 of the memo application in size of the screen 4512 stopped in expanding, as illustrated in FIG. 45C.

Meanwhile, although the above embodiment has been described only regarding the expansion of a screen, the present invention is not limited. For example, when the pen 195 is rotated in the second direction in the state that a part of the pen 195 is detached, the control unit 180 may reduce the screen of the rollable display device 200-2 and may control the display unit 151 such that the execution image of the memo application is displayed in reduced size. In this case, the second direction may be counterclockwise.

The size of the notepad that the user wants to use for notes may vary depending on the situations. Therefore, the present invention may provide an environment in which a user may pull out a pen after adjusting the size of the notepad in the process of pulling out the pen to make a note.

FIGS. 46A to 46D are views illustrating a method of operating the rollable display device when a telephone call request event occurs according to another embodiment of the present invention.

Figure 46A:
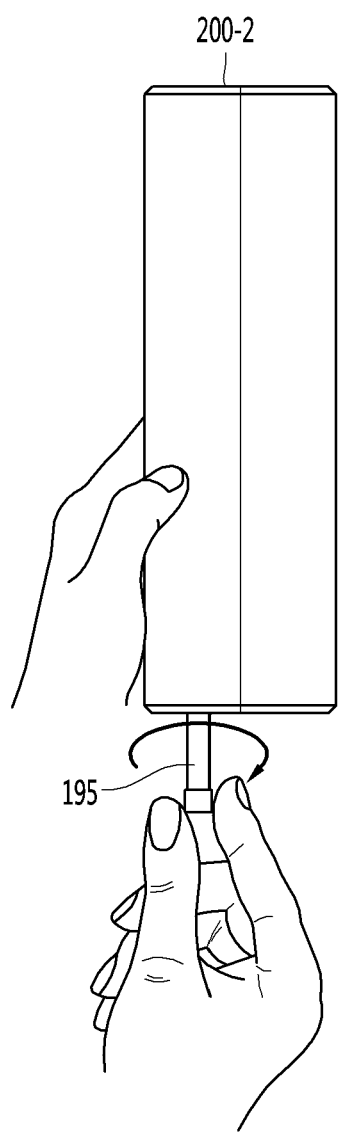
FIGS. 46A to 46D are views illustrating a method of operating the rollable display device when a telephone call request event occurs according to another embodiment of the present invention.

Referring to FIG. 46A, a telephone call request event has occurred in the state the screen of the rollable display device 200-2 is closed. In this case, the telephone call request event may be an event in which a request for connection of a telephone call is received from a mobile terminal of the other party.

Figure 46B:
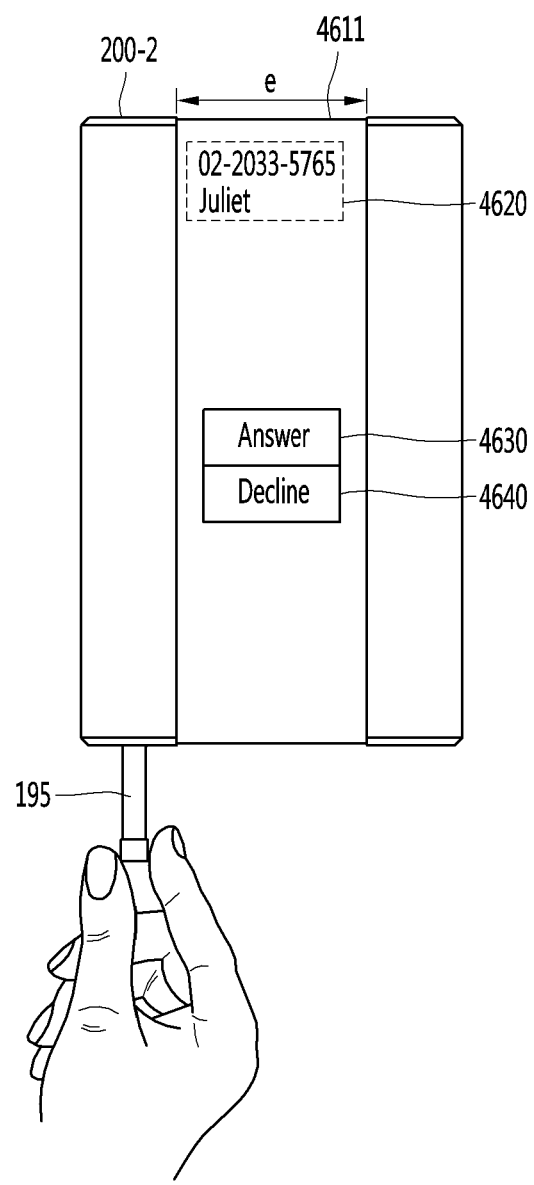
Figure 46C:
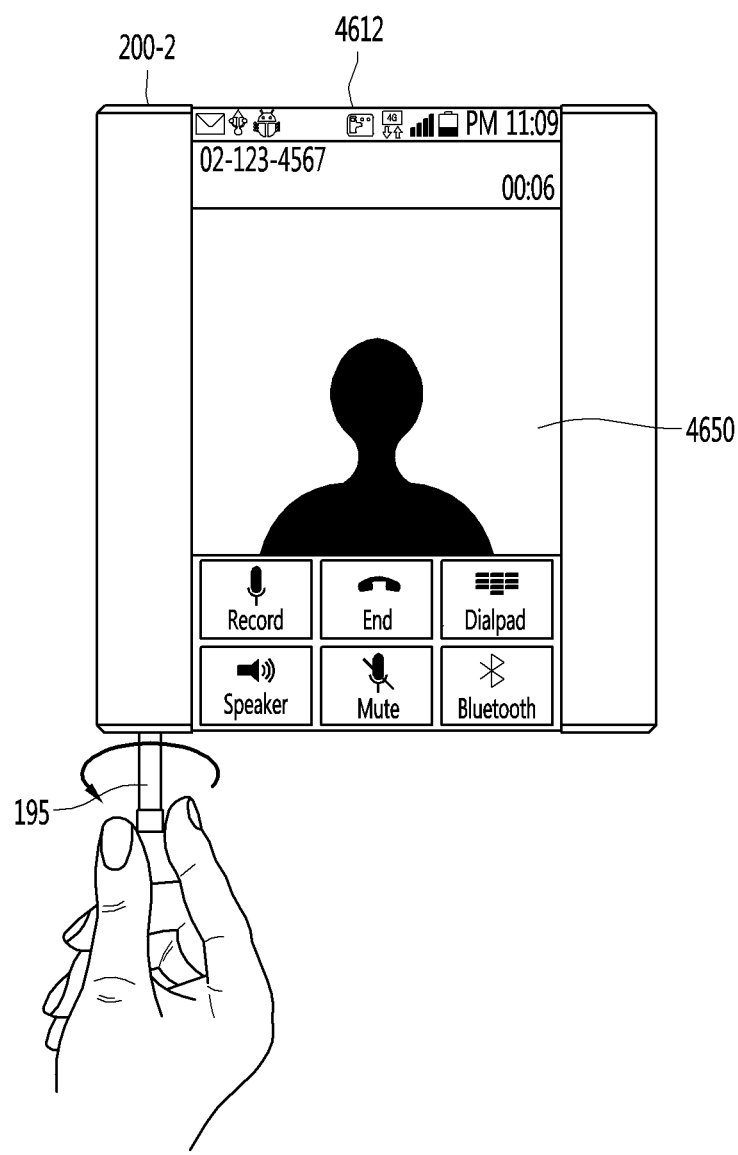

When a portion of the pen 195 is detached and an input for rotating the pen 195 at a specific angle is received in the state that the screen of the rollable display device 200-2 is closed and a telephone call request event occur, the screen of the control unit 180 may be expanded by a specific length "e" as illustrated in FIG. 46B.

Meanwhile, if the screen is expanded by a specific length, the control unit 180 displays at least one of information 4620 on the other party who requesting the telephone call on the expanded screen 4611, a UI 4630 for connecting the telephone call with the other party, and a UI 4640 for rejecting the telephone call of the user.

Meanwhile, when an input for selecting the UI 4630 for connecting a telephone call with the other party is received, the control unit 180 may connect the telephone call with the mobile terminal of the other party. In addition, when an input for selecting the UI 4640 for rejecting the telephone call from the other party is received, the control unit 180 may reject the connection of the telephone call with the mobile terminal of the other part.

Meanwhile, in the state that the screen is expanded by a specific length, the control unit 180 may connects the telephone call with the mobile terminal of the other party or may reject the connection of the telephone call from the mobile terminal of the party, based on the rotation direction of the pen 195.

Specifically, when an input for rotating the pen 195 in the first direction is received in the state that the screen is expanded by a specific length, the control unit 180 may connect a telephone call with the mobile terminal and may control the display unit 151 to additionally expand the screen of the rollable display device 200-2. In this case, the control unit 180 may additionally expand a screen by a length allowing the screen to include the whole execution image 4650 of the telephone call application.

Figure 46D:
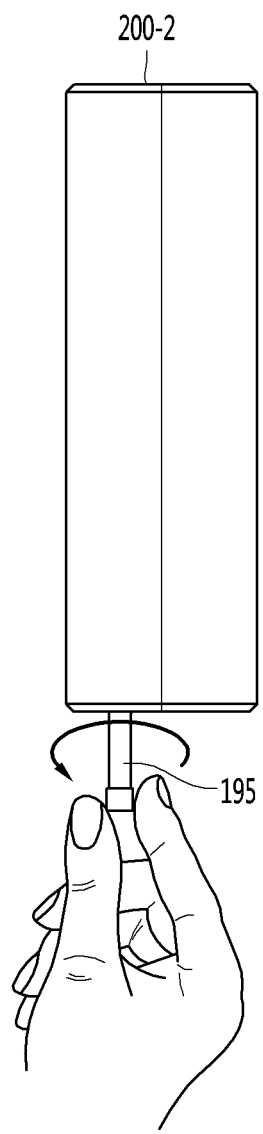

Meanwhile, when an input for rotating the pen 195 in the second direction is received in the state that the screen is expanded by a specific length, the control unit 180 may reject the connection of the telephone call from the mobile terminal of the other party and may close the screen of the rollable display device 200-2, as illustrated in FIG. 46D.

FIGS. 47A to 47E are views illustrating a method of arranging execution images of an application according to an embodiment of the present invention.

Figure 47A:
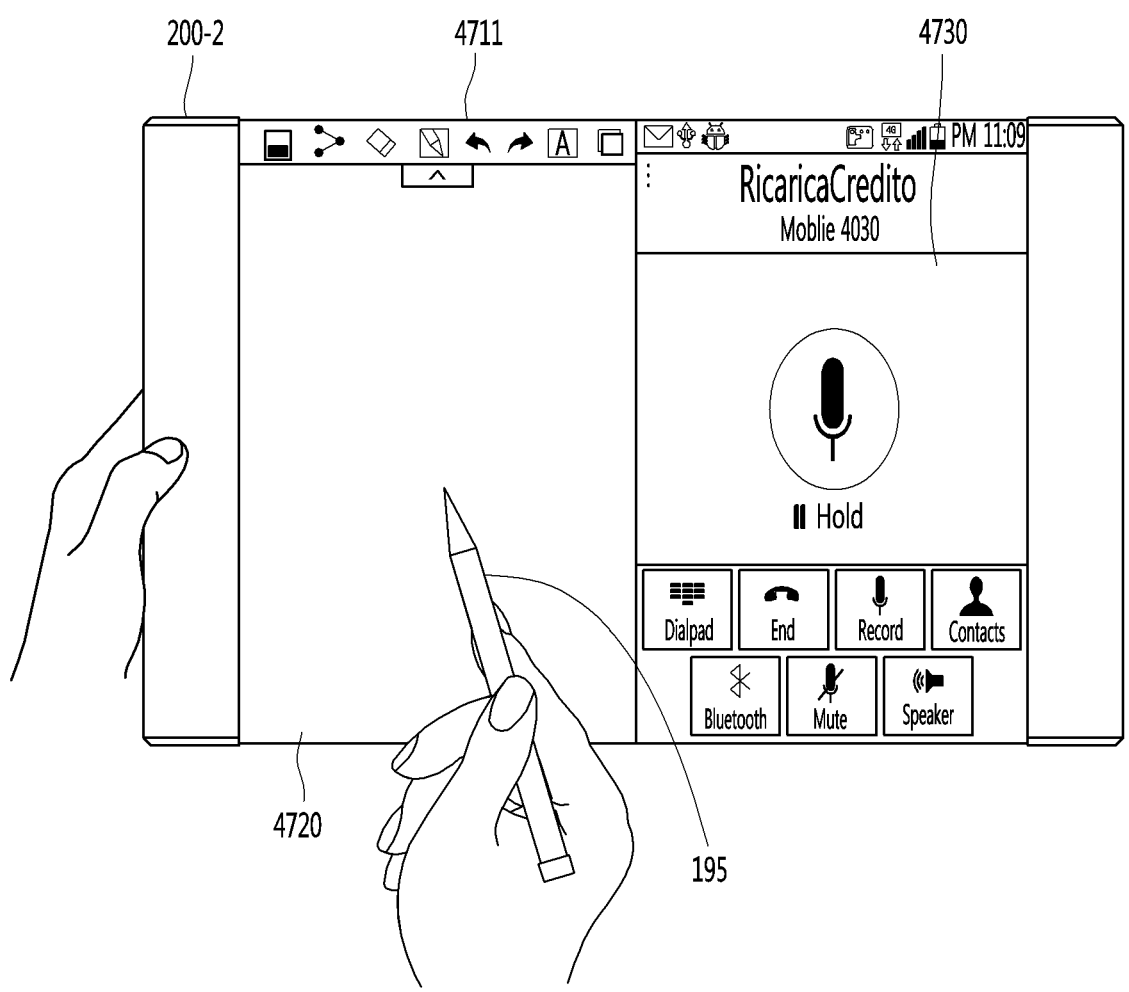
FIGS. 47A to 47E are views illustrating a method of arranging execution images of an application according to an embodiment of the present invention.

As illustrated in FIG. 47A, the control unit 180 may display the execution image 4720 of the first application and the execution image 4730 of the second application.

Meanwhile, the rollable display device 200-2 may include a sensing unit to sense a touch to the screen of the rollable display device 200-2.

When the user touches the side surface of the pen 195 to the screen 4711 of the rollable display device 200-2, the control unit 180 may display an execution image 4720 of a first application and an execution image 4740 of a second application on a first region and a second region divided about a line to which the side surface of the pen 195 is touched, respectively. In this case, the region area may be a region for the screen 4711 formed at one side of the line, to which the side surface of the pen 195 is touched, in the entire area of the screen. The second region may be a region for the screen 4711 formed at an opposite side of the line, to which the side surface of the pen 195 is touched, in the entire area of the screen.

Figure 47B:
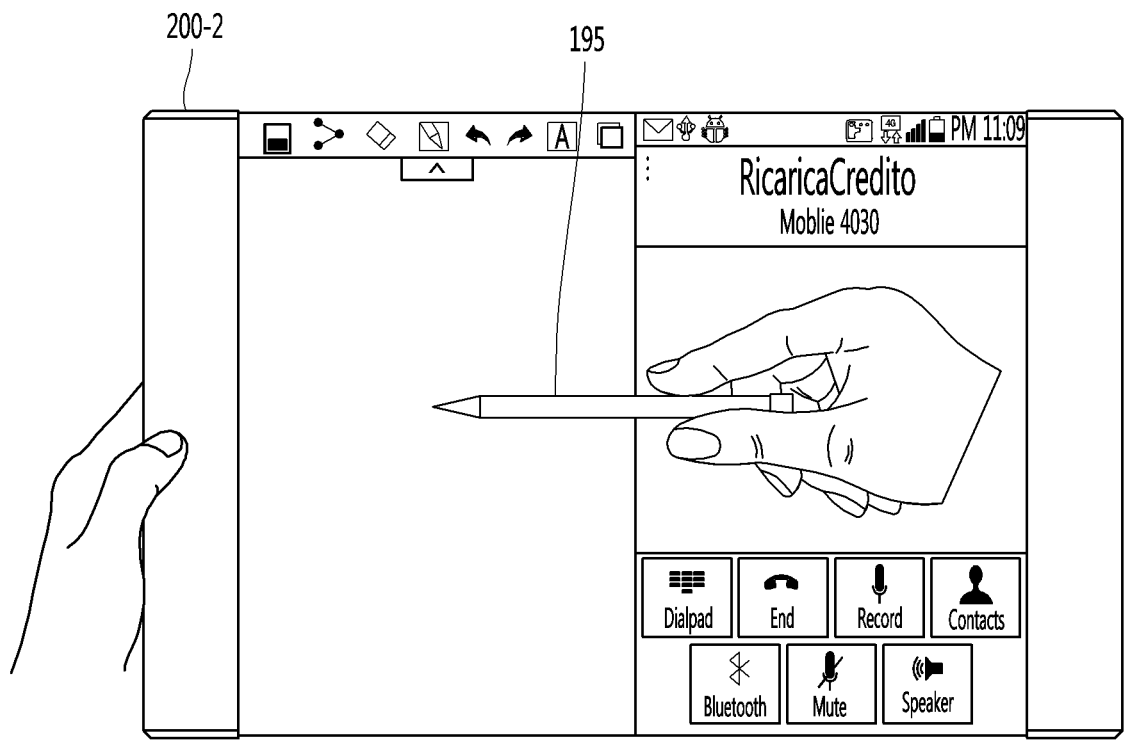
Figure 47C:
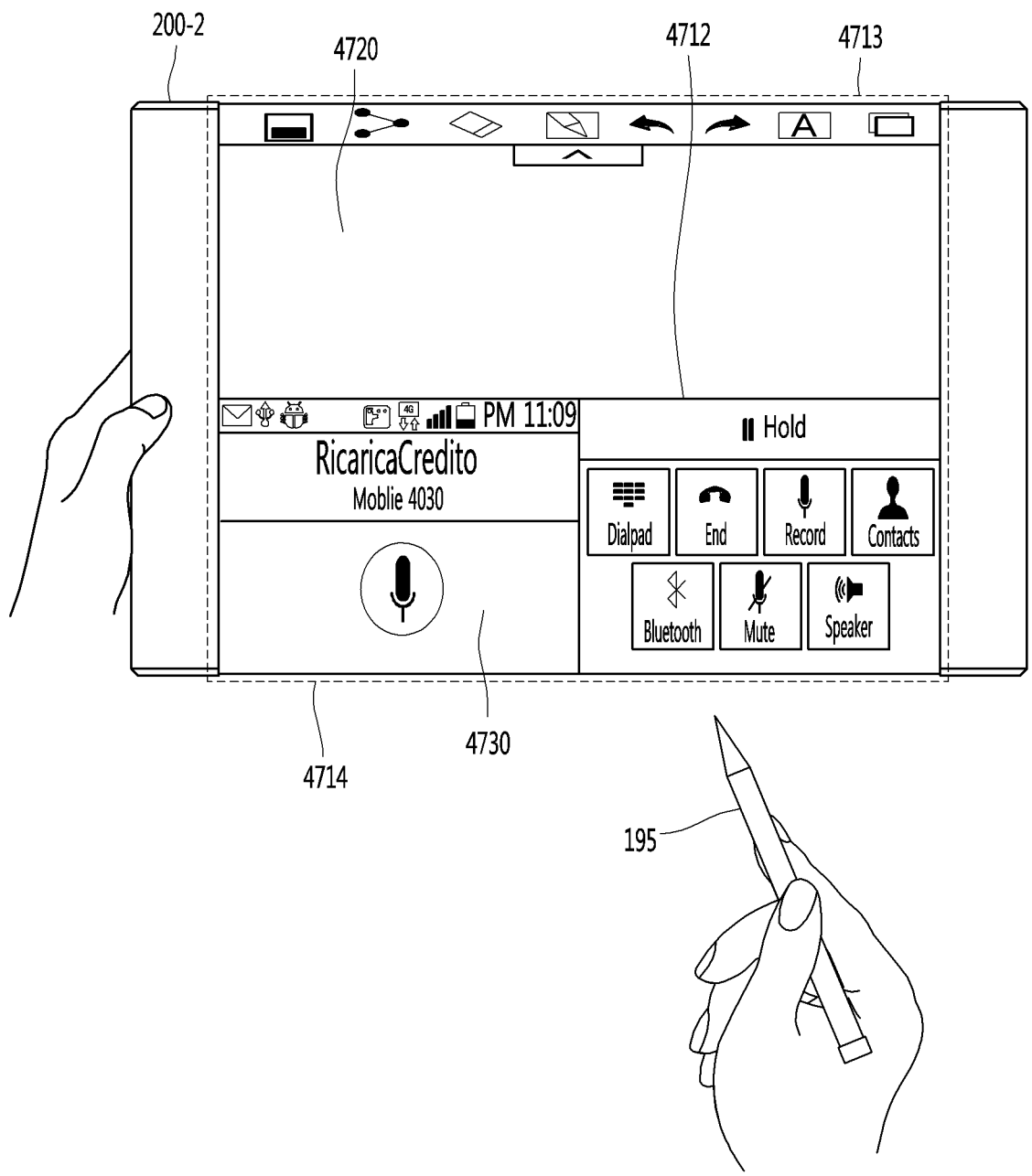

In detail, as illustrated in FIG. 47B, when an input formed by touching the side surface of the pen 195 horizontally to the screen 4711 of the rollable display device 200-2 is received, the control unit 180 may set the line 4712, on which the side surface of the pen 195 is horizontally touched, as a boundary between the first region 4713 and the second region 4714 as illustrated in FIG. 47C.

Meanwhile, the control unit 180 may display the execution image 4720 of the memo application on the first region 4713, that is, an upper region of the line 4712, on which the side surface of the pen 195 is horizontally touched, in the whole region of the screen. In addition, the control unit 180 displays the execution image 4730 of the telephone call application on the second region 4714, that is, the lower region of the line 4712 on which the side surface of the pen 195 is horizontally touched.

Figure 47D:
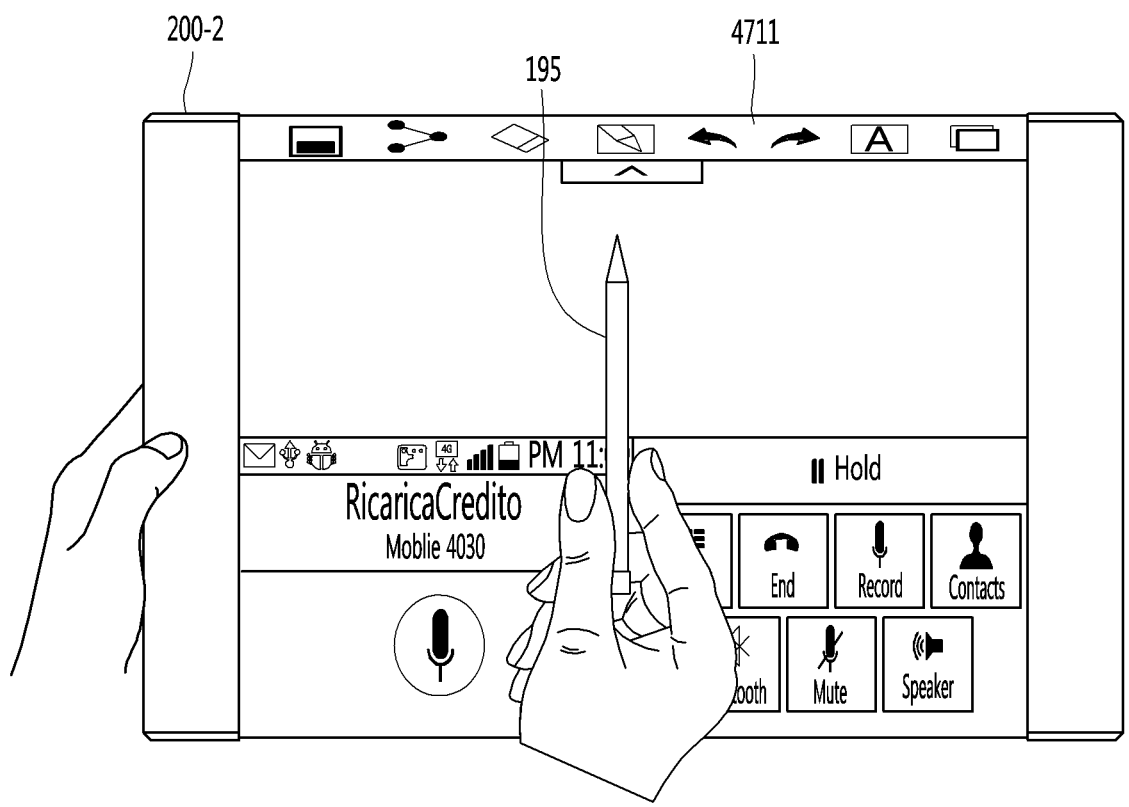
Figure 47E:
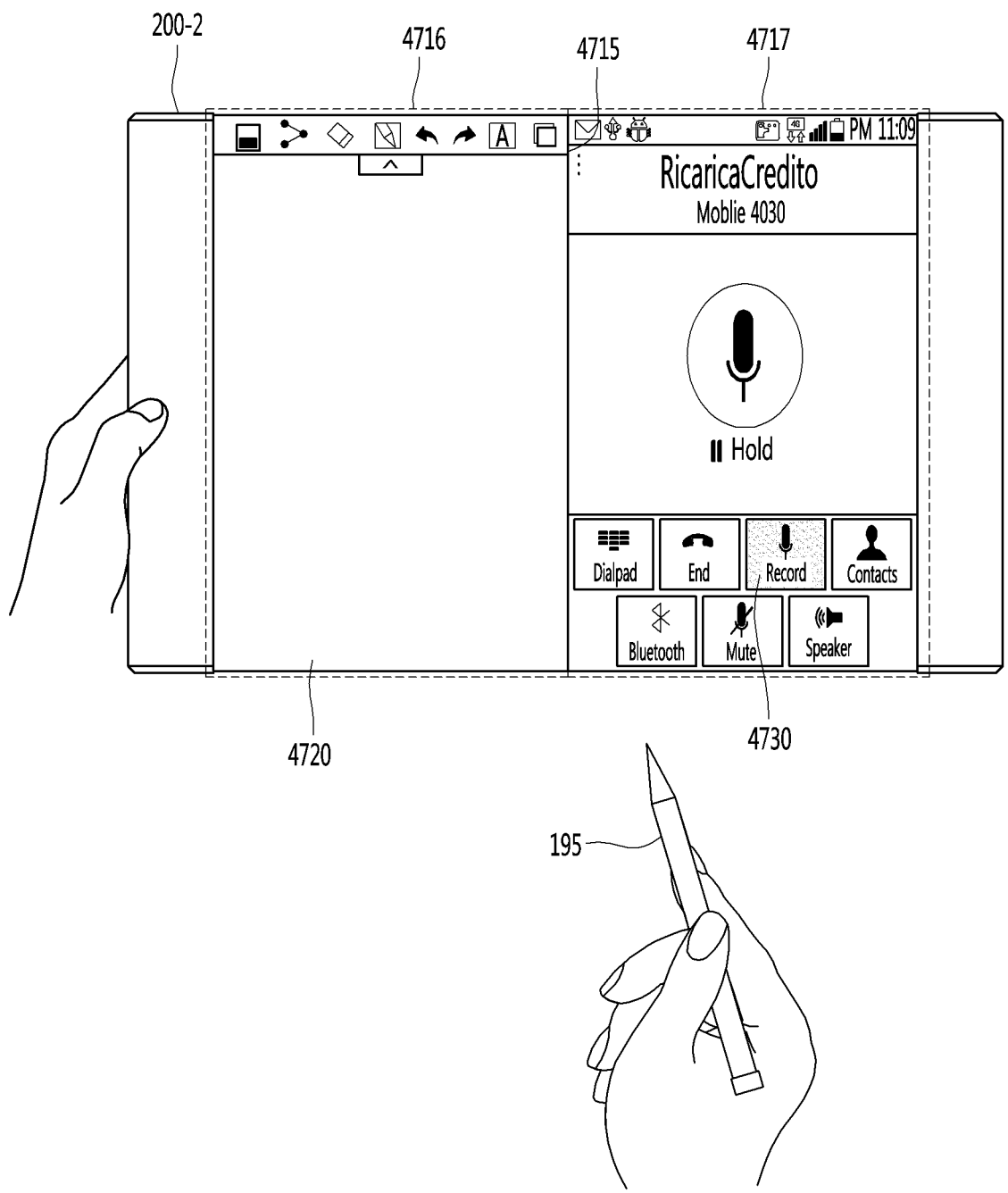

Meanwhile, as illustrated in FIG. 47D, when an input formed by touching the side surface of the pen 195 perpendicularly to the screen 4711 of the rollable display device 200-2 is received, the control unit 180 may be set a line 4715, on which the side surface of the pen 195 is touched vertically, as the boundary between the first region 4716 and the second region 4717 as illustrated in FIG. 47E.

Meanwhile, the control unit 180 may display the execution image 4720 of the memo application on the first area 4716, that is, on the left area of the line 4715, on which the side surface of the pen 195 is vertically touched, in the whole region of the screen. In addition, the control unit 180 may display the execution image 4720 of the telephone call application on the second region 4717, that is, on the right area of the line 4715, on which the side surface of the pen 195 is vertically touched, in the whole region of the screen.

As described above, the present invention may provide an environment for easily setting a region for displaying an execution image of the memo application and an execution image of another application in the process of using the pen to make a note.

Figure 48A:
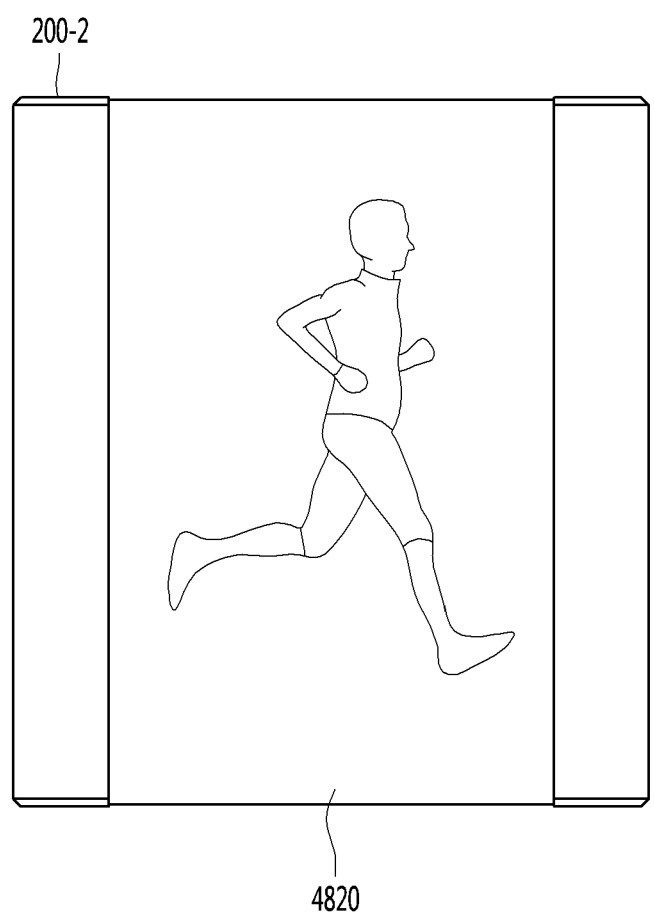
FIGS. 48A to 48C are views illustrating a control method of a moving picture application using a pen according to an embodiment of the present invention.
Figure 48B:
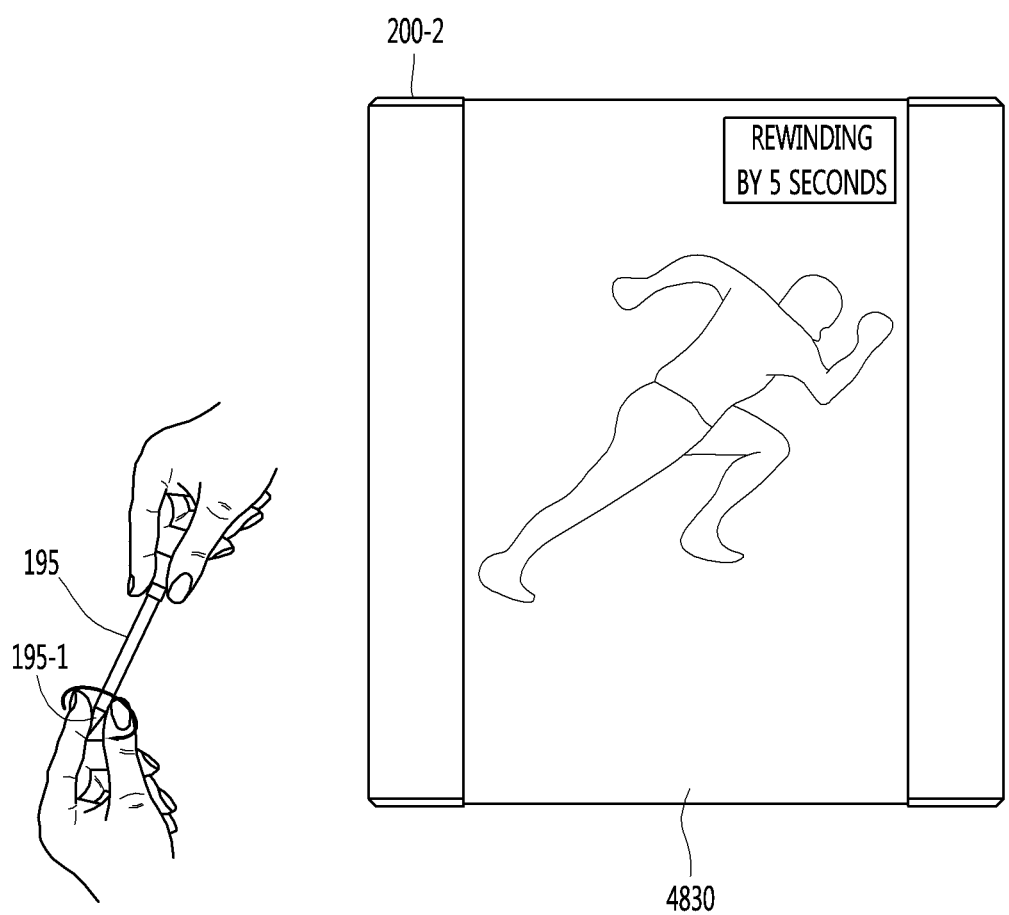

FIGS. 48A to 48B are views illustrating a method of controlling a moving picture application using a pen according to an embodiment of the present invention.

Referring to FIG. 48A, a moving picture application is executed so a moving picture 4820 is being displayed on the rollable display device 200-2.

Meanwhile, referring to FIG. 48B, an upper part 195-1 of the pen 195 may be rotatable.

Meanwhile, based on the rotational direction of the upper part 195-1 of the pen 195, the control unit 180 may control the operation of the application.

For example, when an input for rotating the upper part 195-1 of the pen 195 in the first direction is received, the pen 195 transmits a signal corresponding to the rotation in the first direction to the rollable display device 200-2. The first direction may be clockwise.

Meanwhile, when a signal corresponding to the rotation in the first direction is received, the control unit 180 may perform an operation of rewinding the moving picture to be reproduced, and may display the moving picture 4830 at a time point at which the moving picture is rewound as illustrated in FIG. 48B.

Meanwhile, when an input for rotating the upper part 195-1 of the pen 195 in the second direction is received, the pen 195 outputs a signal, which corresponds to the rotation in the second direction, to the rollable display device 200-2. In this case, the second direction may be counterclockwise.

Figure 48C:
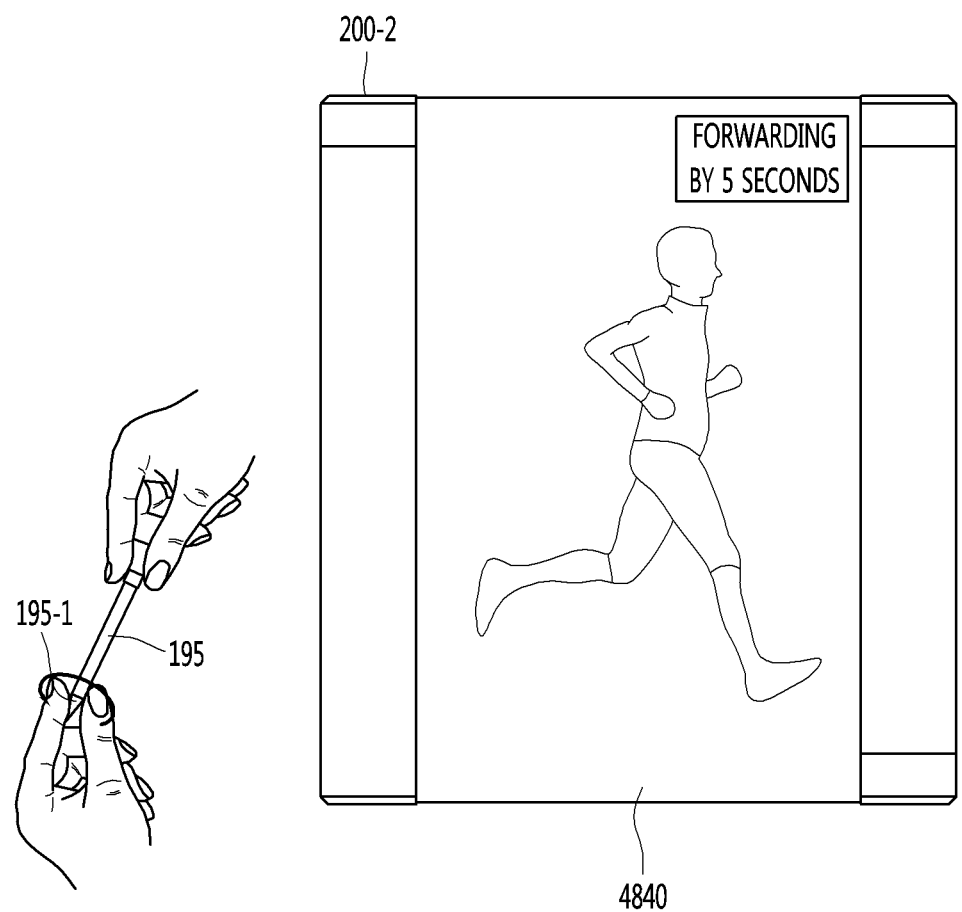

Meanwhile, when a signal corresponding to the rotation in the second direction is received, the control unit 180 may perform an operation of forward the moving picture to be reproduced and may display the moving picture 4840 at the time point in which the moving picture is forwarded as illustrated in FIG. 48C.

Meanwhile, although the present embodiment has been described in that the moving picture is rewound or forwarded as the pen 195 is rotated, the present invention is not limited thereto. For example, the control unit 180 may perform a volume up and down operation, an operation of viewing a previous moving picture or an operation of viewing a next moving picture.

Figure 49A:
FIGS. 49A to 49C are views illustrating a method of controlling a music application using a pen according to an embodiment of the present invention.
Figure 49B:
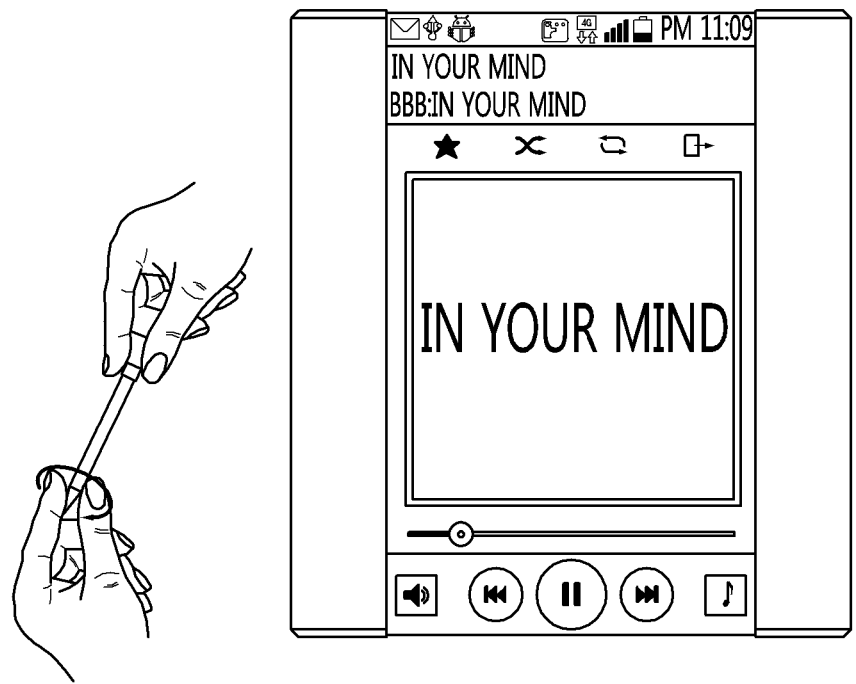

FIGS. 49A to 49B are views illustrating a method of controlling a music application using a pen according to an embodiment of the present invention.

Referring to FIG. 49A, the music application is executed and music is being reproduced in the rollable display device 200-2.

Meanwhile, when an input for rotating the upper part 195-1 of the pen 195 in the first direction is received, the pen 195 may transmit a signal corresponding to the rotation in the first direction to the rollable display device 200-2. When a signal corresponding to the rotation in the first direction is received, the control unit 180 may perform an operation of reproducing the next piece of music currently being reproduced as illustrated in FIG. 49B.

Figure 49C:

Meanwhile, when an input for rotating the upper part 195-1 of the pen 195 in the second direction is received, the pen 195 outputs a signal corresponding to the rotation in the second direction to the rollable display device 200-2. In addition, when a signal corresponding to the rotation in the second direction is received, the control unit 180 may perform an operation of reproducing the previous music of the currently reproduced music, as illustrated in FIG. 49C.

Meanwhile, although the present embodiment has been described in that the previous piece or the next piece of the music, which is currently reproduced, is reproduced as the pen 195 is rotated, the present invention is not limited thereto. For example, as the pen 195 rotates, the control unit 180 may perform the volume up/down operation, a fast forwarding operation, a rewinding operation, and the like.

Figure 50:
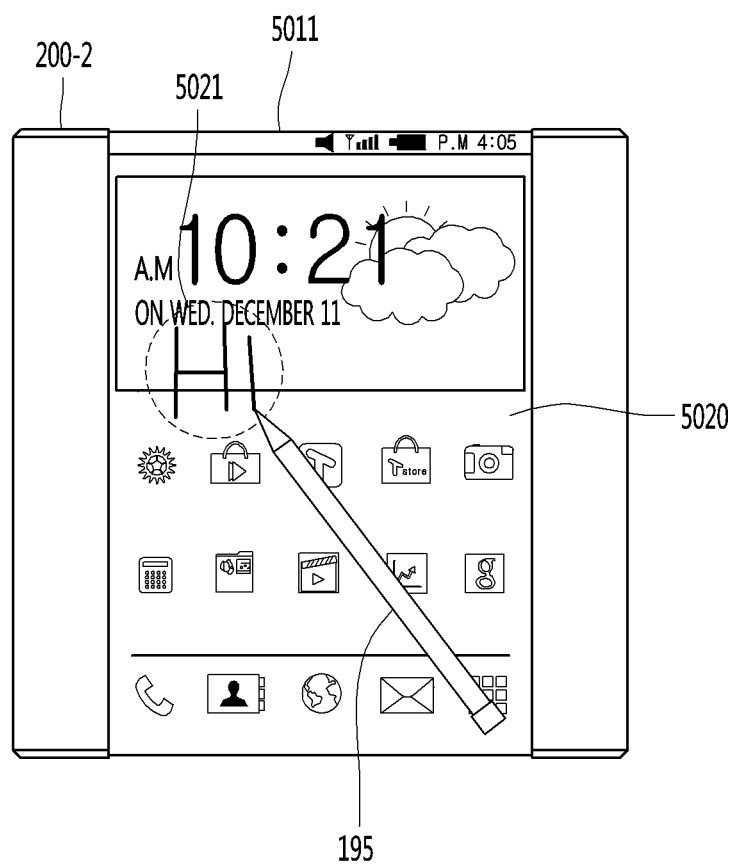
FIGS. 50 to 51 are views illustrating a method of operating a rollable display device according to another embodiment of the present invention.
Figure 51:
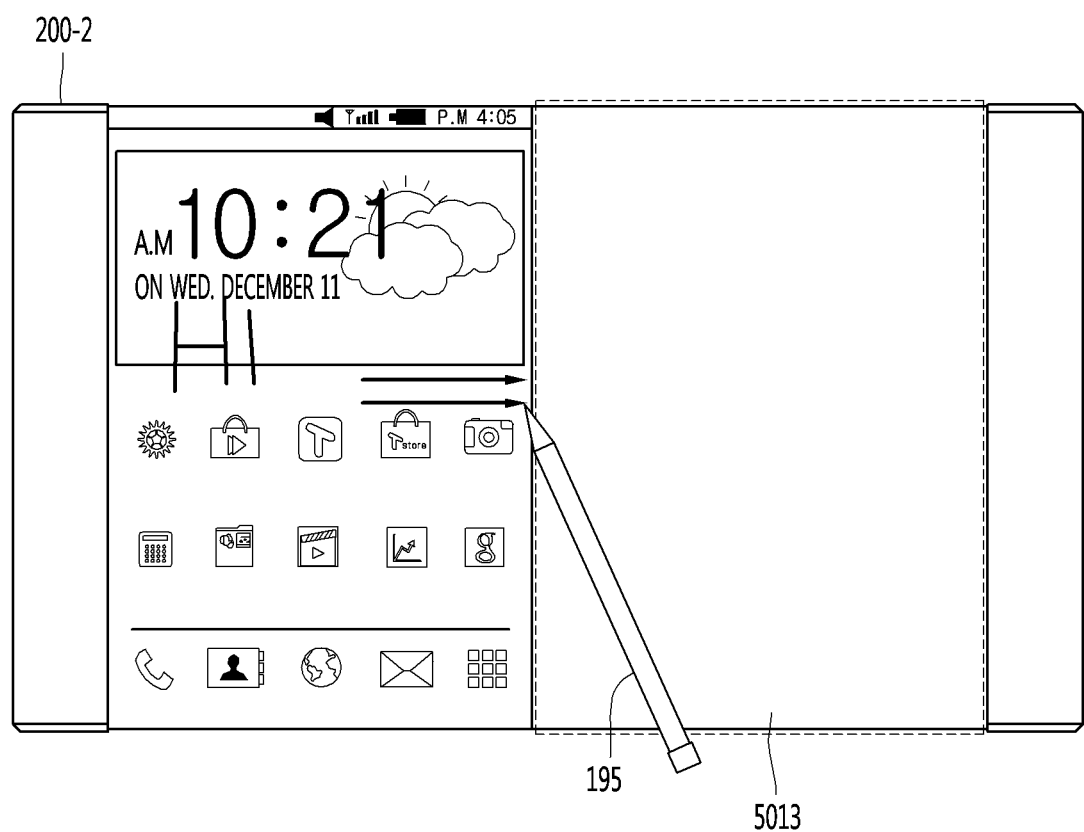

FIGS. 50 to 51 are views illustrating a method of operating a rollable display device according to another embodiment of the present invention.

Referring to FIG. 50, the control unit 180 may receive an input that makes a memo on a specific image. In detail, when an input formed by touching the pen 195 to a specific image 5020 and moving the pen 195, the control unit 180 may display a UI 5021 corresponding to the trajectory of the pen 195.

Meanwhile, as illustrated in FIG. 51, the control unit 180 may receive an input of pushing the pen 195 to the right after touching the screen 5011 by tilting the pen 195 twice or more.

Meanwhile, when the input tilting the pen 195 and touching the screen 5011 and then pushing the pen 195 to the right is received twice, the control unit 180 may expand the screen of the rollable display device 200-2.

The control unit 180 may additionally expand the screen of the rollable display device 200-2 when the pen 195 is tilted to contact the screen 5011 and then an input for pushing the pen 195 to the right is additionally received.

Meanwhile, an execution image of the memo application may be displayed on a new area 5013 created by enlarging the screen. However, the present invention is not limited thereto, and the control unit 180 may display an execution image of a specific application on the new area 5013 created by enlarging the screen. For another example, the control unit 180 may display an enlarged image of the specific image 5020 on the entire area of the expanded screen.

FIGS. 52A to 53C are views illustrating a method of determining an region for displaying an execution image of an application, based on a direction of pulling a pen according to an embodiment of the present invention.

The control unit 180 may determine the region for displaying the execution image of the memo application based on the information on the detachment of the pen 195 and the direction of rotating the pen 195.

Figure 52A:
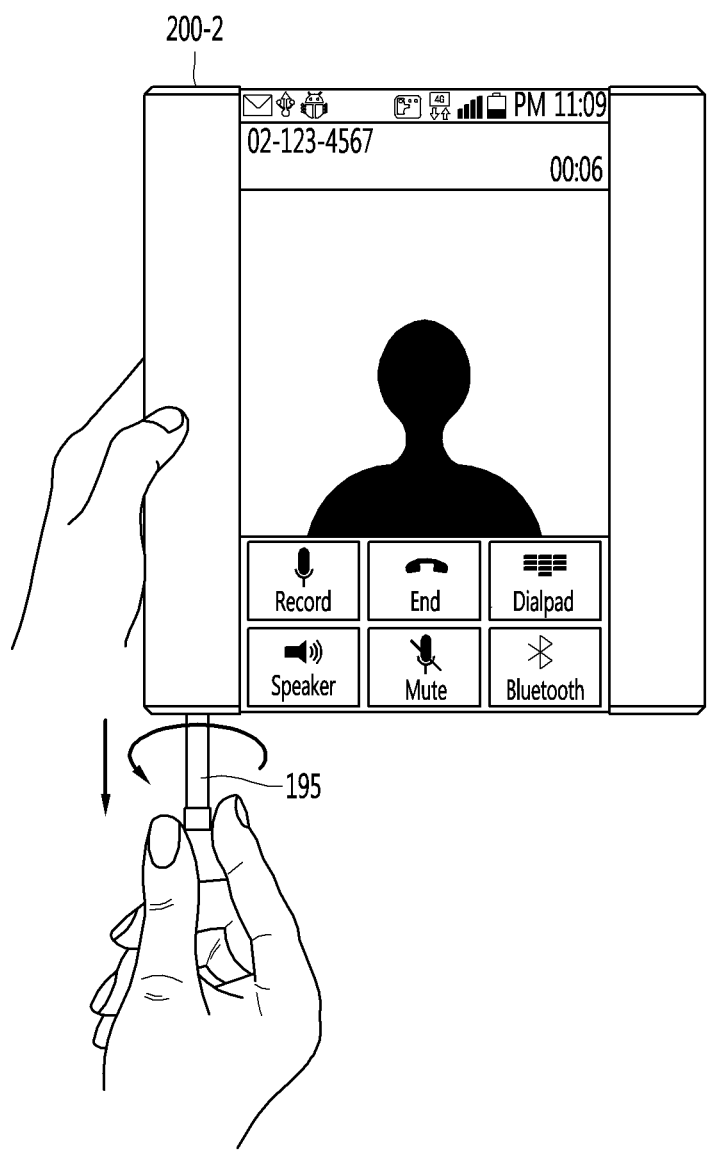
FIGS. 52A to 53C are views illustrating a method for determining a region for displaying an execution image of an application based on a direction of drawing a pen according to an embodiment of the present invention.
Figure 52C:
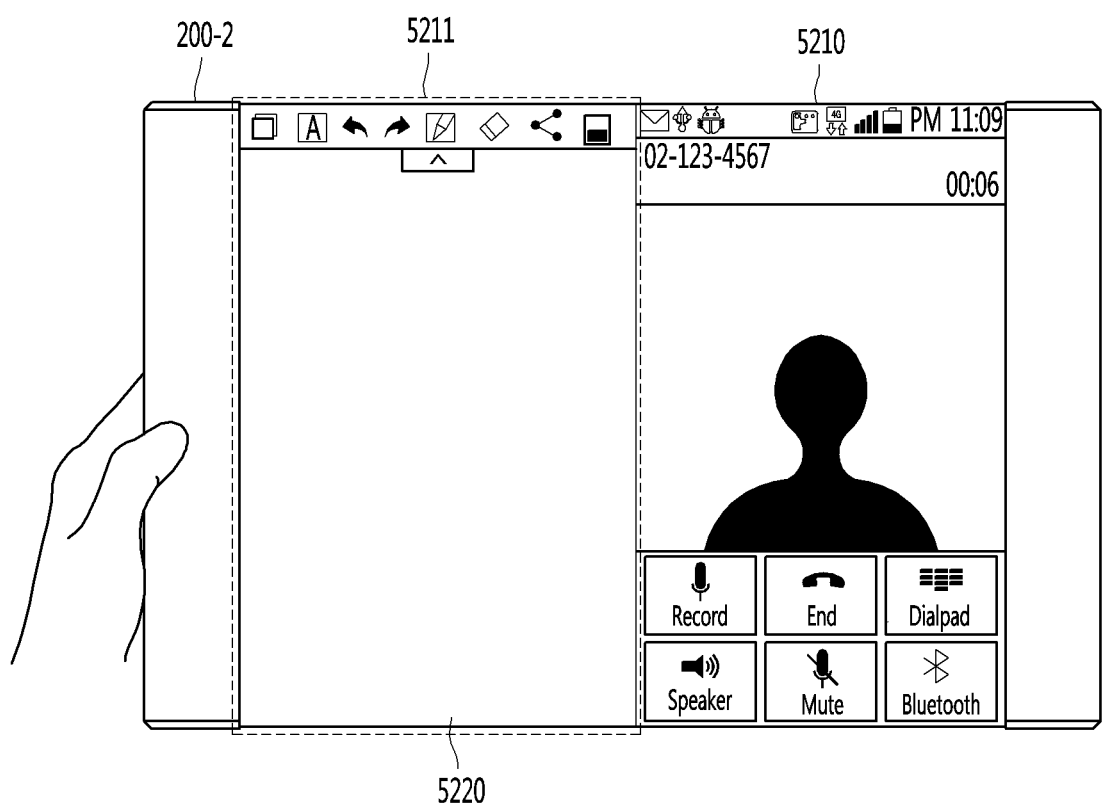

Specifically, as illustrated in FIGS. 52A and 52B, when the detachment and the rotation of the pen 195 in the second direction are detected (that is, when the pen 195 is detached and rotated counterclockwise). The control unit 180 may expand the screen of the rollable display device 200-2 and may display the execution image 5220 of the memo application on the left region 5211 of the expanded screen 5210.

Figure 53A:
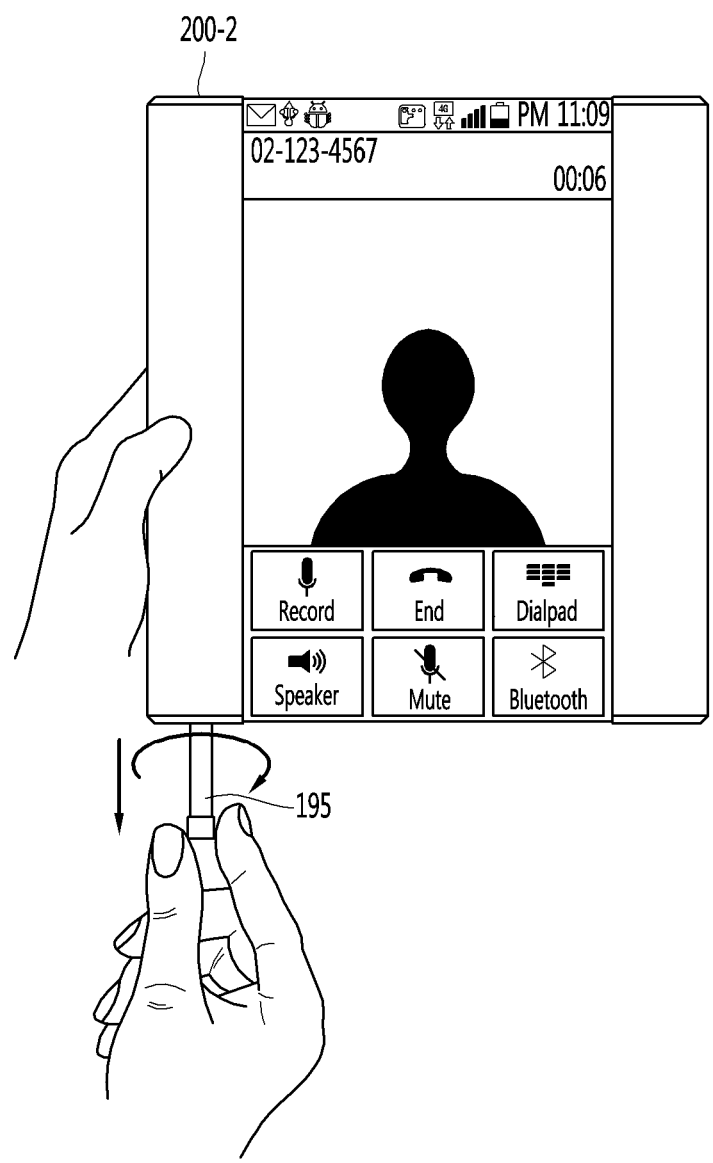
Figure 53C:
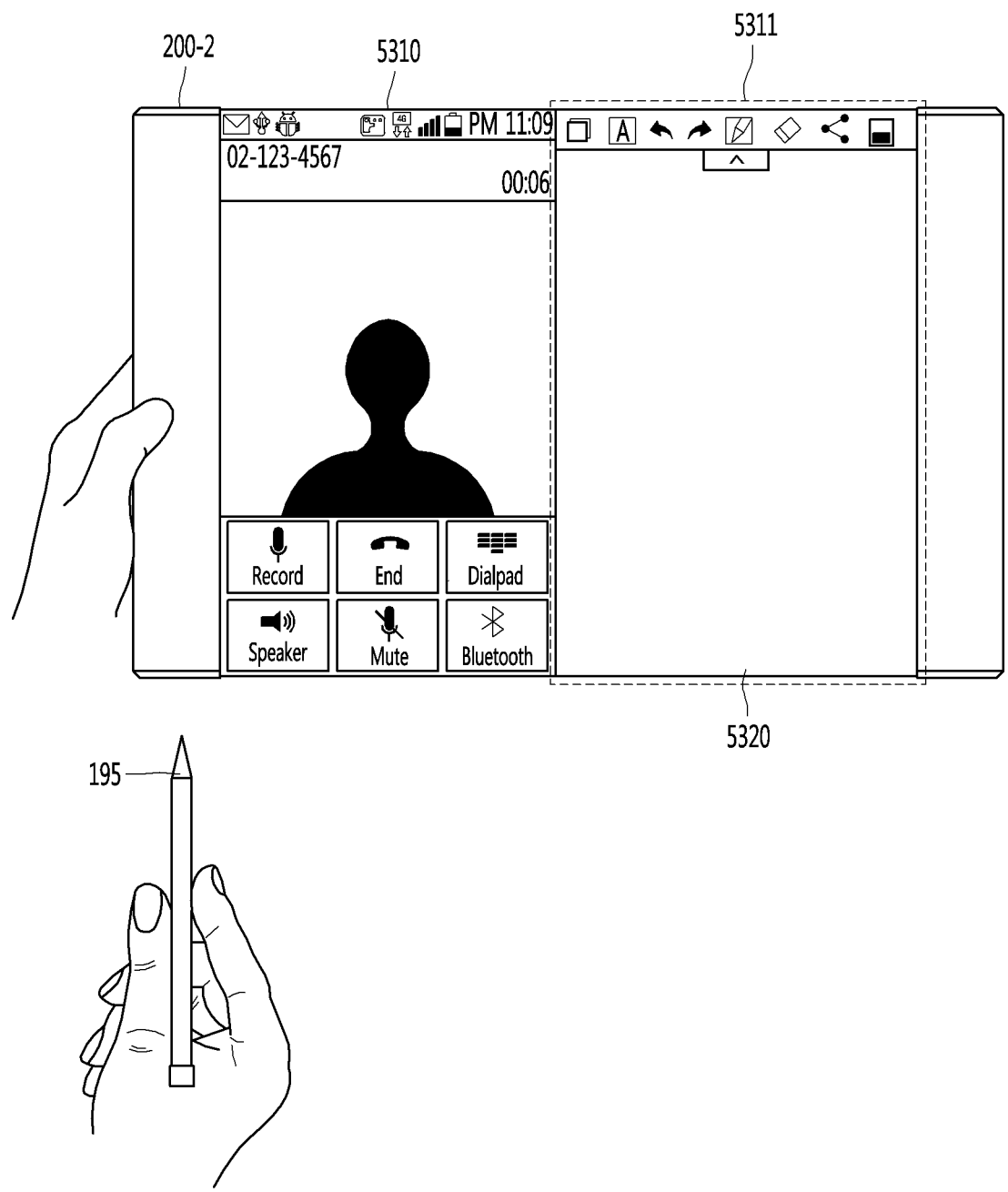

As another example, when rotation and detachment of the pen 195 in the first direction are detected (that is, when the pen 195 is detached and rotated clockwise) as illustrated in FIGS. 53A and 53B, the control unit 180 may expand the screen of the rollable display device 200-2 and may display the execution image 5320 of the memo application on the right region 5311 of the expanded screen 5310 as illustrated in FIG. 53C.

As described above, according to the present invention, if a user performs only the operation of rotating the pen while pulling out the pen, in the process of pulling out the pen to execute the memo application, the user may determine the position on the screen on which the memo is to be made and thus the user operability may be improved.

FIGS. 54A to 54D are views illustrating an operating method when a memo application is executed while another application is being executed according to another embodiment of the present invention.

As illustrated in 54A, an Internet application is being executed in the rollable display device 200-2, and the execution image 5420 of the Internet application is being displayed on the screen 5411 of the rollable display device 200-2.

Figure 54A:
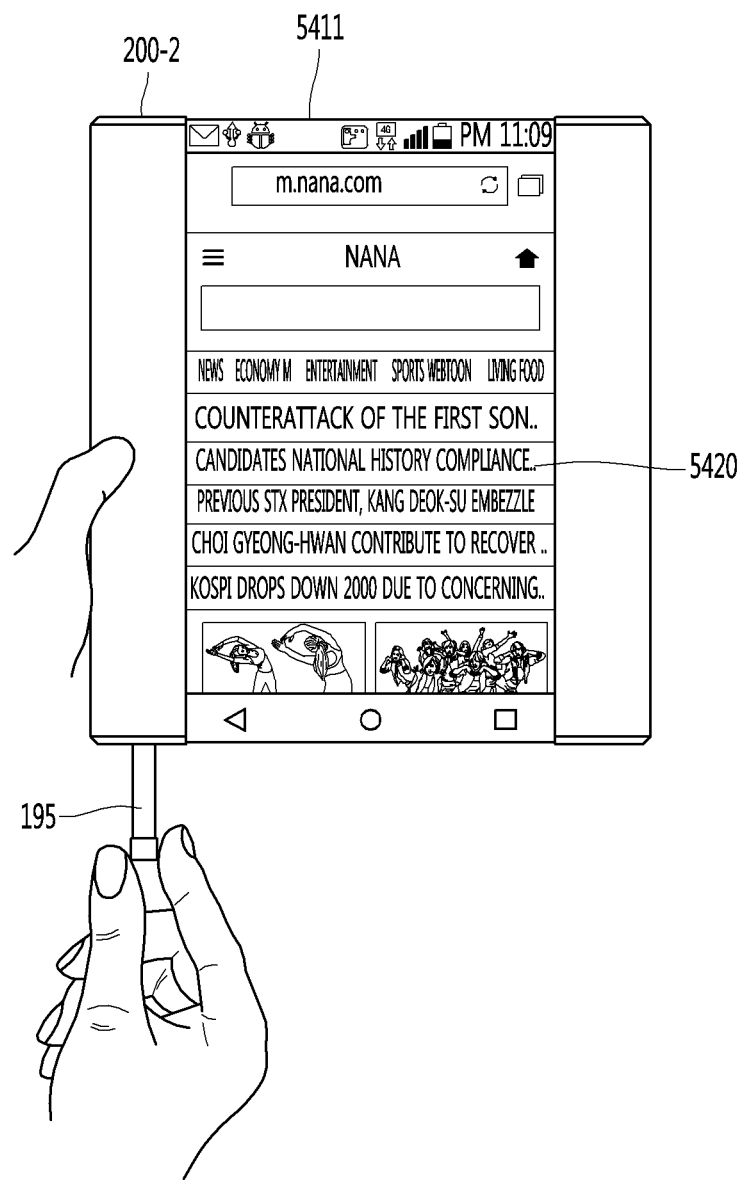
FIGS. 54A to 54D are views illustrating an operating method when a memo application is executed while another application is being executed according to another embodiment of the present invention.
Figure 54B:
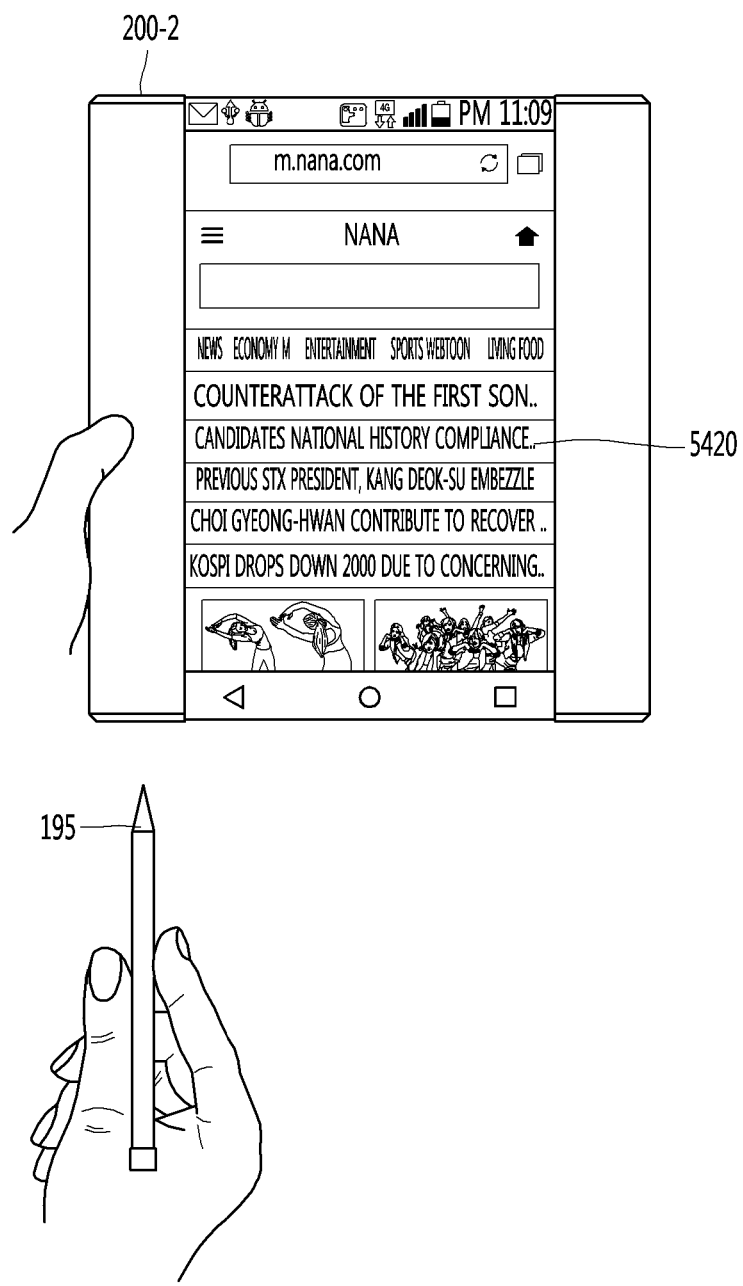
Figure 54C:
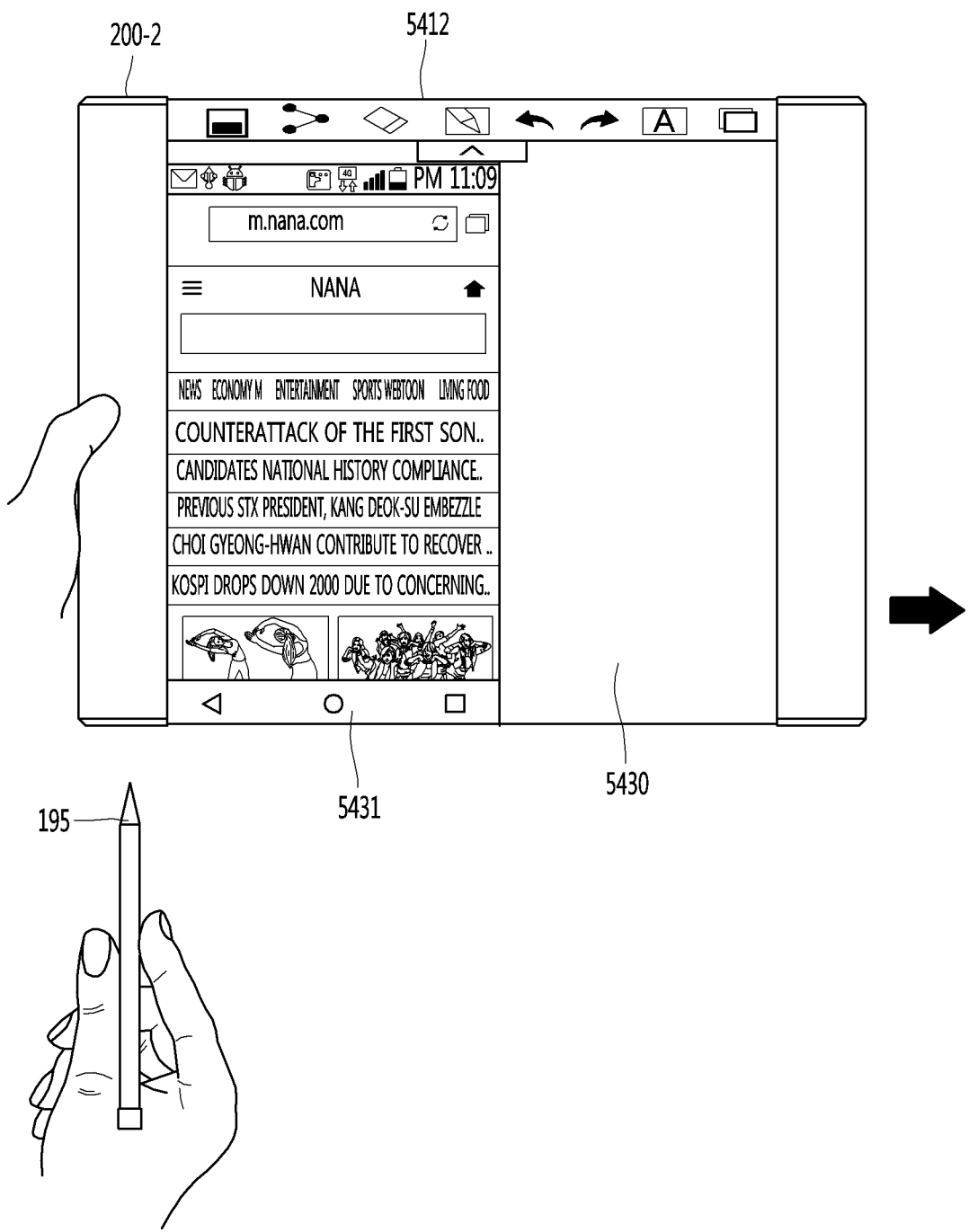

Meanwhile, as illustrated in FIGS. 54A and 54B, when an input formed by detaching the pen 195 is received, the control unit 180 may enlarges the screen of the rollable display device 200-2, executes the memo application, and display the execution image 5430 of the memo application on the expanded screen 5412 as illustrated in FIG. 54C. In this case, the execution image 5430 of the memo application may be displayed on the entire region of the expanded screen 5412. Meanwhile, the execution image 5430 of the memo application may include an execution image 5420 of the Internet application being executed in the rollable display device 200-2 before the pen 195 is detached.

Meanwhile, the execution image 5431 of the Internet application included in the execution image 5430 of the memo application is an image obtained by the execution image 5420 of the Internet application which is being executed on the rollable display device 200-2 before the pen 195 is detached.

Meanwhile, the execution image 5431 of the Internet application may be changed in position on the execution image 5430 of the memo application and displayed. Specifically, when an input for changing the position of the execution image 5431 of the Internet application is received, the control unit 180 may change the position of the execution image 5431 of the Internet application and display the execution image.

As described above, the present invention provides an environment of displaying the execution image of the memo application on the entire region of the screen, and of displaying the execution image of the application which is being executed on one region of the screen, thereby allowing the user to make a memo using the whole screen and to recognize the execution image of the application which is being previously executed.

The present invention also provides an environment in which a user may change a position of an execution image of an application and make a note, when the user wants to make the memo of a position where the execution image of the application is displayed.

Meanwhile, the above description has been described in that the execution image 5431 of the Internet application included in the execution image 5430 of the memo application is an image obtained by reducing the execution image 5431 of the Internet application executed in the rollable display device 200-2 before the pen 195 is detached.

Figure 54D:
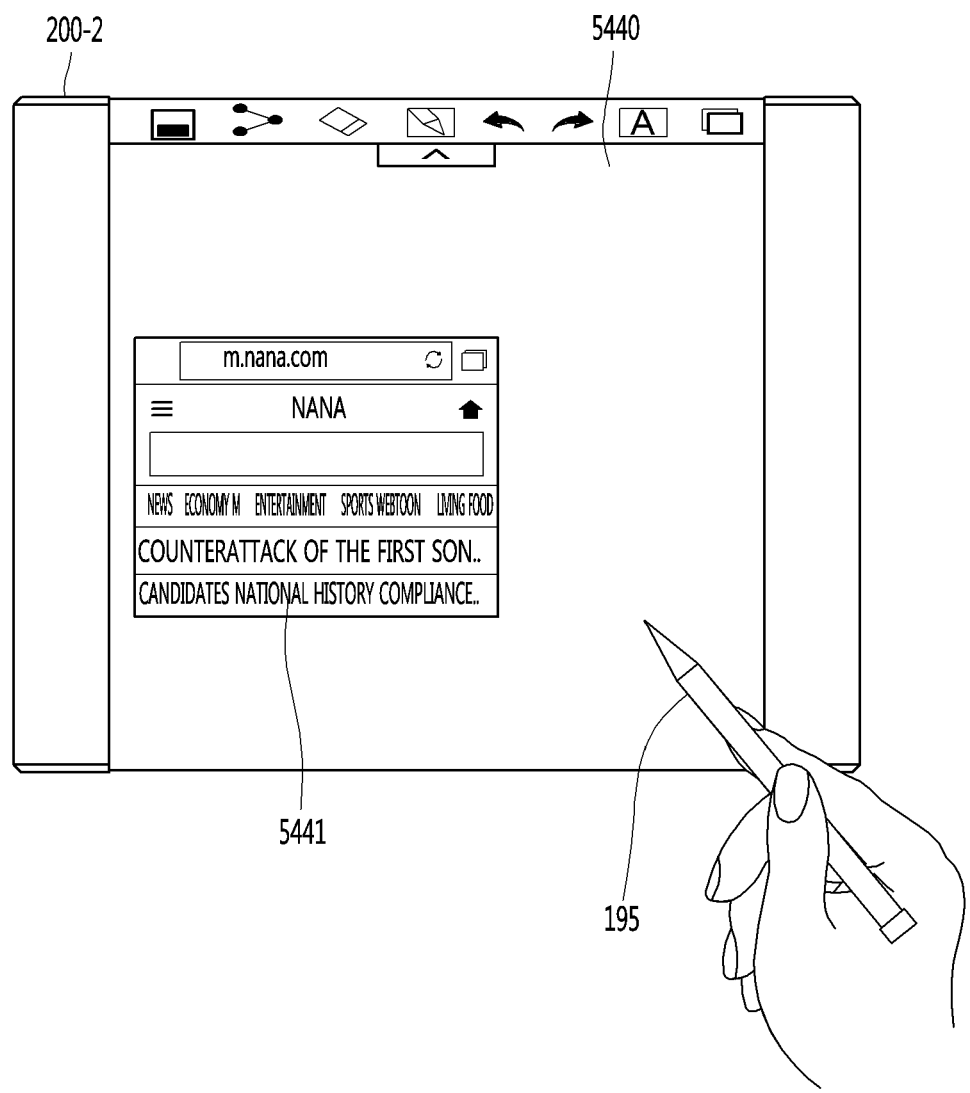

However, the present invention is not limited thereto. For example, as illustrated in FIG. 54D, the execution image of the Internet application included in the execution image 5440 of the memo application may be the execution image 5441 of the Internet application in the form of a widget.

Figure 55A:
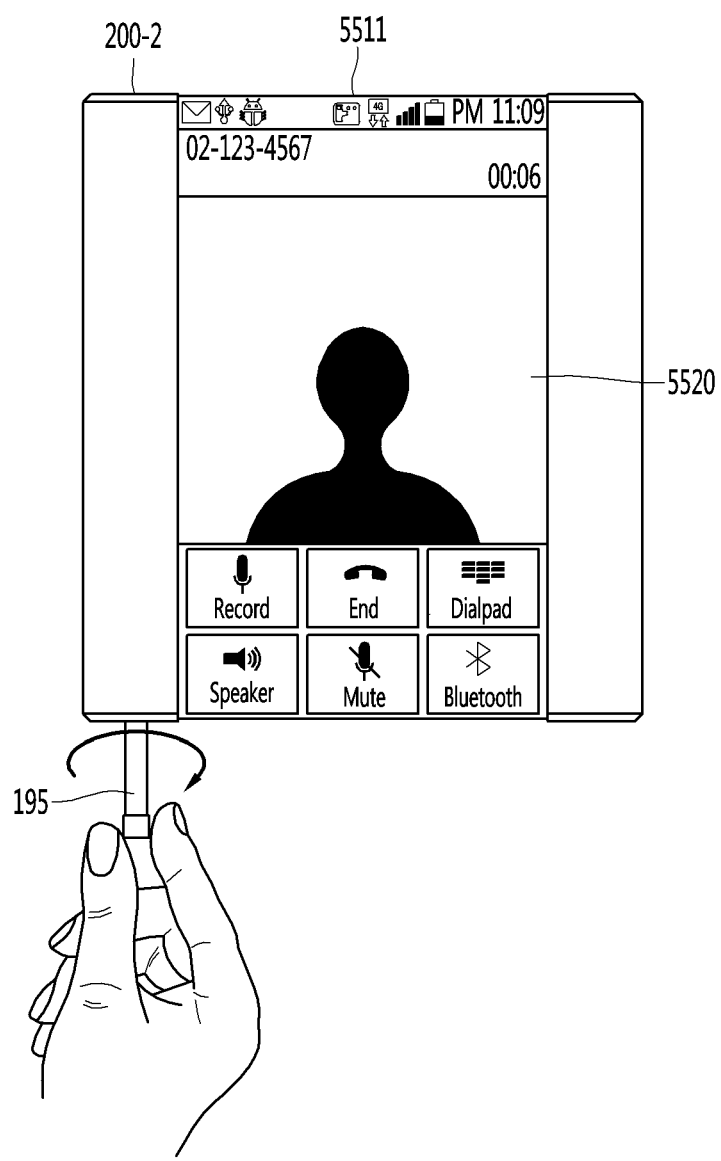
FIGS. 55A to 55C are views illustrating a method for determining a previously written memo during the execution of another application according to an embodiment of the present invention.
Figure 55B:
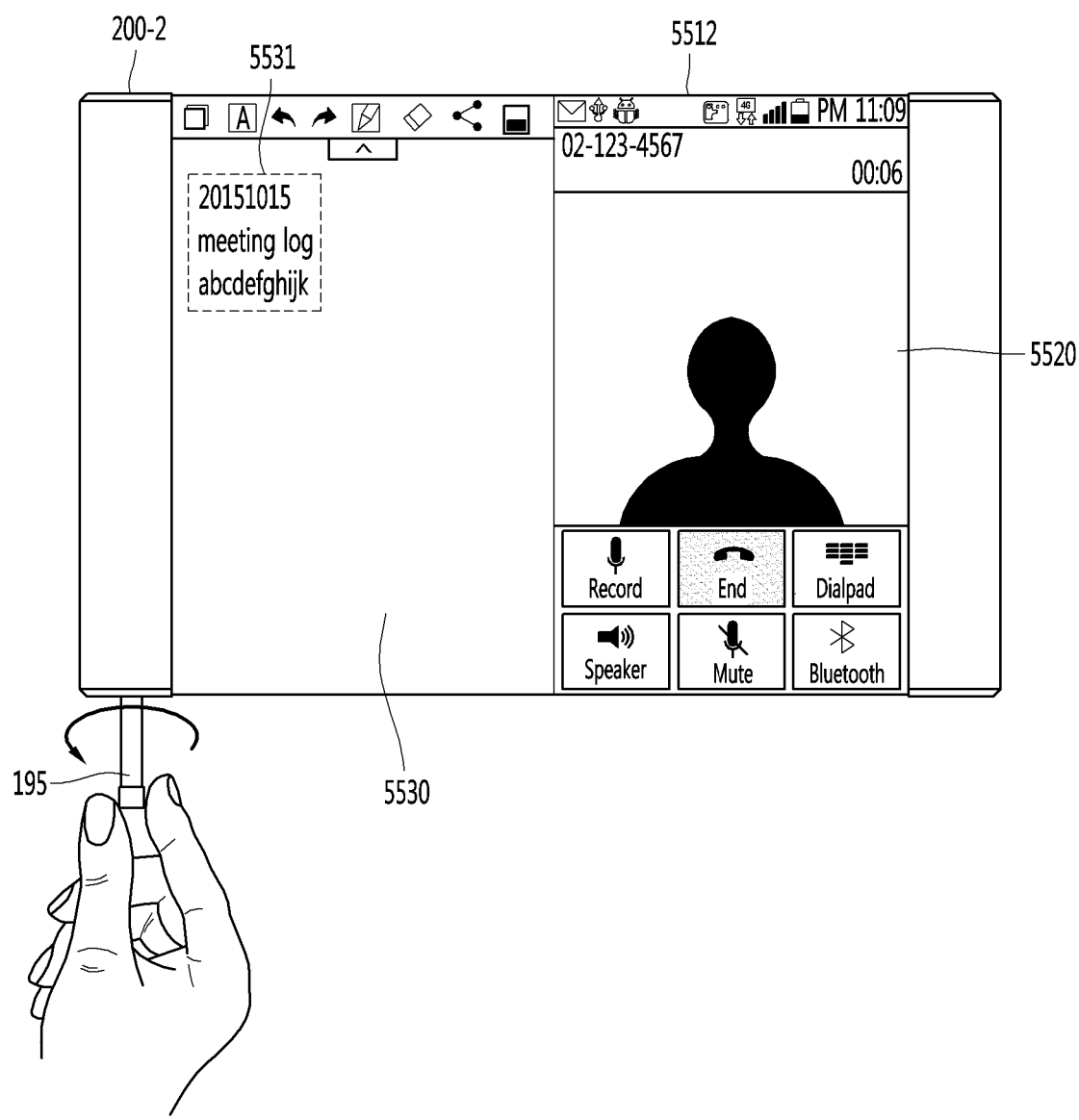
Figure 55C:
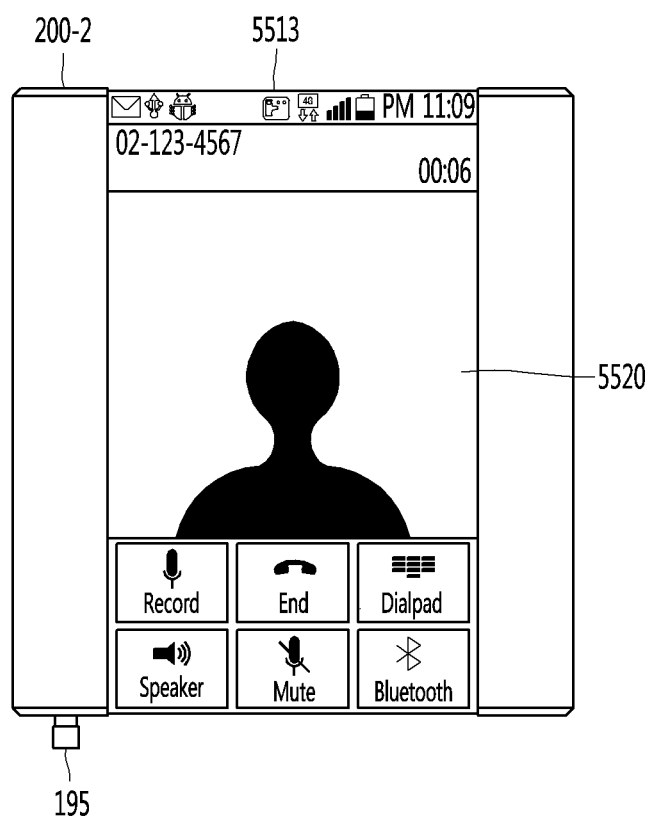

FIGS. 55A to 55C are views illustrating a method of confirming a previously created memo during the execution of another application according to an embodiment of the present invention.

In FIG. 55A, an execution video 5520 of the telephone call application is displayed on A screen 5511 of the rollable display device 200-2.

Meanwhile, when the pen 195 is rotated in the first direction (for example, clockwise) while being detached, the control unit 18 may expand the screen the rollable display device 200-2, and may display the execution image 5530 of the memo application and the execution image 5520 of the telephone call application on the expanded screen 5512.

Meanwhile, the execution image 5530 of the memo application may include a memo 5531 previously created by the user. A memo 5531 included in the execution image 5530 of the memo application may be a memo created when the memo application is most recently executed.

However, the present invention is not limited thereto. For example, the memo 5531 included in the execution image 5530 of the memo application may be a memo made while the user is in the process of communicating with the other party of the current telephone call in the past.

Meanwhile, as illustrated in FIG. 55C, when the pen 195 is detached while being rotated in the second direction (counterclockwise, for example), the control unit 180 reduces the screen of the rollable display device 200-2 and may display an execution image 5520 of a telephone call application on the reduced screen 5513.

Meanwhile, all embodiments of the rollable display device 200-2 described in FIGS. 9A to 55C may be applied to the mobile terminal 100 within the extent that the embodiments are applicable.

Figure 56:
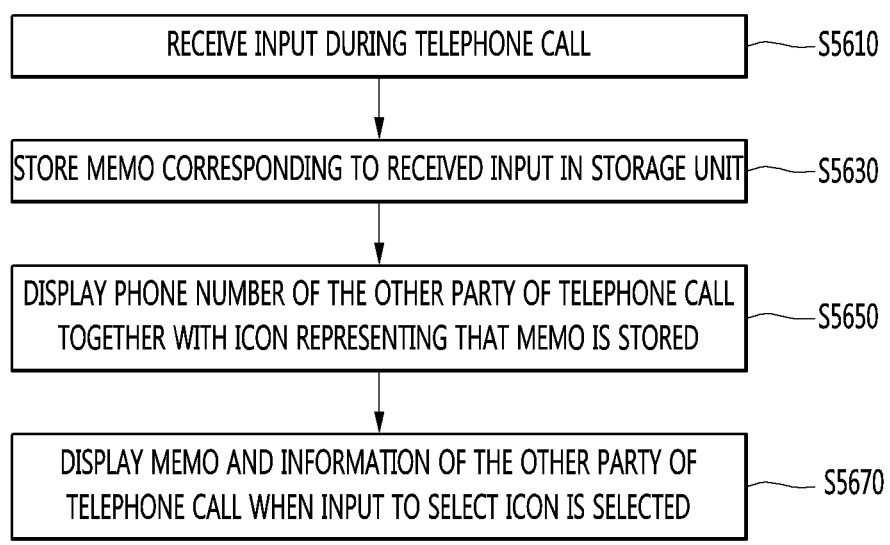
FIG. 56 is a view illustrating a method of operating a mobile terminal according to another embodiment of the present invention.

FIG. 56 is a view illustrating a method of operating of a mobile terminal according to another embodiment of the present invention.

Meanwhile, although the above description has been made in that the embodiments in FIGS. 56 to 61 are implemented in the mobile terminal 100, the present invention is not limited thereto. The embodiments in FIGS. 56 to 61 may be implemented on the rollable display device 200-2.

A method of operating a mobile terminal according to an exemplary embodiment of the present invention includes: receiving an input from a user during a telephone call with a mobile terminal of a specific person (S5610), storing a memo corresponding to the input received from the user in a storage unit (S5630), displaying a phone number list including an icon indicating that the memo is stored during the telephone call of the mobile terminal of the specific person (S5650), and displaying a memo and information associated with the specific person when an input for selecting the icon (S5670).

Step S5610 of receiving the input from the user during the telephone call with the mobile terminal of the specific person and step S5630 of storing a memo corresponding to the input received from the user in a storage unit will be made with reference to FIG. 57.

Figure 57:
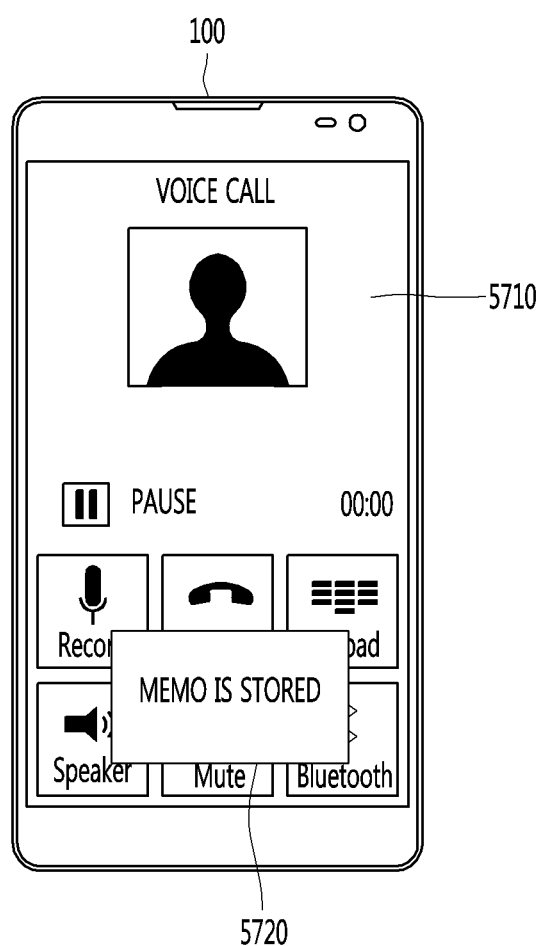
FIG. 57 is a view illustrating a method of storing a memo corresponding to an input received from a user.

FIG. 57 is a view illustrating a method of storing a memo corresponding to the input received from the user.

The foregoing description has been made regarding various methods of receiving the input from the user during the telephone call with the mobile terminal of the specific person and displaying a memo corresponding to the received input have been described, and the details thereof will be omitted.

Meanwhile, when an input for storing the memo corresponding to the input received from the user is received, or when the telephone call with the mobile terminal of the specific person is terminated, the control unit 180 may store a memo as illustrated in FIG. 57.

Meanwhile, the control unit 180 may store the memo by matching the memo with the information of the specific person. For example, when a memo "a" is created during a telephone call with 'James', the control unit 180 may match the memo with information about 'James' stored in the storage unit 170, and may store the memo "a" matched with the information on 'James' in the storage unit 170.

Referring back to FIG. 56, the method of operating of the mobile terminal 100 according to an embodiment of the present invention includes displaying a telephone number of the specific person and a telephone number list including an icon representing that the memo is stored during the telephone call with the mobile terminal of the specific person (S5650).

This will be described in detail with reference to FIG. 58

Figure 58:
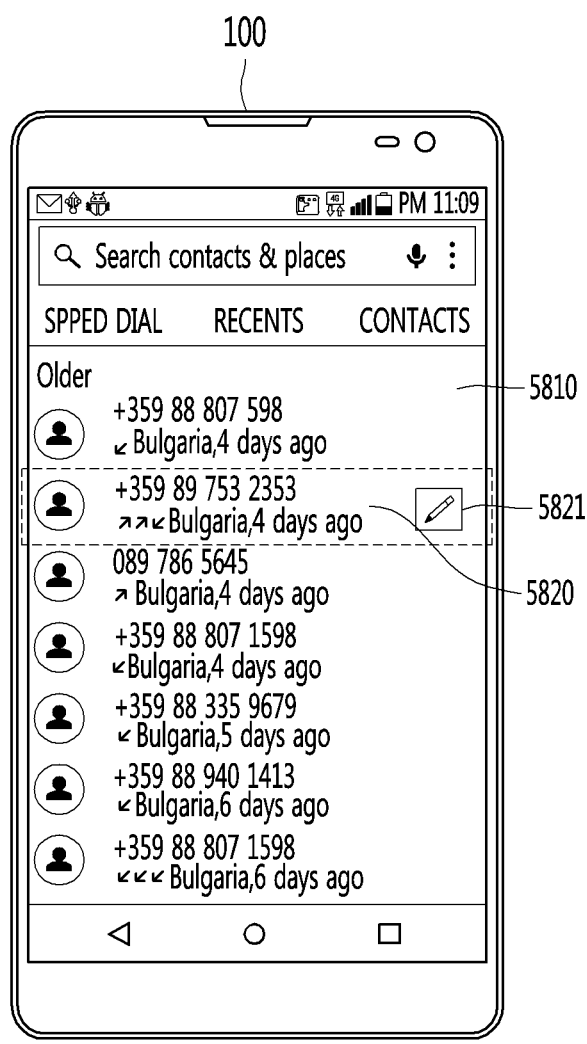
FIG. 58 is a view showing a mobile terminal on which a telephone number list is displayed.

FIG. 58 is a view showing a mobile terminal on which the telephone number list is displayed.

When an input for confirming the telephone number list is received, the control unit 180 may display the telephone number list 5810. The phone number list 5810 may include information about one or more users (e.g., phone numbers of each of one or more users). In this case, the telephone number list 5810 may include the information 5820 on the specific person described in FIG. 57, and the information on the specific person 5820 may include the telephone number of the specific person. Here, the telephone number list may be a telephone number list sorted in order of name or group, but the present invention is not limited thereto, and may be a telephone number list displayed as a recent call list.

Meanwhile, the telephone number list 5810 may include an icon 5821 indicating that a memo is stored during a telephone call with a specific mobile terminal.

Meanwhile, the control unit 180 may display the icon 5821 representing that the memo is stored during the telephone call with the mobile terminal of the specific person so as to correspond to the information 5820 on the specific person.

For example, information 5820 about a specific person may include the icon 5821 representing that a memo has been stored during a telephone call with the mobile terminal of the specific person.

However, the present invention is not limited thereto. For example, any display method that may recognize that the icon 5821 representing that the memo is stored is in association with a specific person may be applied.

Referring back to FIG. 50, the method of operating of the mobile terminal 100 according to an embodiment of the present invention may include displaying (S5670) information associated with a memo and a specific person when an input for selecting an icon is received.

This will be described in detail with reference to FIG. 59.

Figure 59:
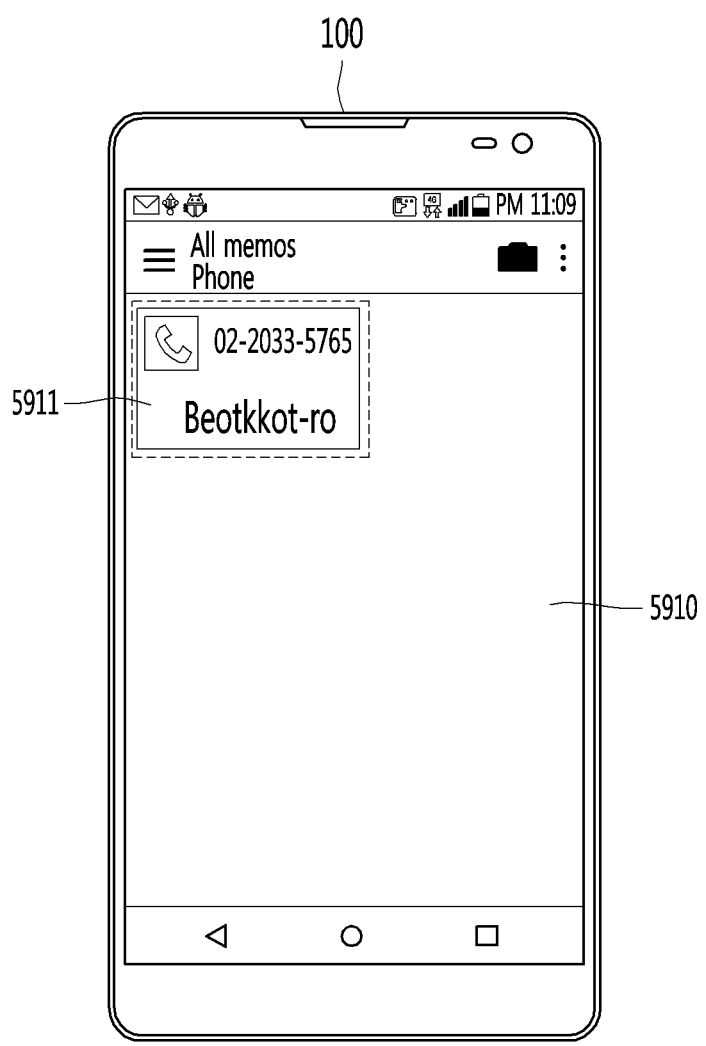
FIG. 59 is a view illustrating a method of displaying a memo according to an embodiment of the present invention.

FIG. 59 is a view illustrating a method of displaying a memo according to an embodiment of the present invention.

As illustrated in FIG. 58, in the state of displaying the icon 5821 representing that a memo is stored during the telephone call with the specific person and information 5820 on a specific person, when receiving an input for selecting the icon 5821 representing that the memo is stored during the telephone call with the specific person or an input for selecting the information 5820 on the specific person, the control unit 180 may execute the memo application and display the execution image 5910 of the memo application, as illustrated in FIG. 59.

Meanwhile, the execution image 5910 of the memo application may include a memo made based an input received during a telephone call with a mobile terminal of a specific person. For example, when a text having the content "GangNam at 6:00" is input and thus the text of "GangNam at 6:00" is stored in the storage unit 170 as a memo, the control unit may display the memo of "GangNam at 6:00".

Meanwhile, the execution image 5910 of the memo application may include information 5911 on the specific person. For example, the control unit 180 may display the name of a specific person, a telephone number of a specific person, an e-mail address of a specific person, or the like together with a memo created and saved during the telephone call with the specific person.

Meanwhile, when an input for selecting the information 5911 on a specific person is received, the control unit 180 may request a telephone call to a mobile terminal of a specific person to perform a telephone call with the specific person through a mobile terminal.

As described above, the present invention may provide an environment in which a user who checks a phone number list may easily check out a memo created during the telephone call with the specific person.

In addition, the present invention may display an information on a specific person while displaying the note, thereby providing an environment that allows the user to recognize a person associated with a memo that the user current views.

In addition, according to the present invention, user operability may be improved by connecting a telephone call with a specific person through a simple operation of selecting information 5911 on a specific person. For example, a user may search for a telephone call with a specific person in a phone number list, and a user finding a phone number of the specific person may simply check the memo previously made during the telephone call with the specific person by clicking on the icon. In addition, the user who has checked the previous call content by checking the memo made during the telephone call with the specific person may easily perform the telephone call with the specific person by selecting the information 5911 on the specific person.

Figure 60:
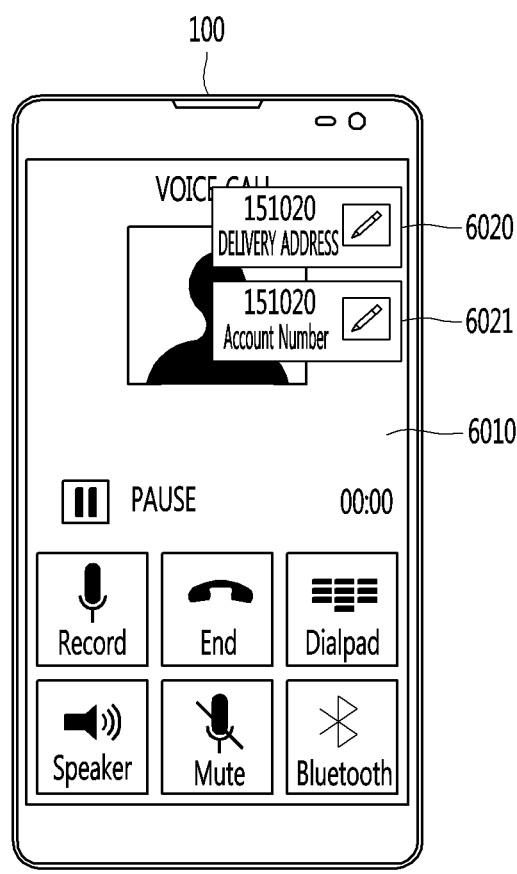
FIG. 60 is a view illustrating a method of operating a mobile terminal when a telephone call is reconnected with a specific mobile terminal.

FIG. 60 is a view illustrating a method of operating a mobile terminal when a telephone call is reconnected with a specific mobile terminal.

Referring to FIG. 60, a telephone call is connected with a mobile terminal of a specific person, and an execution image 6010 of a telephone call application is displayed on the screen of the mobile terminal 100.

Meanwhile, when the telephone call is connected with the mobile terminal of the specific person, the control unit 180 may display UIs 6020 and 6030 corresponding to one or more notes stored during the telephone call with the specific mobile terminal.

Meanwhile, the UIs 6020 and 6030 corresponding to one or more notes stored during the telephone call with a specific mobile terminal may include the date on which the memo is stored and the title of the note, respectively.

For example, the first UI 6020 may include information that the date on which the memo is stored is Oct. 20, 2015. In addition, the first UI 2060 may include the title (delivery address) of the note.

Meanwhile, if the title of the memo is not set, the control unit 180 may display a UI including a part of the note.

Meanwhile, each of the UIs 6020 and 6030 corresponding to one or more notes stored during the telephone call with a specific mobile terminal may include icons 6021 and 6031 indicating that notes are stored.

Meanwhile, when an input for selecting the first UI 6020 from the one or more UIs is received, the control unit 180 may execute the memo application and may display the memo corresponding to the first UI 6020. Meanwhile, when the present embodiment is applied to the rollable display device 200-2 described above, the control unit 180 expands the screen and displays at least one of the reproducible video of the telephone call application and the reproducible video of the memo application on the expanded screen. The execution image of the not application may include a memo corresponding to the first UI 6020.

As described above, the present invention may provide an environment that a user may easily check whether a memo is previously created in a process of making a call with a specific person, and may easily recognize a memo made in the process of making the call with the specific call in the future, when the telephone call is again connected with the mobile terminal of the specific person.

Figure 61:
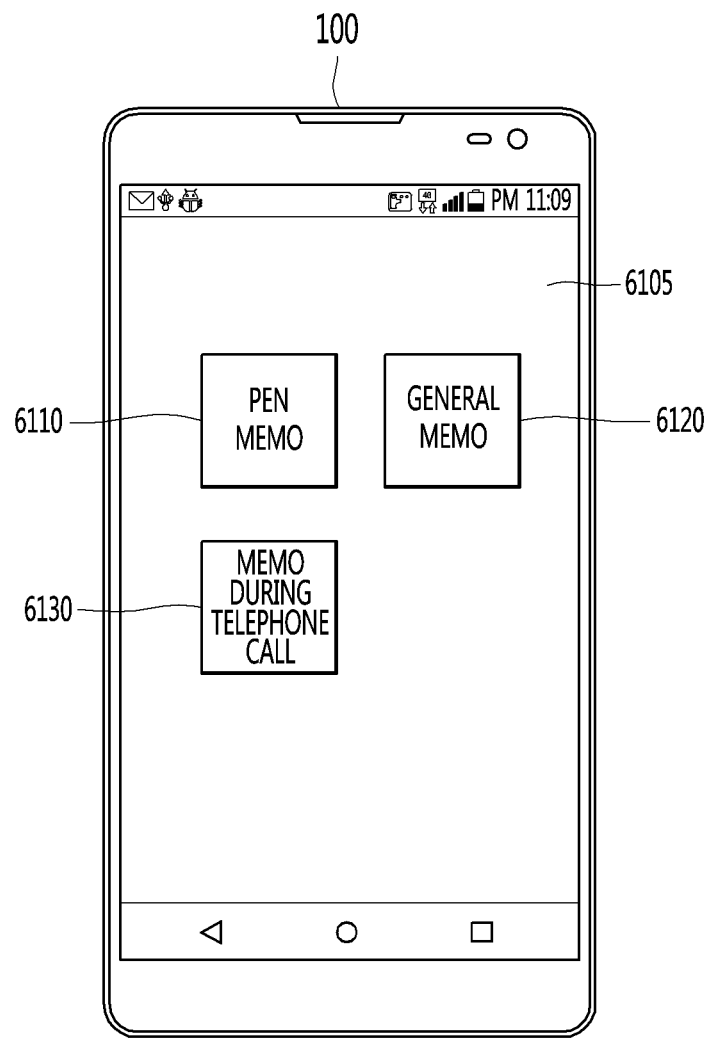
FIG. 61 is a view showing an execution image of the memo application according to an embodiment of the present invention.

FIG. 61 is a view that an execution image of the memo application is displayed according to an embodiment of the present invention.

When an input for executing the memo application is received, the control unit 180 may execute the memo application and display the execution image 6105 of the memo application.

Meanwhile, the execution image 6105 of the memo application displayed when the memo application is executed may include folders 6110, 6120, and 6130 obtained by classifying notes according to categories.

In this case, the first folder 6110 may be a folder in which a memo file made in the pen mode is stored, and the second folder 6120 may be a folder in which a memo file created in the text mode is stored.

Meanwhile, the control unit 180 may display the folder 6130 in which one or more memo files created during the telephone call are stored.

Meanwhile, when an input for selecting the folder 6130 storing one or more memo files created during the call is received, the control unit 180 may display one or more memo files created during the call. When an input for selecting a specific memo file among the one or more memo files is received, the control unit 180 may display a memo corresponding to the specific memo file.

Meanwhile, the control unit 180 is generally configured to control the apparatus, and may be used in combination with terms such as a central processing unit, a microprocessor, a processor, and the like.

The present invention mentioned in the foregoing description may be implemented using a recording medium having a program and codes that are able to read by a computer. A computer-readable medium include all types of recording devices which is able to be read by a computer system and stores data. Examples of the computer-readable mediums include HDD (Hard Disk Drive), SSD (Solid State Disk), SDD (Silicon Disk Drive), ROM, RAM, CD-ROM, a magnetic tape, a floppy disk, an optical data storage device. The medium includes a medium implemented in the form of a carrier wave (for example, a transmission over the Internet). The medium may include the controller 180 of the mobile terminal. This description is intended to be illustrative without being limitedly interpreted. The scope of the present invention is determined by a reasonable interpretation. All modifications of equivalents of the present invention fall into the scope of the present invention.

The invention claimed is:

1. A mobile terminal comprising:
    a display unit to display an image;
    a pen attached to or detached from the mobile terminal and to provide an input to the mobile terminal by contacting with a screen of the display unit;
    a sensing unit to sense that the pen is attached or detached; and
    a control unit to control the display unit to display an execution image of a memo application which is changed in an execution mode as the pen is attached or detached,
    wherein the control unit:
    displays the execution image including a notepad User Interface (UI) in a text mode;
    changes the execution mode of the memo application to a pen mode and maintains the display of the notepad UI, when the pen is detached in a state that the execution mode of the memo application is in the text mode; and
    changes the execution mode of the memo application to the text mode and maintains the display of the notepad UI, when the detached pen is attached in a state that the execution mode of the memo application is in the pen mode, and
    wherein the notepad UI includes a text corresponding to an input text in the text mode and a pen movement trajectory UI corresponding to a movement trajectory of the pen in the pen mode.

2. The mobile terminal of claim 1, wherein the control unit executes the memo application and displays the execution image of the memo application, when the pen is detached during a telephone call.

3. The mobile terminal of claim 2, further comprising:
an audio output module; and
a communication unit to communicate with an external device,
wherein the control unit:
controls the audio output module to output an audio in a speaker mode when sensing that the pen is detached and the external device for outputting the audio is not connected to the mobile terminal; and
transmits an audio signal corresponding to the audio to the external device through the communication unit, when sensing that the pen is detached and the external device for outputting the audio is connected to the mobile terminal.

4. The mobile terminal of claim 3, further comprising:
a microcomputer,
wherein the control unit changes a volume of the audio output in the speaker mode, based on a size of an external sound received through the microphone.

5. The mobile terminal of claim 2, further comprising:
an input unit to receive an input from a user,
wherein the control unit stores a memo made based on the received input and terminates execution of the memo application, when the detached pen is attached to the mobile terminal.

6. The mobile terminal of claim 1, wherein the control unit displays a cursor representing a position in which a text corresponding to a user input is displayed in the state that the execution mode of the memo application is the text mode, and
wherein the control unit displays the cursor on the same position as a position in which the cursor has been displayed in the text mode, when the execution mode of the memo application is changed to the text mode after changed to the pen mode.

* * * * *